(12) United States Patent
Fox et al.

(10) Patent No.: US 9,696,409 B2
(45) Date of Patent: *Jul. 4, 2017

(54) SENSOR SUITE AND SIGNAL PROCESSING FOR BORDER SURVEILLANCE

(71) Applicant: Vista Research, Inc., Sunnyvale, CA (US)

(72) Inventors: Phillip A. Fox, Hertford, NC (US); Joseph W. Maresca, Jr., Sunnyvale, CA (US)

(73) Assignee: Vista Research, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,953

(22) Filed: May 11, 2015

(65) Prior Publication Data
US 2016/0097839 A1 Apr. 7, 2016

Related U.S. Application Data

(63) Continuation of application No. 13/710,131, filed on Dec. 10, 2012, now Pat. No. 9,030,351, which is a (Continued)

(51) Int. Cl.
*G01S 7/292* (2006.01)
*G01S 13/86* (2006.01)
(Continued)

(52) U.S. Cl.
CPC .......... *G01S 7/2922* (2013.01); *G01S 13/522* (2013.01); *G01S 13/723* (2013.01); *G01S 13/867* (2013.01); *G01S 13/886* (2013.01); *G01S 13/86* (2013.01)

(58) Field of Classification Search
CPC ... G01S 7/02; G01S 7/28; G01S 7/285; G01S 7/292; G01S 7/2921; G01S 7/2922;
(Continued)

(56) References Cited

U.S. PATENT DOCUMENTS 2,940,072 A 6/1960 Florsheim
2,965,894 A 12/1960 Sweeney
(Continued)

FOREIGN PATENT DOCUMENTS

JP 394186 A 4/1991

OTHER PUBLICATIONS

"A Review of Remote Surveillance Technology Along U.S. Land Borders", Department of Homeland Security: Office of Inspector General: Office of Inspections and Special Reviews, No. OIG-06-15, (Dec. 2005), 53 pgs.
(Continued)

*Primary Examiner* — Bernarr Gregory
(74) *Attorney, Agent, or Firm* — Schwegman Lundberg & Woessner, P.A.

(57) ABSTRACT

A land-based Smart-Sensor System and several system architectures for detection, tracking, and classification of people and vehicles automatically and in real time for border, property, and facility security surveillance is described. The preferred embodiment of the proposed Smart-Sensor System is comprised of (1) a low-cost, non-coherent radar, whose function is to detect and track people, singly or in groups, and various means of transportation, which may include vehicles, animals, or aircraft, singly or in groups, and cue (2) an optical sensor such as a long-wave infrared (LWIR) sensor, whose function is to classify the identified targets and produce movie clips for operator validation and use, and (3) an IBM CELL supercomputer to process the collected data in real-time. The Smart Sensor System can be implemented in a tower-based or a mobile-based or combination system architecture. The radar can also be operated as a stand-alone system.

20 Claims, 49 Drawing Sheets

Related U.S. Application Data continuation of application No. 11/811,353, filed on Jun. 8, 2007, now Pat. No. 8,330,647.

(60) Provisional application No. 60/804,251, filed on Jun. 8, 2006.

(51) Int. Cl.
 *G01S 13/66* (2006.01)
 *G01S 13/522* (2006.01)
 *G01S 13/72* (2006.01)
 *G01S 13/88* (2006.01)
 G01S 13/00 (2006.01)

(58) Field of Classification Search
 CPC ........ G01S 13/66; G01S 13/72; G01S 13/723;
  G01S 13/86; G01S 13/867; G01S 13/88;
  G01S 13/886; G01S 13/951; G01S 7/354;
  G01S 13/538; G01S 13/53; G01S 7/411;
  G01S 7/417; G01S 7/414; G01S 7/2923;
  G01S 7/023; G01S 13/865; G01S 17/023;
  G01S 7/2927; G01S 13/70; G01S 17/58;
  G01S 13/878; G01S 13/872; G01S
  13/0218; G01S 7/288; G01S 7/32; G01S
  7/36; G01S 13/282; G01S 13/524; G01S
  13/89; G01S 7/20; G01S 13/534; G01S
  13/5242; G01S 7/2806; G01S 13/95;
  G01S 13/94; G06K 9/00624; G06K
  9/90063; G06K 9/00771; G06K 9/20;
  G06K 9/32; G06K 9/3233; G06K 9/3241;
  H04N 7/18; H04N 7/181; H04K 3/20;
  H04K 3/22; H04L 63/02; C07K 14/435;
  C07K 14/705; G06G 7/48; G06G 7/80;
  G01C 21/005; A61K 31/00; B64G 3/00;
  B29C 70/04; B29C 70/28; B29C 70/40;
  B29C 70/50
 USPC .................. 342/27, 28, 52–60, 89–103, 118,
  342/134–147, 175, 192–197, 159–164
 See application file for complete search history.

(56) References Cited

U.S. PATENT DOCUMENTS

| | | | | |
|---|---|---|---|---|
| 2,985,373 A * | 5/1961 | Helgeson | G06G 7/80 | 342/65 |
| 3,076,961 A * | 2/1963 | Bibbero | G01S 13/86 | 342/55 |
| 3,119,582 A * | 1/1964 | Kaufmann | G01S 13/94 | 342/65 |
| 3,141,161 A * | 7/1964 | King | G01S 13/94 | 342/65 |
| 3,153,230 A * | 10/1964 | Van Krevelen | G01S 13/94 | 342/65 |
| 3,206,745 A * | 9/1965 | Waters | G01S 13/94 | 342/65 |
| 3,209,352 A * | 9/1965 | Buck | G06K 9/20 | 342/64 |
| 3,209,353 A * | 9/1965 | Wiener | G01S 13/94 | 342/65 |
| 3,213,447 A * | 10/1965 | Burrows | G01S 13/94 | 342/65 |
| 3,241,141 A * | 3/1966 | Wall | G01S 13/94 | 342/65 |
| 3,287,724 A * | 11/1966 | Zupanick | G01S 13/94 | 342/65 |
| 3,315,255 A * | 4/1967 | Sullivan | G01S 13/94 | 342/65 |
| 3,325,807 A * | 6/1967 | Burns | G01S 13/94 | 342/65 |
| 3,328,795 A * | 6/1967 | Hallmark | G01C 21/005 | 342/64 |
| 3,333,263 A * | 7/1967 | Kazakevicius | G01S 7/20 | 342/65 |
| 3,643,257 A * | 2/1972 | Thomson | G01S 13/534 | 342/160 |
| 3,733,603 A * | 5/1973 | Johnston | G01S 7/411 | 342/192 |
| 3,836,964 A * | 9/1974 | Evans | G01S 13/72 | 342/90 |
| 3,898,654 A * | 8/1975 | Vehrs, Jr. | G01S 7/36 | 342/161 |
| 3,903,525 A * | 9/1975 | Mullins | G01S 13/5242 | 342/161 |
| 3,940,762 A * | 2/1976 | Ethington | G01S 7/2923 | 342/90 |
| 3,983,556 A * | 9/1976 | Danzer | G01S 7/2927 | 342/93 |
| 4,001,826 A * | 1/1977 | Moulton | G01S 7/2806 | 342/161 |
| 4,005,415 A * | 1/1977 | Kossiakoff | G01S 7/2921 | 342/90 |
| 4,015,257 A * | 3/1977 | Fetter | G01S 13/95 | 342/26 R |
| 4,035,800 A * | 7/1977 | Lewis | G01S 13/538 | 342/160 |
| 4,041,491 A * | 8/1977 | Taylor, Jr. | G01S 13/0218 | 342/350 |
| 4,051,473 A * | 9/1977 | Hooker, Jr. | G01S 7/2927 | 342/93 |
| 4,075,703 A * | 2/1978 | Dillard | G01S 7/2927 | 342/93 |
| 4,079,376 A * | 3/1978 | Kirk, Jr. | G01S 13/70 | 342/101 |
| 4,089,001 A * | 5/1978 | Donahue | G01S 7/288 | 342/160 |
| 4,104,633 A * | 8/1978 | Donahue | G01S 7/2922 | 342/93 |
| 4,137,533 A * | 1/1979 | Briechle | G01S 7/32 | 342/162 |
| 4,308,538 A * | 12/1981 | Albersheim | G01S 13/282 | 342/95 |
| 4,555,703 A * | 11/1985 | Cantrell | G01S 7/414 | 342/192 |
| 4,618,864 A * | 10/1986 | Martin | G01S 13/524 | 342/162 |
| 4,707,697 A * | 11/1987 | Coulter | G01S 7/292 | 342/159 |
| 4,894,658 A * | 1/1990 | Hecht-Nielsen | G01S 13/89 | 342/90 |
| 4,970,660 A * | 11/1990 | Marchant | G01S 7/2923 | 342/90 |
| 5,053,622 A * | 10/1991 | Kessler | B64G 3/00 | 89/1.11 |
| 5,469,168 A * | 11/1995 | Anderson | G01S 13/951 | 342/192 |
| 5,499,030 A * | 3/1996 | Wicks | G01S 7/292 | 342/159 |
| 5,594,451 A * | 1/1997 | Krikorian | G01S 7/414 | 342/160 |
| 5,703,592 A * | 12/1997 | Watts | G01S 7/2927 | 342/159 |
| 5,748,142 A * | 5/1998 | Rademacher | G01S 7/023 | 342/159 |
| 5,963,653 A * | 10/1999 | McNary | G01S 13/867 | 382/103 |
| 6,042,050 A * | 3/2000 | Sims | G01S 17/023 | 342/52 |
| 6,211,815 B1* | 4/2001 | Richey | G01S 7/285 | 342/194 |
| 6,212,471 B1* | 4/2001 | Stiles | G01S 13/88 | 342/158 |
| 6,266,004 B1* | 7/2001 | Pannert | G01S 13/931 | 342/118 |
| 6,542,739 B1* | 4/2003 | Garner | H04L 63/02 | 455/1 |

(56) References Cited

U.S. PATENT DOCUMENTS

| | | | | |
|---|---|---|---|---|
| 6,707,419 B2* | 3/2004 | Woodington | G01S 7/023 | 342/118 |
| 6,717,545 B2* | 4/2004 | Dizaji | G01S 7/2927 | 342/159 |
| 6,765,654 B2* | 7/2004 | Asaka | G01S 17/58 | 342/54 |
| 6,771,207 B1* | 8/2004 | Lang | G01S 13/951 | 342/159 |
| 6,828,929 B2* | 12/2004 | Barbella | G01S 13/53 | 342/196 |
| 6,844,841 B1* | 1/2005 | Masciulli | H04K 3/22 | 342/175 |
| 6,850,186 B2* | 2/2005 | Hellsten | G01S 13/878 | 342/159 |
| 6,853,328 B1* | 2/2005 | Guice | G01S 13/88 | 342/27 |
| 6,856,272 B2* | 2/2005 | Levitan | G01S 13/872 | 342/52 |
| 6,881,841 B2* | 4/2005 | Takeuchi | A61K 31/00 | 544/381 |
| 6,884,841 B2* | 4/2005 | Nava | B29C 70/50 | 525/177 |
| 6,903,676 B1* | 6/2005 | Frady | G01S 13/867 | 342/52 |
| 6,967,612 B1* | 11/2005 | Gorman | G01S 13/66 | 342/175 |
| 7,049,998 B1* | 5/2006 | Frady | G01S 13/867 | 342/52 |
| 7,142,150 B2* | 11/2006 | Thackray | G01S 13/865 | 342/118 |
| 7,236,123 B2* | 6/2007 | Siegel | G01S 7/2923 | 342/159 |
| 7,286,079 B2* | 10/2007 | Blunt | G01S 7/2927 | 342/159 |
| 7,295,106 B1* | 11/2007 | Jackson | G06K 9/00771 | 340/5.8 |
| 7,298,316 B2* | 11/2007 | Tsai | G01S 7/2922 | 342/159 |
| 7,327,307 B2* | 2/2008 | Adams | G01S 13/66 | 342/159 |
| 7,376,247 B2* | 5/2008 | Ohta | G01S 13/867 | 342/52 |
| 7,474,255 B2* | 1/2009 | Hsieh | G01S 13/70 | 342/118 |
| 7,583,815 B2* | 9/2009 | Zhang | G06K 9/00771 | 348/169 |
| 7,646,329 B2* | 1/2010 | Britton | G01S 7/2923 | 342/52 |
| 7,646,886 B2* | 1/2010 | Chen | G06K 9/3241 | 382/103 |
| 7,800,527 B2* | 9/2010 | Douglass | G01S 13/66 | 342/175 |
| 7,940,206 B2* | 5/2011 | Nohara | G01S 7/292 | 342/159 |
| 8,026,844 B2* | 9/2011 | Fox | G01S 7/2922 | 342/175 |
| 8,330,647 B2* | 12/2012 | Fox | G01S 7/2922 | 342/159 |
| 9,030,351 B2* | 5/2015 | Fox | G01S 7/2922 | 342/159 |
| 2003/0030582 A1* | 2/2003 | Vickers | G01S 17/023 | 342/54 |
| 2003/0032582 A1* | 2/2003 | Wahlsten | C07K 14/705 | 424/184.1 |
| 2003/0179129 A1* | 9/2003 | Tamatsu | G01S 7/354 | 342/27 |
| 2004/0150552 A1* | 8/2004 | Barbella | G01S 13/53 | 342/196 |
| 2005/0046584 A1* | 3/2005 | Breed | G01S 7/417 | 455/420 |
| 2006/0049978 A1* | 3/2006 | Siegel | G01S 7/2923 | 342/159 |
| 2006/0077255 A1* | 4/2006 | Cheng | G06K 9/0063 | 348/143 |
| 2006/0125679 A1* | 6/2006 | Horibe | G01S 13/867 | 342/52 |
| 2006/0125680 A1* | 6/2006 | Thackray | G01S 13/865 | 342/54 |
| 2007/0075892 A1* | 4/2007 | Horibe | G01S 17/023 | 342/52 |
| 2009/0015460 A1* | 1/2009 | Fox | G01S 7/2922 | 342/53 |
| 2009/0128399 A1* | 5/2009 | Root, Jr. | G01S 13/867 | 342/176 |
| 2010/0013917 A1* | 1/2010 | Hanna | H04N 7/181 | 348/143 |
| 2010/0283662 A1* | 11/2010 | Fox | G01S 13/867 | 342/53 |
| 2011/0001657 A1* | 1/2011 | Fox | G01S 13/867 | 342/146 |
| 2014/0062757 A1 | 3/2014 | Fox et al. | | |

OTHER PUBLICATIONS

"U.S. Appl. No. 11/811,343, Final Office Action mailed Dec. 22, 2009", 76 pgs.

"U.S. Appl. No. 11/811,343, Non Final Office Action mailed Mar. 31, 2009", 7 pgs.

"U.S. Appl. No. 11/811,343, Notice of Allowance mailed May 27, 2011", 8 pgs.

"U.S. Appl. No. 11/811,343, Request for Continued Examination mailed Jun. 22, 2010", 39 pgs.

"U.S. Appl. No. 11/811,343, Response filed Sep. 29, 2009 to Office Action mailed Mar. 31, 2009", 11 pgs.

"U.S. Appl. No. 11/811,353, Ex Parte Quayle Action mailed May 25, 2011", 4 pgs.

"U.S. Appl. No. 11/811,353, Final Office Action mailed Apr. 3, 2012", 5 pgs.

"U.S. Appl. No. 11/811,353, Information Disclosure Statement".

"U.S. Appl. No. 11/811,353, Information Disclosure Statement mailed Feb. 29, 2009", (Feb. 9, 2009).

"U.S. Appl. No. 11/811,353, Information Disclosure Statement mailed Mar. 25, 2011".

"U.S. Appl. No. 11/811,353, Non Final Office Action mailed Aug. 16, 2011", 5 pgs.

"U.S. Appl. No. 11/811,353, Non Final Office Action mailed Nov. 3, 2011", 9 pgs.

"U.S. Appl. No. 11/811,353, Non Final Office Action mailed Nov. 24, 2010", 7 pgs.

"U.S. Appl. No. 11/811,353, Notice of Allowance mailed Aug. 9, 2012", 6 pgs.

"U.S. Appl. No. 11/811,353, Response filed Feb. 3, 2012 to Non Final Office Action mailed Nov. 3, 2011", 13 pgs.

"U.S. Appl. No. 11/811,353, Response filed Mar. 11, 2011 to Non Final Office Action mailed Nov. 24, 2010", 21 pgs.

"U.S. Appl. No. 11/811,353, Response filed Aug. 3, 2012 to Final Office Action mailed Apr. 3, 2012", 14 pgs.

"U.S. Appl. No. 11/811,353, Response filed Sep. 7, 2011 to Non Final Office Action mailed Aug. 16, 2011", 14 pgs.

"U.S. Appl. No. 11/811,353, Response to Ex Parte Quayle Action filed May 26, 2011", 1 pg.

"U.S. Appl. No. 13/710,131, Non Final Office Action mailed Jan. 2, 2014", 14 pgs.

"U.S. Appl. No. 13/710,131, Notice of Allowance mailed Jan. 6, 2015", 9 pgs.

"U.S. Appl. No. 13/710,131, Response filed Jun. 2, 2014 to Office Action mailed Jan. 2, 2014", 8 pgs.

"International Application Serial No. PCT/US2007/013516, International Search Report mailed Sep. 15, 2008", 3 pgs.

"U.S. Appl. No. 11/811,353, Information Disclosure Statement mailed Mar. 28, 2008".

(56) References Cited

OTHER PUBLICATIONS

Lin, Christopher C, et al., "A Site-Specific Model of Radar Terrain Backscatter and Shadowing", Johns Hopkins APL Technical Digest, 18(3), (1997), 432-447.

* cited by examiner

Salinas EO/IR Camera Field Test Tracks 06/06/2006

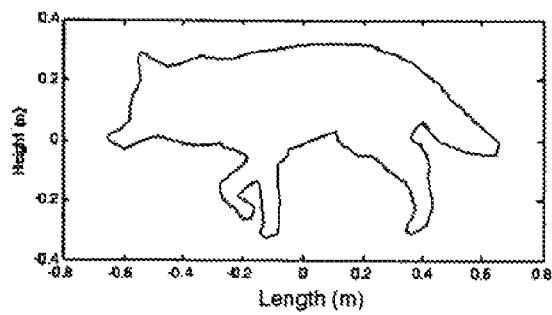
FIG.38

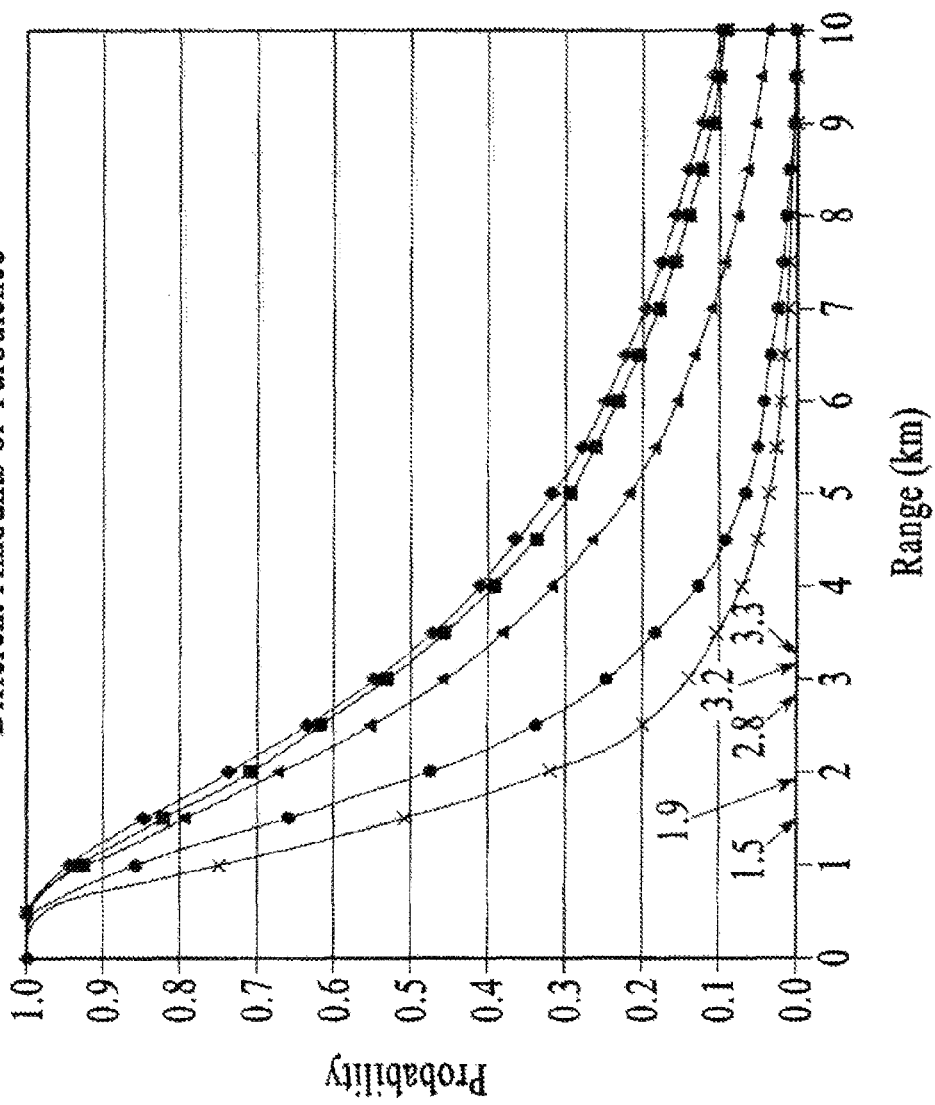

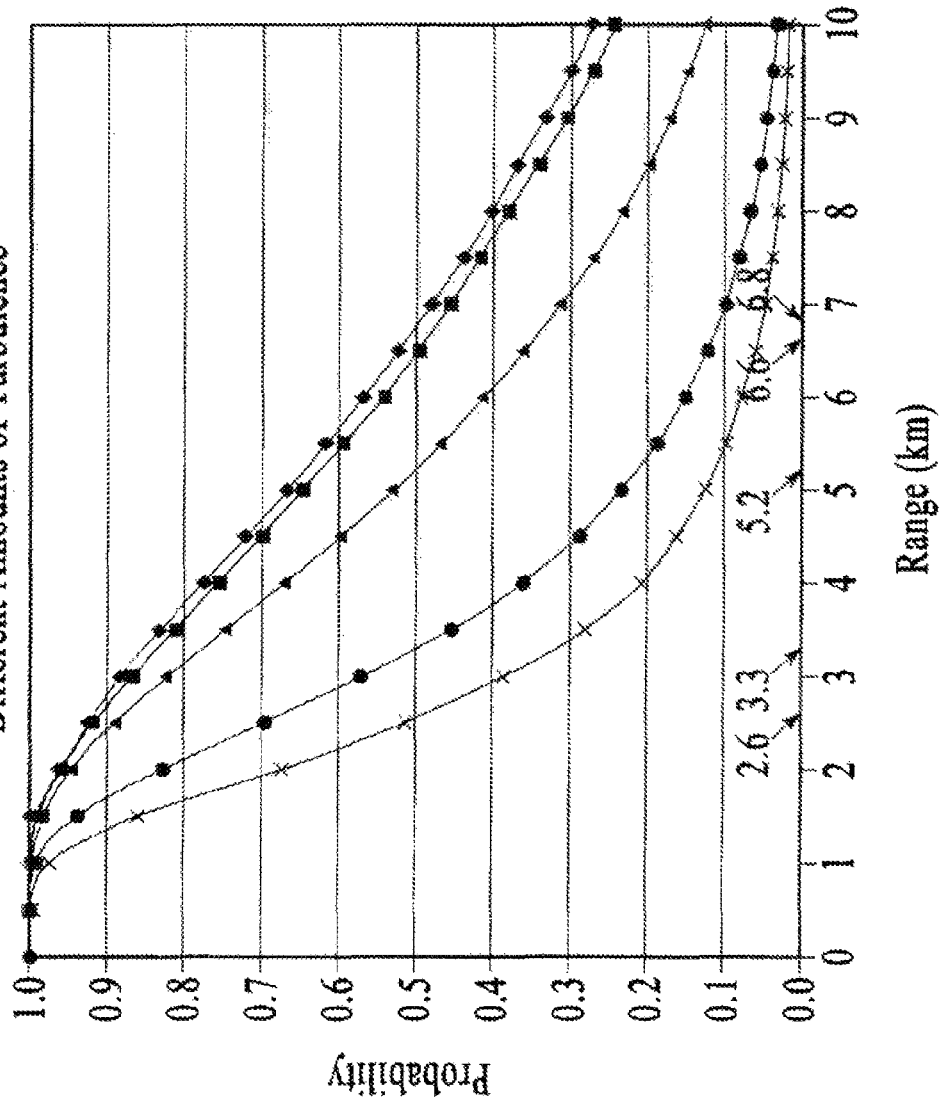

SENSOR SUITE AND SIGNAL PROCESSING FOR BORDER SURVEILLANCE

This application is a continuation of U.S. patent application Serial No. 13,710,131, filed on Dec. 10, 2012, and issued as U.S. Pat. No. 9,030,351 on May 12, 2015, which application is a continuation of and claims the benefit of priority under 35 USC. §120 to U.S. patent application Ser. No. 11/811,353, filed on Jun. 8, 2007, and issued as U.S. Pat.No. 8,330,647on Dec. 11, 2012, which claims the benefit of U. S. Provisional Patent Application Ser. No. 60/804,251, filed on Jun. 8, 2006, the benefit of priority of each of which is claimed hereby, and each of which are incorporated by reference herein in its entirety.

BACKGROUND OF THE INVENTION

Field of the Invention

The method and apparatus described herein are motivated by the need for surveillance and security of the land borders of the United States, including property and facility borders such as military bases and nuclear/petroleum facilities, respectively. The border surveillance system will detect, track, and/or classify people or vehicles automatically and in real-time that are approaching, that may attempt to cross, or have crossed a border. The surveillance method is comprised of (1) a radar for wide-area surveillance to detect, track, and perform $1^{st}$ stage classification of potential targets that cues (2) one or more optical sensors, which may be comprised of one or more infrared (IR) and electro-optical (EO) sensor systems, and/or coherent radars, for classification of these targets, and (3) a supercomputer such as an IBM® Cell Broadband Engine® supercomputer to process the collected data in real-time. The preferred embodiment is a non-coherent radar cueing a long wavelength IR (LWIR) sensor system, where the non-coherent radar can also be operated as a stand-alone system.

The detection, tracking, and classification will be facilitated by advanced signal processing techniques that allow the use of less expensive and off-the-shelf radars and sensor systems, and at the same time achieve better performance, increased range, and automatic decision making than these off-the-shelf systems. The sensor systems can be implemented on one or more tower-like structures spaced appropriately to cover the border sector of interest, or a mobile vehicle designed to move the surveillance system to a particular location of interest, where it can be used alone or in combination with the tower system. Detection, tracking, and classification are done automatically in real time, and suspected targets are confirmed by visual inspection of the sensor output images by an operator before resources are committed for apprehension. A low-cost tracker UAV can be launched to track the designated target until apprehension. The method includes the sensor suite, the operational strategy, the signal processing approach, the signal processing hardware, and the signal process algorithms. The method has homeland, military, energy, property, building, and facility security applications.

Brief Description of Prior Art

The method and apparatus of the present invention is motivated by the need to secure the borders of the United States of America from illegal entry in a cost effective, reliable manner. The invention proposed herein is further motivated by the need to rapidly, accurately, automatically, and cost effectively detect, track, and classify people and vehicles in real time with a fully integrated system. The invention proposed herein is a smart sensor system that can be used to address this surveillance problem using one or more of the system implementation architectures described herein. The same system or subsystems (e.g., the non-coherent radar acting as a stand-alone system) can be used to address a wide range of surveillance and security applications, including military, industrial, and commercial one. For example, a smart sensor system can be used in addition to country borders, for example, to determine all people and vehicles (including aircraft) approach a secure military base, a nuclear power plant, a crucial commercial asset (e.g., water supply), a U. S. Department of Energy (DOE) facility, or a petroleum facility/pipeline.

The problem and the significance of the border surveillance problem for the United States are clearly illustrated in a report issued by the Department of Homeland Security (DHS) in December 2005 [1]. As an example, the Southern Border between Mexico and the United States is 2,000 miles long. The DHS estimates that there may be 3,000 illegal aliens per day crossing the Southern Border, and the report indicates that the border patrol agents are responding to an unwieldy number of possible crossings, one every 44 s [1]. The existing sensor system used at the borders is comprised of seismic and magnetic sensors, and the remote video surveillance (RVS) cameras, which are not cued to the sensors. The report suggests that the probability of false alarm of the system is very high (between 34% and 96% of the sensor alerts) and the probability of detection is very low (between 1% and 57%) [source: Table 1, page 22 of [1]]. Of the seven recommendations made to improve border surveillance, four were technologically driven. They included better integration of assets, standardization of the data collection, processing and reporting, development and application of performance measures, and identify and deploy the use of non-permanent or mobile surveillance platforms. The method and apparatus of the present invention addresses all of these recommendations.

The inadequacy of the current surveillance sensor algorithm and automatic false alarm mitigation technology, the excessively large number of illegal aliens attempting to cross the border, and the lack of sufficient agents to verify possible crossings and to apprehend the illegal aliens makes this a very difficult problem. The invention proposed herein provides the needed surveillance tracking and false alarm mitigation technology that is real-time, integrated, automatic, and has the range to allow the border patrol agents to avoid wasting time on false alarms, enables operators to quickly validate real-targets and determine in advance if they are safety threats, and projects real target locations to future apprehension points. This can be accomplished by the right combination of commercially available off-the-shelf (COTS) sensors and advanced signal processing algorithms.

The report further states that the existing RVS cameras do not automatically steer and cover the area where a seismic or magnetic sensor alarm occurs and do not have the ability to detect movement automatically without operator input. Thus, with existing systems being used at the U.S. borders, it is possible for illegal activity to go unnoticed if an agent is not manning the video terminals or misses some activity on the screen. This can be addressed by used of signal processing algorithms that automatically detect, track, and discriminate human activity without the need for operator involvement on the screen.

The report also states that with existing systems, weather conditions and power outages can have a significant impact on the performance of the systems. While the ice and snow can impair visual acuity along the Northern Borders, the hot and humid conditions can impact the performance of the RVS cameras and the resolution of the IR systems. Other sensors, like an X-band tracking Radar that, unlike higher frequency systems that are impacted by weather, has demonstrated reliable performance in high humidity, rain, and ice/snow conditions. In addition, overlapping Radar coverage is needed such that coverage integrity is maintained with the loss of adjacent sensors, and is enhanced with diverse Radar look directions in difficult terrain conditions.

The method and apparatus of the present invention address some of the most significant deficiencies in the current border operations. The poor performance of the present technology-based systems is due partially to the lack of integration between the sensors and the RVS cameras, the high number of false alarms of the sensors, and the lack of automation for the present camera systems. The 24/7 requirement for visual inspection of the camera images by an operator, and the requirement to deal with a sensor alert every 44 s is too people-intensive to work over an extended period of time. Automation can reduce the workload and take better advantage of an operator's inherent ability to discriminate threats from false alarms. It is clear that better coverage, better integration (cueing of sensor and RVS camera resources), the use of advanced signal processing algorithms for automatic detection, and improved operator discrimination can improve the performance of the system.

The method and apparatus of the present invention will increase the $P_D$, reduce the $P_{FA}$, reduce the $P_{FT}$ (i.e., number of false agent prosecutions after final operator screening), reduce the total number of alerts to deal with, and allow operators to be more effective. The proposed method enables more effective sensor assets because of better integration, automation, and better coverage. The method and apparatus of the proposed system architecture can be integrated with the existing underground seismic and magnetic sensors, the RVS cameras, and other assets presently being used by DHS.

Detection of small cross-section targets such as people or groups of people that can potentially cross a border, especially one that is large, is a challenging technical problem if it is to be accomplished in a cost effective method. The problem is made even more difficult when the measurements need to be made at ranges up 10 km or more for detection, tracking, and classification. People, with very cross sections (less than 1 m$^2$) are very difficult to detect. The Department of Homeland Security has been using unattended ground sensors, EO/IR cameras mounted on towers and in UAVs for visual identification and classification of people and vehicles (at short ranges) by an operator. However, as described below, this approach has experienced problems with an unacceptably high false alarm rate and a poorer than desired probability of detection. The former results in an expensive misuse of limited resources, and the later does not provide the desired border security.

The invention proposed herein whereby a radar is used for wide area surveillance to detect and track potential targets in an area of interest and then cues an optical system such as a long wavelength IR sensor for classification has never been used for border surveillance. The use of the radar allows targets to be detected at sufficient ranges so that potential border crossings can be anticipated in sufficient time for an optical system to identify the target before an illegal crossing is attempted. The invention proposed herein also describes a two-zone implementation, one for wide area surveillance and one for classification and continued tracking until the target is dismissed as a potential problem or through apprehension. The towers or vehicles presently used by DHS do not include radars and consequently have not used such radars to cue the EO/IR sensors. For this border surveillance architecture to be effect requires that the radar have a wide area surveillance capability with frequent updates of the potential targets moving towards the border; this requires many millions to tens of millions of radar samples be collected over the target area. For complete surveillance, the radar should be preferably implemented with 360-degree, 24-h-per-day coverage.

Most modern-day radars developed by the military are coherent radars, which detect moving objects such as people, vehicles, aircraft, ships, and missiles using range-Doppler processing. However, these radars are very expensive and to realize acceptable coverage for border surveillance applications would generally not be cost effective. The less expensive non-coherent radars have not been used for border surveillance applications because of the lack of capability to detect very small cross-section targets like people. Incoherent radars have mainly been used to detect threats much larger than people like aircraft and ships. FIG. 1 illustrates this point with a Furuno® radar mounted on a ship (insert) that has been used for marine applications for many tens of years. These low-cost, non-coherent radars operating at X-band, are used to detect buoys and land and have not been used for detection and tracking of people. FIG. 1 shows a typical output display of such a radar in a port region where people, vehicles, ships, buoys, and land are present, but only the land and buoys are visible. In fact, no people are visible in the display and no attempt has been made to use this type of radar for people detection. (For comparison purposes, contrast the output display from FIG. 1 to the raw data shown below in FIG. 17.)

Besides low cost, these radars have sufficient range and an effective wide-area surveillance capability to cover and provide a large number of samples on the target area of interest. The advantages of such a non-coherent radar is that it is very inexpensive, can put a lot of energy on the target, and can collect a lot of samples on the target. This type of non-coherent radar is the key element of the preferred embodiment of the present invention proposed herein because the advantages of this type of radar, when applying advanced signal processing, can be converted into a radar to detect targets with very small cross sections (i.e., people). The invention proposed herein also describes the use of a radar propagation model, which includes the effects of multi-path, to determine signal-to-noise ratio (SNR) of for each resolution cell in the radar target area of interest, where the terrain (in three dimensions), the radar location and elevation, and the target size and height is input to the model. This model can be used (1) in optimally locating the position and elevation of the sensor measurement systems (towers and mobile assets) for maximum coverage and performance, and (2) in developing and maintain a target track even when the target passes through resolutions cells without sufficient SNR for detection.

Our search of the patent literature does not indicate the use of non-coherent for wide area surveillance of people and other targets with small cross sections. Nor does our search indicate the disclosure of the system architecture whereby a radar cues an optical system, the use two-zone method for wide area surveillance in the outer zone and classification in an inner zone. Finally, our search did not indicate the use of a radar propagation model for locating towers or mobile vehicle for optimal coverage, or for use in developing more robust tracks of the targets of interest.

While the use of advanced signal process algorithms and supercomputers automated, real-time measurements with remote sensor systems is not in and of itself novel, it is novel for application to inexpensive non-coherent radar system for detection and tracking people or groups of people.

SUMMARY OF THE INVENTION

It is the object of this invention to provide a method and an apparatus for surveillance of a border, property, or facility for people or vehicles approaching, crossing, or leaving the border.

It is the object of this invention to provide a method and an apparatus for surveillance of a border, property, or facility for people or vehicles where entry or access is limited or prohibited without permission.

It is the object of this invention to provide a method and an apparatus for automatic, real-time detection, tracking, or classification of small targets such as people or vehicles with a smart sensor system.

It is the object of this invention to provide a method and apparatus for detection, tracking, and $1^{st}$ stage classification of people, vehicles, or targets with small cross sections with a low-cost, non-coherent radar.

It is the object of this invention to provide a method and an apparatus for detection, tracking, and classification of people, vehicles, or targets with small cross sections with a smart sensor system comprised of a radar, which will detect, track, and perform $1^{st}$ stage classification of all targets in a target area of interest, to cue an optical system for classification of the targets.

It is also the object of this invention to provide a method and an apparatus for a surveillance system comprised of a non-coherent radar cueing a long wavelength IR camera system for detection, tracking and classification of people and vehicles.

It is also the object of this invention to provide a method and an apparatus for a tower-based surveillance system.

It is also the object of this invention to provide a method and an apparatus for a mobile-based surveillance system.

The method and apparatus of the present invention is a two-zone system architecture of a real-time, integrated, automated and reliable border surveillance system using off-the-shelf sensor systems and a suite of novel signal processing algorithms to detect, track, and/or discriminate illegal border crossing of people and/or vehicles (i.e., small, slow-moving targets in a high-clutter environment). The final decision about whether or not an illegal crossing will, is, or has occurred can be verified by visual inspection by a border patrol agent using an image or movie clip output from the automated system.

The preferred method of the present invention is a two-zone, system architecture comprising a wide-area, all-weather, non-coherent, X-band radar surveillance system for detection and tracking of people and vehicles in the outer zone, which cues, one or more high dynamic range, long-wave infrared (IR) and electro-optical (EO) surveillance system for classification (discrimination of actual targets from false targets) and continue tracking in the inner zone. The non-coherent radar can be used for $1^{st}$ stage classification in the outer zone. In addition, a coherent radar can also be used for classification in either zone. The signal processing algorithms enable the use of COTS radars and optical sensors to automatically detect, track, and classify illegal aliens and vehicles in real-time, including passing continuous real-time visual "movies" of the suspected target to an operator for visual confirmation that the target is real before committing resources for apprehension. The use of sophisticated signal processing algorithms enables the use of low-cost, COTS sensors by shifting the surveillance burden from sensors to processing algorithms and implementing the real-time software in one of the latest supercomputer technology (e.g., an IBM® commercially available Cell Broadband Engine® processor). The system architecture concept described herein uses towers and/or mobile-vehicles for implementation of the sensor systems.

IN THE DRAWINGS

FIG. 1. Typical output of a Furuno® radar operated from a ship. The radar is shown mounted on a ship in the upper right hand corner of the figure.

FIG. 2. Illustration of the Surveillance Concept.

FIG. 3. Smart sensor system in the tower-based architecture shown will automatically track and classify people and vehicles (targets of interest) and provide actionable information to an operator in terms of video clips and other information.

FIG. 4. Photograph of an IBM® Cell Broadband Engine® blade computing system.

FIG. 5. Photographs of the narrow field-of-view LWIR camera on a tripod and the Furuno® radar and antenna mounted on a 15-ft mast on a levee in Salinas, Calif. used to collect data that was used to estimate performance in this Phase I SB IR. The data acquisition and computer systems are housed in the back of a SUV.

FIG. 6. New small pitch long wave IR system with $\frac{1}{5}^{th}$ watt.

FIG. 7. LWIR image obtained with the new small pitch DRS camera.

FIG. 8. Long wave IR demonstrates superior performance in low grazing angle dusty environments that are important for effective border sensor performance, such as the example shown in this simultaneous side-by-side low grazing angle LWIR (left) vs. MWIR (right) imagery comparison.

FIG. 9. Illustration of the Proposed Surveillance Concept.

FIG. 10. View of the terrain at the Southern Border.

FIG. 11. View of the terrain between the border and the mountains located at about 5-km range.

FIG. 12. Dirt road running approximately parallel to the border denoted by the wire fence.

FIG. 13. Footpath produced by many people traveling towards the border.

FIG. 14a. Analytical estimate of target distance as a function of SNR and tower height for a 25-kW radar and a person (0 dBsm target at 5 ft height).

FIG. 14b. Analytical estimate of target visibility out to 6 km using a terrain model assuming a target height of 5 ft.

FIG. 14c. Analytical estimate of target SNR for a 25-kW radar and a person (0 dBsm target at 5 ft) with the effects of terrain and multipath included.

FIG. 15. Track-before-Detect method.

FIG. 16. Satellite image of the radar test area.

FIG. 17. Radar image of the radar test area showing the range of the measurements.

FIG. 18. Satellite image of the LWIR test area.

FIG. 19. Radar coverage area that includes corner reflectors.

FIG. 20. The ROI to be interrogated by the radar.

FIG. 21. Radar data in the ROI.

FIG. 22. The ROI with people and vehicle detections after clutter suppression.

FIG. 23. Illustration of the output of the radar tracker at a point in time. The tracks are shown in red (dots). The SUV equipped with GPS is shown in green (squares).

FIG. 24. Detection and tracking of a SUV as it positions two of three radar reflectors along the road and detection and tracking of a person with a cross section of 0 dBsm moving toward (top image) and away (bottom) from a radar reflector with a cross section of 0 dBsm.

FIG. 25. The center of the polar coordinate image of the Radar data is along a road in a very high clutter region, where there is no obvious presence of vehicles moving on the road.

FIG. 26. The center of the polar coordinate image of the Radar data is along a road in a very high clutter region, where there is no obvious presence of vehicles moving on the road but the automatic signal processing algorithm has developed and displayed a track on a vehicle.

FIG. 27. Level of the noise and clutter for a radar scan in the Salinas field test.

FIG. 28. Number of contacts above 10 dB observed in the farmland area.

FIG. 29. Level of each threshold exceedance in the farmland area.

FIG. 30. ROC for a 6 dB Target and 10 Cycles to Declare.

FIG. 31. ROC for a 7 dB Target and 10 Cycles to Declare.

FIG. 32. ROC for a 8 dB Target and 10 Cycles to Declare.

FIG. 33. ROC for a 8 dB Target and 6 Cycles to Declare.

FIG. 34. Illustration of a frequency-wavenumber display for a person walking.

FIG. 35. Acquire-Track-Classify Method.

FIG. 36. Segmentation algorithm, with an example of good and confused target FIG. 30 segmentation.

FIG. 37. Aspect Ratio and Size Probability Distributions by Class.

FIG. 38. Example of a type instance of a single target based on a polygon representation.

FIG. 39. Example of a type instance group of targets based on multiple polygon representations.

FIG. 40. Gains Achieved by Memory Algorithm with No FAs.

FIG. 41. Detection, tracking and classification of a vehicle at 1.6 km, where the top image illustrates the detection and the bottom image shows the track and classification.

FIG. 42. Detection, tracking and classification of people and groups of people at 1.6 km as the people (top) moved into the field of view and (b) as they moved through the field of view (bottom).

FIG. 43. Detection, tracking and classification of people and groups of people at 2.1 km as the people (top) moved into the field of view and (b) as they moved through the field of view (bottom).

FIG. 44. Output of Night Vision Thermal Imaging System Performance Model (NVTherm™) for detecting and recognizing (classifying) a person or a pickup truck as a function of range.

FIG. 45. Output of NVTherm™ thermal imaging model for recognizing (classifying) a person or a pickup truck as a function of range. Recognition of a person for visibilities of 23, 7, and 2 km.

FIG. 46. Output of NVTherm™ thermal imaging model for recognizing (classifying) a person or a pickup truck as a function of range. Recognition of a pickup truck for visibilities of 23, 7, and 2 km.

FIG. 47. Output of NVTherm™ thermal imaging model for recognizing (classifying) a person or a pickup truck as a function of range. Recognition of a person for visibilities of 23, 7, and 2 km.

FIG. 48. Output of NVTherm™ thermal imaging model for recognizing (classifying) a person or a pickup truck as a function of range. Recognition of a pickup truck for visibilities of 23, 7, and 2 km.

FIG. 49. Output of NVTherm™ thermal imaging model for detecting and recognizing (classifying) a person or a pickup truck as a function of range. Recognition of a person for very low, low, moderate, high, and very high amounts of turbulence.

FIG. 50. Output of NVTherm™ thermal imaging model for detecting and recognizing (classifying) a person or a pickup truck as a function of range. Recognition of a pickup truck for very low, low, moderate, high, and very high amounts of turbulence.

DESCRIPTION OF THE PREFERRED EMBODIMENT

FIGS. 2 and 3 illustrate schematically the preferred embodiment of a smart sensor system in a tower-based system architecture. The same preferred embodiment could be used in a mobile vehicle with a mast or any other type of structure that allows the embodiment to be elevated sufficient to see the targets in the target area of interest. The primary components of the preferred embodiment of the smart sensor system are (1) a low-cost, COTs, non-coherent radar, whose objective is to detect and track all targets of interest (TOI) out to ranges of 12 km and to cue (2) a narrow field-of-view FOV), long-wave infrared (LWIR) sensor, whose objective is to classify the cued target out to ranges of up to 6 km, and (3) a supercomputer to process the data in real-time at the base of the tower.

It is important to point out that the essential element of the radar is that a non-coherent radar is used. The preferred embodiment uses a K-band radar, but other frequencies of operation (C-band, Ku-band) could also be used. At the present time, an X-band, Furuno® radar is being used; this radar is a marine navigation radar, and this radar/type of radar has been in use for many tens of years. Also, a coherent radar could be used, but the cost of using one with a wide area surveillance capability is very expensive, and especially expensive when there is a need to instrument a large number of towers and mobile vehicles (e.g., a 1,000 towers are planned along the Southern Border of the U.S.). The distances will vary according to range, elevation of the radar/sensor, and the capabilities of these and are used to represent the type of distance for which the system may be operated, and the exact distances are not essential to the embodiment. A LWIR sensor is used in the preferred embodiment. While desired, another IR system (e.g., a mid-wave IR system) or an optical system that operates in the visible band (i.e., a camera) could also be used. In general, multiple EO/IR sensors, especially an EO sensor system (i.e., in the visible frequency band) might be included in addition to the LWIR sensor system for classification. In addition, a coherent radar might also be used for classification when the line of sight of an EO/IR sensor is obstructed by terrain or environmental conditions. This smart sensor system approach is possible because of automated, real-time, advanced signal processing algorithms and the advent of supercomputers like the IBM® Cell Broadband Engine® supercomputer (FIG. 4). A detailed trade study showed that the IBM® Cell Broadband Engine® computer has a performance capability that is at least 11 greater than the nearest competitor and is commercially available.

The targets currently of interest to DHS are walking people, groups of walking people, horses moving with intent, and moving vehicles. A high level of performance, in terms of probability of detection ($P_D$) and probability of false alarm ($P_{FA}$), is achieved with this sensor suite because of the use of advanced signal processing algorithms such as the data-intense, Bayesian-based, signal processing and fusion algorithms. Performance goals for the smart sensor system were developed to provide a $P_D$>99% for detecting and tracking all targets of interest with less than 1 false target every two days for a ten-tower coverage sector (i.e., a $P_{FT}$<0.001% for targets incorrectly classified by an operator). Because of the high performance of the radar and the fact that the LWIR sensor is cued to one or more potential targets of interest, the LWIR sensor can be operated with a automated, real-time processor with achievable performance parameters ($P_{CLASS}$>99% and a $P_{FA}$<0.25%).

The collage of photographs in FIG. 5 shows the sensors, computers, and data acquisition system used in the field tests. The narrow FOV LWIR, an IR camera provided by DRS Technologies, Inc., for the field tests, is shown in the two photographs on the left side of the figure. The Furuno® radar is shown on a 15-ft mask in the photograph on the lower right. The initial radar data used to test the preferred embodiment in the field were obtained with the radar mounted on the top of a vehicle and not from the 15-ft mast shown. The raw output displays of the Furuno® radar and LWIR camera are shown in the photograph in the upper right. As stated above, the Furuno® radar is mainly used for marine navigational purposes.

A description of the new generation of small, cooled, higher performance, and less expensive long wave infrared (LWIR) sensors is illustrated in FIG. 6; an image obtained with the camera at 1 km range is shown in FIG. 7. Such enhanced capability cameras are necessary to achieve ranges of up to 6 km for classification of people and groups of people.

Previous tests indicate a strong preference for the use of a Long Wave IR (LWIR) sensor system (i.e., camera system), because it has greater than a 10 dB performance advantage over the mid-wave IR band under normal conditions and has considerably greater advantages in obscure conditions such as the dusty environment (see FIG. 8).

In addition to greater contrast in the long wave band, automated smart sensor system algorithms require a consistent phenomenology response across diurnal cycles for effective 24-7 classification performance. Previous tests indicate that long wave IR can provide a consistent emissive response, whereas mid-wave IR performance is highly bi-modal, i.e., predominantly reflective in daytime conditions and predominantly emissive in night-time conditions. This bi-modal mid-wave IR response requires serious consideration of the need to implement different smart sensor system algorithms as a function of time-of-day, which drives system cost and complexity. Of greater concern is the response cross-over points where periods of several hours of poor to unusable mid-wave band performance during dawn and dusk conditions. During these two daily phenomenology transition points the received signal energy is changing to increasing reflective energy content from the decreasing emissive signal energy content, and vice versa.

In addition, tests on previous programs indicate that these conflicting daytime and night-time mid-wave IR signals are not necessarily consistent, thereby causing dead periods for effective border target classification. All of these long wave IR and mid-wave IR factors strongly suggest that long wave IR is the strongly preferred IR band for effective 24-7 classification.

The advantages of a low-cost, non-coherent, X-band radar for surveillance over the other types of radars are discussed below. An analysis of the requirements for a 360° tower search out to 12 km ranges with a surveillance radar indicated that over 10 million full bandwidth range-azimuth samples/s are required. The use of a non-coherent Furuno® radar generates over 12 million full bandwidth samples/s. Other low-power, solid state radars that generate approximately a 1,000 samples/s would generally be inadequate for high performance surveillance in terms of probability of detection and probability of false alarm for these large search areas. The signal processing approach being used insures a high probability of detection, because over 500 radar contacts per scan can be obtained with the radar, which allow a track-before-detection signal processing approach to be used. Through the application of its smart sensor algorithms, the radar reduces raw sensor imagery, clutter, and false alarms by over 1,000,000 to 1.

The performance for the sensor suite and the signal processing algorithms for detection, tracking, and classification of people and vehicles are expressed in terms of $P_D$, $P_{FA}$ or false alarm rate (FAR), and probability of false target ($P_{FT}$) or false target rate (FTR). An important distinction is made between false alarms and false targets. A false target is a target falsely identified by the operator after inspection of the visual images and passed to a border patrol agent or some other asset as a potential target. A false alarm, on the other hand, is a target falsely identified by the sensor suite and automatic signal processing that is passed to the operator as a target. A false alarm can be mitigated or confirmed as a target by the operator. Thus, the $P_{FA}$ is based upon the automated output of the sensor suite, while the $P_{FT}$ is based upon both the sensor suite and the operator's visual assessment. To be effective, the number of false alarms produced by the automatic sensor suite needs to be acceptably small.

Both false alarms and false targets need to be infrequent so that operator and border agent resources are not unduly taxed. The requirements for the $P_D$ and $P_{FA}$ of the sensor suite to achieve an overall performance are summarized below.

Estimating performance of the proposed smart sensor system is a very challenging task, especially because of the requirements for a very high $P_D$ and a very low $P_{FA}$ and $P_{FT}$. Normally, performance is estimated using the complete sensor suite and signal processing algorithms deployed in the operational environment of interest for a sufficient time to assess the output of the sensor system over the environmental and operational conditions of interest. This is typically accomplished using pre-production and full-production systems that are or soon will become commercially available. Our initial assessment of performance involves three components:

A demonstration that the sensors in the sensor suite and the signal processing algorithms in a field site in Salinas, Calif. have the capability to detect, track, and classify the targets of interest to DHS.

The output of simple models (or analytical calculations) that provide an estimate of performance. For the LWIR sensor, NVTherm™ thermal imaging model, an operator inspection performance model developed by the Night Vision Laboratory will be used to determine the probability of recognition ($P_{Recog}$) for visual inspection of images by an operator. For these first estimates we will assume that the $P_{Recog}$ is approximately equal to the probability of classification ($P_{Class}$) for the automatic, signal processing algorithms. For the radar, we will develop some simple Receiver Operating Curves (ROCs) for the detect-before-track signal processing making some simplifying assumptions about the performance of the clutter rejection algorithms.

Tabulation of the output results for detection, tracking, and classification for known targets in the LWIR data obtained in Salinas, Calif.

The field tests mainly demonstrate the important elements of the preferred embodiment of the smart sensor system under actual field conditions.

The proposed sensor suite and signal processing algorithms have the following advantages:

- High performance is achieved using a low-cost COTS sensor suite with the use of advanced and proven real-time signal processing algorithms implemented for DHS security border surveillance activities.
- The radar sensor used to detect and track a suspected illegal alien or vehicle cues high-resolution sensors used to further classify/discriminate actual targets from false alarms (enabled by algorithms implemented on a very high-performance supercomputer like an IBM® Cell Broadband Engine® supercomputer) and false targets (using low-workload operator screening).
- Detection, tracking, and classification is accomplished automatically and in real-time. Multi-sensor algorithm discriminators include temperature, size, opacity, motion, track constraints and gait for live targets. The signal algorithms use selective grouping of pixels from frame to frame and block to block to enable geographical and motion constraints.
- People and vehicle target detection, tracking, and classification is accomplished at many kilometers from both sides of the border to allow a more efficient, low false alarm, and cost-effective response by border agents.
- Underground tunnels and paths through areas of terrain that are shadowed from sensors can be identified through long range radar target counting plus geo-location of sources (locations where new surface targets appear) and sinks (locations where targets disappear).
- A stream of LWIR and color visual images are presented to an operator for confirmation before committing resources (agents or UAVs) to apprehension.
- Automatic discrimination reduces the number of false alarms presented to an operator and enables the operators to focus on the confirmation of real targets.

Two-Zone Implementation of the Smart Sensor System. One or more of the system architectures for the smart sensor system are described next. The following set of guiding principles was used to develop the architectures.

- Provide 100% day-night coverage over 24-7 with no coverage gaps.
- Provide a low-cost architecture with day/night performance in inclement weather, including through clutter and foliage.
- Track and classify walking people, walking groups of people, horses moving with apparent intent, moving vehicles, and low-flying aircraft that are crossing the US border.
- Provide low latency reporting of actionable information to border agents in the field, in a form that can be highly specified and filtered in accordance with an agent's personal specification to accomplish that agent's personal mission.
- Use smart sensors on mobile vehicles and small, low-cost airborne elements will extend the coverage of fixed tower sensor grid, and provide an immediate back-fill for failures in the fixed grid sensors.
- Integrate modular smart sensor components into a common system architecture that supports future spiral upgrades.
- Develop an architecture that will support redundant means to track and apprehend illegal aliens, with Bayesian fusion of the multiple overlapping fixed and mobile sensor inputs into a Common Operating Picture (COP).
- Develop an architecture that will support redundant, wireless communication links including direct sensor-to-agent handheld and nationwide internet access to the COP for authorized users.
- Use smart sensors to identify and geo-locate jammers and resist penetration by non-authorized users.
- Use smart sensors to support responsive intercept elements.
- Fully integrate the smart sensors with local, state and national agencies.

FIG. 9 illustrates the two-zone implementation for and inherent in the smart sensor system. The overall objective of the proposed smart sensor system is to continuously detect and track all people and vehicles from the border out to a distance of 6 to 12 km or more from the border (depending on terrain), where the initial detections and tracking is desired in the Outer Zone, and to classify all targets within 3 to 6 km or more of the sensor suite, where the border is located within the Inner Zone. The exact location of the border within the Inner Zone will vary depending on where the towers are actually located. An illegal crossing is any target that crosses the border at an uncontrolled location.

The radar will be used to detect and track any moving object in the Outer Zone at a range that is sufficiently far away from a border that no border crossings are immediately possible. In addition, tracking will continue, or if the need arises, to initiate a detection and tracking, in the Inner Zone. The objective of acquiring the Outer Zone detections and tracks is to cue a narrow field-of-view LWIR sensor to pick up the targets detected and being tracked by the radar at the boundary of the Inner and Outer Zones, and to classify and then to continue to track the targets in the Inner Zone by the radar and the LWIR sensor until the LWIR sensor is steered to another possible target for classification. Video clips from LWIR (and EU) cameras will be sent or will be made be accessible to an operator for visual interpretation and be used to verify potential targets that might potentially cross the border. The operator can also be cued by the smart sensor system to review potential targets that might cross the border. With some modifications, the same LWIR algorithms used to detect, track, and classify targets with the narrow field-of-view LWIR sensors can be implemented for the wide field-of-view IR cameras directly and with some further adaptation, the EO cameras as well.

The detection, tracking, and classification problem will be specified in terms of the targets of Interest (TOI) and the sources of interference (i.e., both false targets, such as animals, and system noise or ambient clutter), both of which can result in false alarms and/or false targets. While spurious system noise and ambient clutter can produce false alarms, they should be small in number and fairly easily to mitigate over time because of Bayesian, track-before-detect signal processing algorithms. The targets of interest are mainly people or groups of people, vehicles or groups of vehicles moving very slowly to very fast. In some instances, stationary people and vehicles are of interest. It is anticipated that the tracks of these targets may not be continuous as the targets go in and out of regions of high clutter, move behind main-made and natural obstructions such as buildings and natural terrain features, or change speeds, stop to rest or to take evasive actions. The targets may also move by vehicle, horseback, or bicycle/motorcycle. False targets will mainly be animals or groups of animals such as dogs, coyotes, cows, and horses. While initial detections and tracks may not be able to differentiate a horse from a person on horseback, the speed and direction of the track will ultimately lead to a correct classification that differentiates horses or cows grazing in a field and a person on a horse attempting to illegally cross the border.

The sources of interference will depend upon the type of sensor system being used. The system noise can be defined for each type of sensor in a relatively straightforward manner and is generally smaller than the ambient noise or clutter (and the TOIs). Given that the system noise characteristics are small and understood, the main limitation of each sensor will be a function of the environment, as well as the range and resolution of the sensor. The ambient noise or clutter will mainly depend on the atmospheric, topographic, and terrain (both natural and man-made) features. There will be some sources of ambient noise/clutter for which each type of system may not operate effectively or operate with degraded performance. However, by combining two or more sensor systems, which are affected differently by the ambient noise/clutter, will help mitigate such problems. These problems might also be mitigated by different looks of the same system. As an example, the performance of the non-coherent X-band radar being proposed will not be affected by rain or moisture whereas an IR system might be. Therefore, the radar will be able to detect and track the target even though the IR system may not. As another example, a terrain feature that masks detection of a target from one look angle can be mitigated by using a second sensor system mounted on an adjacent tower with another look angle. The use of the preferred embodiment from multiple towers is to maximize coverage and enhance performance. As another example, a target track might be temporarily lost due to high ambient noise and regained again once the target moves through that region of high noise. The radar propagation model, which can be used to predict such location, can also be used in the tracking algorithm to regain any temporary losses of the track. For some conditions, however, the combination of sensors might not work and the Command, Control, Communications, and Computers (C4I) display software will identify a potential lost target and wait for it to re-appear. In this later instance, other sensors and sensor platforms might be required such as an EO camera or a UAV or a mobile radar system.

In the Outer Zone, the objective is to detect and track any target present with the radar. Since the resolution cell within a radar dwell is generally larger than people and about the same size as a vehicle, generally, it will not be possible to determine the number or type of targets and whether they are real (e.g., a person or vehicle) or false (e.g., an animal). Some classification with the radar will be possible, however, and will be useful in supporting classification by the LWIR sensor system. Such parameters such as the speed or size of the target will be useful in a $1^{st}$ stage classification. Clearly, a target moving at 40 mph is not likely to be a person, but rather a vehicle. A target path at 40 mph for an extended period of time that is aligned with a road is more likely to be a vehicle than an animal.

The main source of interference for the radar is mainly ground clutter, which is affected by vegetation, manmade structures, topography, etc. In addition to the ground clutter, terrain and manmade features may hide or partially mask the targets of interest. Weather, however, is generally not a problem for the radar being used in the preferred embodiment, but may impact the performance of the LWIR sensor.

Classification occurs when the LWIR camera with coverage in the Inner Zone is cued to the detection and track of a target provided by the radar. The LWIR system will pick up the detection, classify it to verify that it is a real target vice a false target, and then track it until directed to another target of interest. The radar will continue to track the target of interest, and in addition, might also acquire new or re-acquire old targets.

The people and the vehicles that intend to cross the border may be attempting to confuse the sensors by crawling, moving in random patterns, stopping and starting, or hiding behind man-made or topographical features. Many of these activities are also possible for people and vehicles in their normal activities. In most instances, an estimate of the number of people in a group can be made as demonstrated in recent field tests. The processing method will be designed initially to distinguish small groups from large groups. A more detailed count can be made as the targets get close to the border and are sensed with more resolution.

At any time after a target has been classified, a movie clip or single images can be turned over to an operator for review and evaluation. If the operator believes that the target is real, the operator will have enough track and discrimination information (1) to immediately dispatch border patrol agents for apprehension at a pre-computed intercept point for the radar track. The operator may also decide (2) to continue tracking the target until an agent becomes available to intercept and apprehend, or (3) to dispatch an unmanned asset (a) to provide another sensor input or (b) to provide continued outer region tracking and discrimination until intercept, or (4) to dispatch an agent and an unmanned asset. Any mistakes made by the operator, which are ultimately determined by border patrol agents as not a person or vehicle will be classified as false targets. The decision by the operator to launch an unmanned tracker asset and/or to dispatch agents to apprehend the people or vehicle(s) will be made before the person(s) or vehicle(s) leaves the Inner Zone (Red Zone) and enters the Outer Zone (Green Zone). This approach allows a human operator to make the final decision about a target, but does not require and tire the operator to review around-the-clock sensor data. The approach presents information, not data, for decision making. In summary, the radar will detect and track people and vehicles in both the Outer and Inner Zones (Blue, Green and Red Zones) and the LWIR/EO sensors will detect, classify and track people in the Inner Zone (Red Zone). This system can be configured to also inform operators of staging individuals or groups of people before they get to the border allowing border agents to pre-position themselves for deterrence and/or apprehension.

During tower-sensor placement the topography will be mapped to ensure optimal sensor placement and line-of-sight coverage. A tracker display screen will map the position of moving targets onto the standard Commercial/Joint Mapping Tool Kit (C/JMTK) for operator situational awareness using a commercial internet-like user environment modified to include a radar propagation model, which includes the effects of multipath. While the primary intent of the border system is to automatically detect, track and classify moving targets in real-time, additional analyses can be conducted in real-time to improve the detection, tracking or classificiation capabilities. For example, a source-sink analysis of radar tracks will determine the probable location of tunnels or hidden pathways across the border and automatically recommend locations for additional unattended ground sensors (UGS). The final surveillance system will also provide the fusion of radar data from up to five adjacent towers to more accurately track targets and better locate them in regions shadowed by terrain. As part of the final surveillance system concept, a supercomputer technology such as the IBM® Cell Broadband Engine® supercomputing technology, will be used. This technology will be a key element in performing local processing of high performance algorithms at each tower.

A flat earth analysis is being assumed initially in all of the signal processing performed on the recent field tests, but actual topography will be included as required to enhance performance. If it were not, elevation would adversely impact the detection performance (aside from hiding the target) if there are significant elevation differences in the field of view, because the range to the target is not well known.

Some practical scenarios for detection, tracking and classification of people and vehicles in the Outer Zone and the Inner Zone, which includes the border, were considered in the system development and are described below. While the list is not exhaustive, it is representative of many of the detection, tracking, and classification challenges.

A number of scenarios for the Outer Zone are presented below.
  (1) People in vehicles driving on existing paved or dirt roads.
  (2) People in vehicles driving on existing roads and moving off-road on known or unknown paths before entering the Inner Zone
  (3) People in vehicles driving on or off existing roads that stop the vehicle and move on foot in the Outer Zone and possibly crossing into the Inner Zone
  (4) People or groups of people moving on foot on known roads and pathways
  (5) People or groups of people moving on foot on known or unknown paths in the Outer Zone and possibly crossing into the Inner Zone A number of scenarios for the Inner Zone are presented below.
  (1) People in vehicles driving on existing paved or dirt roads
  (2) People in vehicles driving on existing roads that get close enough to the border to stop and attempt a crossing on foot individually or in groups in open terrain
  (3) People in vehicles driving on open terrain or makeshift paths
  (4) People in vehicles driving on open terrain or makeshift paths that get close enough to the border to stop and attempt a crossing on foot individually or in groups in open terrain
  (5) People in vehicles driving on existing roads and moving off-road on known or unknown paths before stopping and attempting to cross the border on foot individually or in groups
  (6) People attempting to evade detection by hiding in buildings or in masking terrain with little or no movement for prolonged periods of time (i.e., at least long enough for the processor to lose a track)

Performance Requirements. In the course of developing the smart sensor system and system architecture, a set of performance goals for detection, tracking, and classification were developed in terms of $P_D$, $P_{FA}$, and $P_{FT}$ for specific targets and target environments.

As a goal, we set the $P_D$ to be $P_D \geq 99\%$

TABLE 1

Summary of the System Analysis of Classification $P_{FA}$ of the LWIR Sensor and the $P_{FT}$ of the Total System

| | |
|---|---|
| 200 | targets per hour |
| 0.25% | FA |
| 0.5 | FA per hour |
| 10 | towers |
| 5 | FA per hour |
| 24 | h per day |
| 120 | FA per day |

TABLE 1-continued

Summary of the System Analysis of Classification $P_{FA}$ of the LWIR Sensor and the $P_{FT}$ of the Total System

| | |
|---|---|
| 12 | min per FA |
| 0.50% | FT by Operator per day |
| 0.6 | FT per day |
| 0.001% | FT | and the $P_{FT}$ to be $P_{FT} \leq 1$ false target every two days (for a 10-tower system), where a false target is a target incorrectly identified as a real target by an operator after assessing the targets visually in the LWIR video image clip provided by the automatic processor. The requirements for the "cued" LWIR sensor were developed assuming that the operator would be presented with no more than 5 false alarms per hour over a 10-tower sector (i.e., no more than 1 false alarm every 12 min). The analysis further assumed 200 targets per hour being classified by the automated algorithms. This results in a $P_{FA} \leq 0.25\%$ and a $P_D \geq 99\%$. Thus, the $P_{FT} \leq 0.50\%$ for the operator based on the visual assessments presented. Overall, the smart sensors and the operator would achieve a probability of rejecting false targets of $(P_{FT}*P_{FT}) \leq 0.00125\%$. The analysis is summarized in Table 1.

The performance for the radar, the cued LWIR sensor, and the operator are summarized below and in Table 2. TBR means that the capabilities are within scope but needs "To Be Resolved" for each specific area through additional work.

Radar Tracker Probability of Detection ($P_D$). Radar $P_D > 99\%$ for Radar Contacts (TBR) in for the Southern Border environment (TBR).

Probability of Radar False Alarm ($P_{FA}$). $P_{FA} < 0.000001\%$ for Radar Contacts (Goal, TBR) in the Southern Border environment (TBR)

Probability of Correct Classification by the $2^{nd}$ Stage Radar-IR Classifier ($P_{CLASS}$): $P_{CLASS} > 99\%$ (TBR, correct classification for TOI that have been previously detected and cued to the IR sensor system in the Southern Border environment)

Full Performance Range of the $2^{nd}$ Stage Radar-IR Classifier on a Single Walking Human or Group of Walking Humans: 5-6 km (TBR, when there is at least 5 dB of usable contrast using a next generation 15µ Long Wave IR camera in the Southern Border environment)

Full Performance Range of the $2^{nd}$ Stage Radar-IR Classifier on a Moving Vehicle: 6-8 km (TBR, when there is at least 5 dB of usable contrast using a next generation 15µ Long Wave IR camera in the Southern Border environment)

Probability of False Alarm ($P_{FA}$): <0.25% (TBR, previously detected targets incorrectly classified by smart sensor algorithms in the $2^{nd}$ Stage Radar-IR Classifier as a TOI)

Probability of False Target ($P_{FT}$): <0.001% based on all targets detected by the smart sensors and presented to the operator for visual assessment (TBR, targets incorrectly classified as a TOI by an operator)

TABLE 2

Summary of the Performance (TBR) Required by Each Sensor and the Sensor Suite

| Sensor | $P_D$ | $P_{FA}$ | $P_{FT}$ |
|---|---|---|---|
| X-band, Non-coherent Radar | >99% | <0.000001% | |
| Narrow, FOV LWIR sensor cued by the radar | >99% | <0.25% | |

TABLE 2-continued

Summary of the Performance (TBR) Required by Each Sensor and the Sensor Suite

| Sensor | $P_D$ | $P_{FA}$ | $P_{FT}$ |
|---|---|---|---|
| After Operator's Visual Interpretation of the cued LWIR Video Clips | >99% | | <0.001% |

The Southern Border. The Southern Border of the United States is comprised of a wide range of terrain, topography, and environmental conditions in which the smart sensor system will need to operate. (For example, the general conditions are not very different than might be obtained when using the system for military and DOE facilities.) FIGS. 10-13 illustrate a range of conditions under which the proposed sensor suite is intended to operate. FIG. 10 shows an overview of a region of the southern border. Note that a road or path runs approximately parallel to the border. In FIG. 11, the mountains are about 5 km away from the camera. Note the undulating terrain that will provide many blind spots to the radar or the LWIR system. However, in general, while people or vehicles may be temporarily masked, their tracks can generally be obtained. If not, other sensors (e.g., UGSs) and/or sensor platforms (e.g., UAVs or mobile radars) can be used to address these blind spots.

FIG. 12 illustrates the border marked by a simple barbed wire fence with a dirt road running approximately parallel to the border. FIG. 13 illustrates one of a number manmade footpaths developed by excessive traffic leading to the border.

Concept of Operations. As presented in FIGS. 2, 3, and 9 above, the smart sensor system architecture concept of operations relies on an impermeable sensor barrier along the borders, based on a fixed, tower-based, multi-sensor system that is augmented with smart sensors on vehicles/mini-UAVs and the use of Unmanned Ground Sensors (UGS) for extending the sensor barrier depth and covering gaps due to terrain or equipment failures in the fixed sensor grid. The smart sensor barrier is tuned to detect, track, and classify ALL MOVEMENT through this border barrier region. The smart sensor system will minimize the number of required operators around the country (and allow more agents to work in the field) through automation of the wide area detection, tracking, classification, and multi-sensor Bayesian Fusion processes through the use of embedded supercomputing algorithms co-located with the sensors. The smart sensor systems will significantly improve $P_D$ by eliminating operator fatigue as a factor in detection equation. It will also reduce raw sensor imagery, clutter, and false alarms by factors of over 1,000,000-to-1 through algorithmic filters of target-specific and Blue Force border activity in a nationwide, internet-based Common Operating Picture. The first information step will be wideband wireless links from the remote sensors to user facilities and access to the internet-based COP. The system will also support more effective agent intercepts through wideband reporting of "actionable information" directly to agents in the field with wireless handheld devices supporting data formats and filtering tailored to each agent's specific desires for his/her assigned missions. Both target-of-interest (TOI) information and Blue Force information will be reported on agent handhelds for improved agent situational awareness and agent safety.

Components comprising the smart sensor system architecture are described briefly below.

Wide area, All-weather, X-band Non-Coherent Radar on Towers. The radar will provide 360° automatic detection and tracking of walking people, groups of people, horses, and moving vehicles in diverse clutter environments, when not obscured by terrain or foliage. The towers will be placed to maximize the look characteristics against different target types and tracks, within the site-specific constraints such as terrain and foliage.

Wireless Communications and User Facilities. The User system will display near real-time smart sensor data communicated via wireless links to User facilities within line-of-sight of sensor towers. User displays will use standard C/JMTK mapping systems in the User facility.

Wireless Handheld Agent User Systems in the Field. The smart sensor system will provide direct sensor-to-agent display of near real-time smart sensor data and alerts using handheld devices for agents while operating in the field within line-of-sight of the sensor towers.

Cued, high resolution EO/IR cameras on Towers. The LWIR (and EO) sensor systems will provide automatic detection, tracking, and classification of moving targets in non-obscure environments, and will remember the position of stopped targets that have previously been identified by the system.

All-weather X-band Radar on Mobile Agent Vehicles. The smart sensor system can be installed on a mobile vehicle to provide 360° extended tracking radar coverage that is used by agents in the field and supports the Apprehension Team. The purposes of this mobile sensor system include extending the depth of the fixed tower sensor grid for the purpose of longer duration tracking of targets of interest, as well as rapid response to fill gaps in the fixed sensor grid. The system can be driven to the off-road operating point using a 4WD vehicle, erected on a mast, and operated within minutes when using a narrow-beam radar with a large antenna and while moving when using a wider beam radar with a small antenna.

EO/IR Tracker on Small Aircraft and/or mini-UAVs. The smart sensor system or components of it can be used to provide extended day-night tracking coverage through apprehension, including across extreme terrain environments, using airborne IR systems. A light-weight IR sensor can be installed and operated from mini-UAVs that are launched from the back of a 4WD pickup in the field, automatically fly to immediately overhead the target, automatically track the target and report to agents, and automatically return and land at a sector airstrip for refueling and reuse.

Cued, Coherent Radar Classification on Towers. A coherent radar can be used to provide automatic Doppler classification using spectral analysis techniques. This will extend the range of each tower's target classification capability, and can, if needed, provide a classification capability when EO/IR is obscured.

Smart Sensor Field Test Results. A set of field tests were conducted in Salinas, Calif., to demonstrate various aspects of the preferred embodiment of the smart sensor system. The analysis of the radar and LWIR data collected, when combined with some radar and IR performance modeling, support the high level of performance required for effective management of the border. For both the LWIR and non-coherent radar tests, people and vehicle targets were detected and tracked at ranges of up to 2.1 km; in addition, people and vehicle targets were properly classified with the LWIR sensor at these ranges. These short ranges are mainly due to the low elevation of the radar and LWIR sensors used during these tests (i.e., 2 m). The analysis of the LWIR demonstrates that the targets of interest (people and vehicles) can be detected tracked, and classified automatically. The LWIR field test results indicated that all 44 of the people walking alone or in groups at distances up to 1.8 km were detected, tracked, and properly classified when the number of pixels on the target were 15 or greater. These tests were designed to be a demonstration of method effectiveness. Greater radar and LWIR ranges will be achieved with (1) the deployment of the radar and LWIR sensor at greater heights and (2) the deployment of the latest version of LWIR sensors.

The preliminary performance estimates made from field test are based upon a non-coherent, X-band radar (Furuno USA, Inc.), a narrow field-of-view LWIR sensor (DRS Technologies, Inc.), and several signal processing methods. For the field tests conducted, the LWIR sensor system performance is independent of and does not take advantage of the performance gains of being cued by the radar.

TABLE 3

Furuno ® Radar Characteristics

| Frequency | X-band |
|---|---|
| Transmit power | 25 kW |
| Antenna diameter | 10 ft |
| Beam width | 0.75° |
| Detection ranges | |
| Automatic target acq | 5.5-6 nm |
| Track acquired targets | 0.1-32 nm |
| Target location accuracy | |
| Range | 1% of range |
| Azimuth | <2.5° |
| Environmental | Marinized |

TABLE 4

LWIR Characteristics

| Array size | 480 × 640 |
|---|---|
| Frequency | 7.5-10.3 microns |
| Frame rate | 30 Hz/60 Hz/120 Hz |
| Field of View | 1.2°-0.9° |
| Pixel size | 15 microns |
| Integration time | 2 ms |
| No smear scan rate | 5°/s |
| Power | 20 W @71 |

Tables 3 and 4 summarize the characteristics of the Furuno® radar and the LWIR sensor system used in the Salinas, Calif. field tests. The LWIR sensor used for data collection is an AN/TAS 4(x) FLIR. As indicated above in FIG. 6, performance will be increased using a new LWIR sensor system with sufficient performance enhancement to increase the range by a factor of three.

The most accurate and reliable method of determining the performance of a sensor detection system in terms of $P_D$ and $P_{FA}$ is to collect enough actual data with the sensor detection system (including data fusion and all operator inputs) with all known sources of interference (system and ambient noise/clutter) and with and without the targets of interest in the coverage of a detection system to estimate histograms of the noise and the signal-plus-noise. Different estimates of performance may be made to properly reflect the ambient noise/clutter conditions of interest for a particular operating area as a function of range, movement, weather, terrain/ topography, and man-made features. Obviously, a comprehensive performance estimate can be a very large undertaking and is usually best made once the actual sensor system is deployed and operated. However, before deployment of a sensor system, a reasonable estimate of the performance of the sensor system needs to be made. The $P_D$ requires than many measurements be made on each type of target in all of the same noise conditions used to define the $P_{FA}$. Simplistically, if a $P_D$ of 99% of detecting a single person in a certain amount of time is desired, then data on a single person over the full range of conditions used to define the background noise/clutter conditions and movement conditions needs to be acquired.

This approach evaluates the sensor system, including the signal processing, and its operational implementation. Any changes to these parts of the system, especially the signal processing, will change the performance of the system. The field tests were implemented using a non-real-time system. The performance of the system will improve as more data and operating environments are acquired. The results of the field tests demonstrate that an automated algorithm can perform the visual pattern recognition previously accomplished by visual inspection by a trained person. The algorithm automatically processes video clips previously acquired and outputs continuous displays of detections and tracks of people and vehicles that are properly classified. This accomplishment is significant, because when combined with the operator's visual inspection on targets suspected of illegally crossing a border (ultimately the final step before a decision to apprehend a border crossing), a very robust system performance can be achieved.

Our approach for estimating performance is comprised of two steps. First, a combination of modeling and some limited field data will be combined to make one or more preliminary estimates of the performance for a specified set of conditions. Second, one or more border regions that typify the overall surveillance conditions will be selected for a field estimate of performance using the sensor system suite. The performance estimate presented herein is based on the former; more field testing will be performed to develop performance estimates based on the latter.

A discussion of the radar, the basic processing approach, a discussion of the results obtained from processing some of the images that were obtained from detection and tracking movies, and an estimate of performance based on model estimates of ROC performance curves are presented below. A similar discussion is presented for the LWIR sensor. In addition, sufficient target ground truth was available in the LWIR movies to make a very preliminary estimate of the probability of detection and the probability of false alarm.

Radar Modeling and Field Test Results. An illustration of the type of performance expected for the non-coherent radar smart sensor is presented below. First, model estimates of radar range versus tower height as a function of signal-to-noise ratio (SNR) are made using a radar propagation model. Second, a high level view of the signal processing is presented. Next, a few illustrations of the output of the signal processing for detection and tracking of people and vehicles are presented. Individual images obtained from several movies are used to illustrate the capability. Fourth, preliminary results of the receiver operating curves (ROCs) are presented for the detect-before-track Bayesian algorithms.

Radar Detection Range on a Walking Human. The performance of a given radar is ultimately dependent on the effects of multipath, the clutter environment, and the signal processing strategy implemented to address these effects. The effects of multipath can be modeled with assumed or measured terrain and atmospheric conditions. The clutter is highly inhomogeneous and generally well above the receiver noise level. In most instances, the clutter level, not the noise level of the radar, limits the performance of the radar. The noise floor, however, is the performance limiting factor at long ranges.

The maximum detection range that can be achieved for a single walking human or a moving vehicle is dependent upon the site-specific terrain and the sensor height above the ground. To develop design requirements for the tower height and spacing, an analytical estimate of the signal-to-noise (SNR) of a radar was made as a function of range and tower height for a 25 kW radar and target cross sections of 0 dBsm at a height of 5 ft (where 0 dBsm corresponds to the return of a target with radar cross section (RCS) of 1 $m^2$), which is readily scaled to the actual RCS range of human and vehicle targets. The analytical estimate included the effects of the constructive and destructive multi-path interference with the ground and surface roughness. The reference calculation is shown in FIG. 14a.

To conservatively estimate the detection range for a person, and therefore, tower height and tower spacing, it was assumed that the radar would yield high performance if SNRs of 10 to 20 dB were maintained. For tower heights between 40 and 100 ft, the radar range for detecting walking humans can be estimated by following the appropriate signal-to-clutter contour in FIG. 14a. For a 40-ft tower, this results in a range of 6 km. For a 100-ft tower, radar ranges of 8 to 10 km are indicated. We expect that the range of the proposed radar, when completed, will be accurately predicted using the curves in FIG. 14a that are as low as 10 dB, which yields single person detection ranges in excess of 10 km (when not blocked by terrain or foliage).

This radar model was extended to include the effects of terrain and was used to make an analytical estimate for the line-of-sight visibility and the radar propagation for the Salinas, Calif., site used in the radar and LWIR field tests described below. FIG. 14b shows the line-of-sight visibility of a 5-ft-target from a sensor placed on top of a car at an elevation of 5 ft out to a range of 6 km. The black areas indicate where a person cannot be observed because of obstructions due to terrain. FIG. 14c is the analytical result for the radar for the same target out to 6 km, where the SNR of the radar is shown in the colors between 0 and 70 dB; the black areas represent terrain obstructions where no return is obtained. These model output displays will change, for example, for larger or smaller targets, for different elevations of the sensors, for different sensor properties, etc. The implications of both of these model computations, which will only get more sophisticated and complete over time in terms of added background (e.g., foliage, atmospheric conditions, etc.) and added sensor capabilities (e.g., more comprehensive propagation physics, multiple looks from different angles), are very significant. The computations can be output for sensors used alone or in combination and from one or more locations or elevations. First, such models can be used to sight the optical sensors using the line-of-sight visibility model and the radar using the radar propagation model for one or several sensor locations. These models allow the positioning of other assets (e.g., mobile platforms) to cover places where the sensors are blind to the target. Second, both model outputs can be used to improve target detection. In areas, where the SNR is low, a more comprehensive signal processing algorithm may be implemented. Knowing where to implement the more complex and computationally intense algorithms is important to response time and computer requirements. Such model computations can be used to improve the algorithms used to not only detect targets, but can be included in the real-time processing to improve performance. Third, both model outputs can be used to improve target tracking, because the areas where a track may be lost can be predicted a priori and be used to improve the coasting algorithms used to allow a lost track to be regained. If a target is moving towards an area where either the optical or radar visibility is degraded or lost, better projections on the time and location to regain the track. Such model computations can be used to improve the algorithms used to track targets and can be included in the real-time processing to improve performance. Fourth, such models can be used to investigate operational scenarios, where the target may attempt to foil detection and tracking by crawling, walking slowly, changing speeds, following/hiding behind terrain features. While all four of these uses are important, the integration of such models in the automated, real-time detection, tracking, and classification processing can lead to significant improvements in performance of the smart sensor system.

Radar Detection Range on a Moving Vehicle. The radar range that is achieved for a moving vehicle is also dependent upon the site-specific terrain and sensor height above the ground. A similar set of curves can be generated for a vehicle with an assumed cross section of 10 dBsm. Ranges of over 10 km are achieved at a tower height of 40 ft assuming a 10 dB SNR (when the vehicle is not blocked by terrain or foliage).

Radar Performance. The algorithms implemented as part of the present invention include Space-Time Adaptive Processing (STAP), data mapping to ground-fixed coordinates, data linearization and filtering, peak detection, association and tracking, track management, likelihood accumulation, track filtering, declaration, and display. Distinguishing characteristics of the clutter reduction algorithms include replacement of simple CFAR with likelihood-based scaling. The algorithms use advanced 3- and 4-dimensional (2-D and 3-D spatial plus time) Wiener filters to remove clutter based on complex spatial and temporal structure inherent in the clutter. Filters are adaptive to the actual data environment being observed and system performance gains are dependent on sensor characteristics and clutter statistics.

Both theoretically-based and empirically-driven signal processing methods have been used to detect the targets of interest (e.g., people). Two theoretically-based detection processing methods have been implemented and tested. The first method is to develop probability density functions (based on theoretical statistical models or empirical histograms) for the noise/clutter and the signal-plus-noise/clutter and to set a threshold to achieve an acceptable probability of false alarm (or false alarm rate) and a certain probability of detection against each type of target of interest. The analysis of the radar data used to evaluate this method suggests that better performance can be achieved because the noise and clutter characteristics are different for each resolution cell or groups of cells, sometimes dominated by noise and sometimes dominated by clutter. Improved performance can be achieved by determining the noise/clutter characteristics for each resolution cell, and once this is accomplished, set different thresholds based on the probability density distributions for each type of noise and clutter characteristics. Thus, the resolution cells can separated into clutter-dominated cell and clutter-absent cell (i.e., system noise). The class clutter-dominated cells can then be further partitioned into low-medium- and high-variance cells. The data collected to date suggests that a majority of the resolution cells are dominated by system noise, which is lower and easier to characterize than clutter, and results in very high performance. This is manifest, because the radar is operated at low low-grazing angles. This method can produce very high probability detections with very low probability of false alarms.

If the data behavior cannot be defined, another approach is use a totally empirically-based approach. For example, a "CFAR" approach can be used, wherein a threshold is applied for each resolution cell for a given false-alarm level and some ad hoc method (m-of-n, for example) is used to declare valid tracks and reject false ones. Such a data-driven detector is robust, can adjust to differences in site topographies and other characteristics, and automatically adjusts to unmodeled effects. This approach does not require a detailed understanding of every source of interference. The main significant disadvantage is that the training process must estimate an entire distribution function rather than merely some parameters conditioning it, and furthermore, what substitutes for an analytical log-likelihood ratio (LLR) is a table-lookup function. The actual approximation, however, as compared to the optimal one is good.

The second method is a Track-before-Detect method. A Bayesian, Log-Likelihood-Based, Track-Before-Detect signal processing method for processing the radar data was implemented and tested. The field test results illustrated below using this processing method. The track-before-detect processing method is used to suppress clutter and find targets in radar data without any detailed knowledge of the noise or the clutter. The operation of the track-before-detect system calculates a likelihood ratio and bases track confirmation on the growth of this likelihood ratio to a declarable threshold. The likelihood ratio is computed by using Bayes' Rule, which allows sequential updates of likelihood as each new observation is acquired.

Two thresholds are used. The first threshold is set very low to allow a large number of contacts, mostly non-targets, to be detected. The statistics from some pre-determined fraction of all radar cells are processed as possible contacts on every 360° sweep, whether those cells truly contain targets or not. Contacts ($N_{contacts}$) above the first threshold, which are most likely to be associated with current tracks, are retained from sweep-to-sweep; all other contacts initiate new tracks. This first threshold insures that "almost" all of the targets of interest present in the radar field of view will be detected. This very high false contact rate is mitigated by the track-before-detect algorithm, because the return from non-targets will be random and will be eliminated because such events will not generate sufficient likelihood to be declared as true targets. Only the tracks that build up (likelihood) in excess of a second threshold become "detections" (hence the term "track-before-detect"). Many thousands of false contacts may be allowed. It is important to note that these initial detections or contacts will be further processed for classification and ultimate action. The track-before-detect signal processing algorithm, if properly implemented, can achieve the best possible performance given the available data.

As stated above, the probability of detection of the radar ($P_D^{radar}$) is controlled by setting the threshold of the detection statistics (i.e., the first threshold threshold) low enough to capture real targets, but without encountering an overwhelming number of candidate contacts. Achieving a satisfactory value for $P_D^{radar}$ requires that target SNR being sufficiently large (or at least comparable) to fluctuations in the clutter return. The second threshold is used to actually declare the presence of a target; the probability of detection and the probability of false alarm of the radar are functions of both thresholds.

FIG. 15 summarizes the major steps involved in the radar processing. From a purely algorithmic structure perspective, both the LWIR and radar systems operate on time-tagged sequences of sampled data frames or data segments, respectively, comprised of 10,000 to more than one million samples. The LWIR systems generate frames at 30 frames per second. Surveillance radars deliver sectors at 24 to 42 sectors per second. The data are presented in data-space coordinates (vertical and horizontal angles for LWIR, and range and azimuth for radar).

Each data frame has an associated intensity field that has potential target contributions and background (non-target) contributions. System noise sets a fundamental uniform limitation on target detection. The non-uniform and environmentally sensitive structure of non-target energy in the data field is more critical. System performance depends on instrument sensitivity, noise, resolution, and overall instrument quality. One figure of merit is the minimum detectable signal in a resolved cell. A detectable target at a specified distance from the source must deliver at least that much energy. It is assumed that any pre-processing integration necessary to achieve the minimum detectable signal requirement has been performed prior to data capture.

Registration, Data Collection and Segmentation. All data processing operations depend on accurate frame-to-frame identification of persistent features. Both instrumental and environmental factors can cause artificial displacements of the features that appear as image motion. The detection algorithm must reduce these errors to a prescribed level to meet performance objectives. Surveyed landmarks in the scene, either natural or manmade, will be used as required.

Once data frames are registered, system specific operations that facilitate subsequent algorithmic operations are performed. These include constant background removal, pre-filtering, and noise background estimation. These operations provide small but important performance enhancements. Data conditioning might also include system performance monitoring and calibration operations.

Segmentation is the formal process by which registered and conditioned data frames are translated into detection fields. The detection field intensity, S, consists of uniform noise, N, a non-uniform background I, and target energy T. Often I is the dominant component. The signal to interference ratio $SINR_0=S/(S+I)$ can be very small where non-target energy dominates. The purpose of segmentation is to identify the background, which is ideally characterized by the ratio $ESINR_0=S'/N$. To the extent that $S'=T+N$, one has a uniform detection field in the absence of targets. The problem is that segmentation invariably involves some target energy loss and some background leakage. Performance evaluation requires estimation of segmentation signal losses and threshold inflation required to accommodate leakage in all the environments that the system must operate.

Contact Selection, Peak Formation, and Tracking. Once a detection field has been generated and converted to target likelihood units, a threshold can be set to capture all peaks that have sufficiently large single-frame likelihoods to be considered as target candidates. In most situations, the peaks that exceed a threshold have contiguous neighbors that form clusters. Clusters are usually assigned a single location that is passed to the tracker as a "contact." As consecutive frames are processed, the tracker assigns new contacts to existing tracks or initiates new tracks. The formal procedure uses a Kalman filter and a motion model to predict where the next contact in an active track should occur. The metric distance between the nearest contact and its expected location provides the basis for cumulative likelihood computation. A matched filter can also be applied at this stage to maximize the signal to background noise ratio.

Target Detection and $1^{st}$ Stage Classification. A target is detected once a high-confidence track has been developed. The first stage classifier for the radar distinguishes humans from say animals or coincidentally moving small objects and vehicles of various types. This information is potentially contained in the shape of any resolved targets, their size, and how the targets move relative to the surface. Such features can be converted into metrics that have some discrimination power. More subtle features include shadows and radar sidelobes. These first-stage classification decisions are useful in supporting the prioritization of LWIR sensor cueing and LWIR sensor resource planning by greatly reducing the burden of looking at false targets that can be readily identified from radar-only returns (e.g. vehicles). Pass-through of data (from radar processing to the cued LWIR processing) such as the precise range to targets, accurate estimates of the in-range velocity components, and general indications of radar cross-section substantially improves the performance of the second stage EO/IR classifier.

Radar Field Test Results from Salinas, Calif. The performance of the smart sensor system (non-coherent, X-band surveillance radar cuing a narrow field-of-view LWIR sensor) was demonstrated with data obtained in a field test in Salinas, Calif., with the radar and the LWIR camera operated on a river levee. The tests were conducted with mountains, farm lands, levees, a river, and many vehicles and people and vehicles moving on paved and dirt roads and in the fields.

Two separate tests were conducted, one with the narrow-FOV LWIR sensor and one with the Furuno® radar. The purpose of both the LWIR and radar tests was to determine how well each sensor system could detect, track, and classify known targets of interest. It is important to note that the performance achieved in these tests for the LWIR sensor was independent of the radar cueing the LWIR sensor.

The radar detection and tracking movie depicts registered radar returns for the Furuno® radar mounted on top of a SUV parked on a Salinas River Levee (elevation of 6 meters above the fields). The number of ground-truth targets in the radar tests were limited to one SUV equipped with a GPS unit, three radar reflectors of known cross section (0, 2.8, and 5.3 dBsm), one field person, and several field hands identified during the tests. FIGS. 16 and 17 show the analysis area for the radar tests. FIG. 18 presents a satellite image of the test area. As illustrated in FIG. 17, the dark areas behind radar are due to obscuration by the tree line along river bank. The annulus of returns represents only 4% of the total coverage capacity for this radar. The test results illustrated in FIG. 17 were limited to ranges of ~2 km to take advantage of the road and levee system. The scene represents a broad mix of low, moderate, and high clutter backgrounds. The analyses included raw movies and processed movies demonstrated that The radar could detect and track 0 dBsm (1 m²) targets (people) and 10 dBsm targets (SUVs).

The LWIR camera could detect, track, and classify people, groups of people, and vehicles out to 2 km accurately and reliably with a LWIR narrow FOV sensor.

The single-image results shown in the figures do adequately do justice to the performance being achieved. The movies can be provided and are and incorporated into this patent by reference. The single images shown in FIGS. 16, 17, 19-26 were obtained from radar movies, and the single images shown in FIG. 36 and FIGS. 41-43 were obtained from LWIR sensor movies.

FIG. 18 shows the position of the LWIR camera and the various movie scenes processed from a field test conducted on 6 Jun. 2006 to determine the ability of the LWIR camera to detect, track, and classify people and vehicles. The camera was stationed on a tripod situated close to the location of the radar in the previous experiment (on the river levee). Seventeen (17) movies scenes were processed with moving human targets and vehicles located from 300 to 2100 meters downrange from the camera. In the LWIR tests, one or more of the company's staff (up to four) were asked to walk across the scene at different ranges during different tests or scenes. In addition, other people targets were identified during the field tests. As a consequence, over 40 known targets were present in the various scenes processed.

FIG. 19 shows a smaller region of the radar coverage (region of interest (ROI)) that contained ground truth markers (i.e., corner reflectors). The data were obtained with a 10.5 m range resolution and a 0.95° azimuth resolution. The 125 m radius zone surrounding radar is excluded to avoid saturating returns. The ROI is comprised of 8,580 radar cells (60° in azimuth and 1.430 km in range extent).

FIG. 20 shows a blank radar field in the ROI during the period while the algorithm pipes up to perform detection processing. The clutter statistics are sampled for a 30 frame pipe-up period before peaks are determined. The peaks attributable to both humans and vehicles will be visible. This is illustrated in FIGS. 21 and 22.

FIG. 21 shows an image of the ROI for raw radar data, and FIG. 22 shows an image of the ROI after clutter suppression. The white spots on the image are false contacts that occur because the threshold is set low enough to insure all real targets are captured. These false contacts come and go randomly and are not mistaken for real targets because they do not form tracks as the real targets do.

FIG. 23 illustrates the output of the tracker at a point in time superimposed on the satellite image. The green track (squares) is the SUV equipped with a GPS unit for these tests. The speed of the target combined with a track that follows the road is used for $1^{st}$ stage classification indicating that the target is a vehicle vice a person.

Humans Walking. An analysis of the environmental conditions indicated that the tests were conducted under low, medium, and high clutter environments for both the radar and the LWIR that were comparable to those that would be encountered at the Southern Border.

The radar tests were performed with reflectors (0, 2.8, and 5.3 dBsm) that were indicative of people and vehicles. The tests included people walking in the vicinity of the 0 dBsm reflector that were detected and tracked. By design, the radar tests were only conducted with calibrated targets out to 2 km.

FIG. 24 illustrates two radar images captured from a two-minute video. The top of FIG. 24 shows a curious farm worker coming out of the field and walking on the road towards a 0 dBsm reflector. The reflector and the person have about the same cross section. The track and the position of the SUV that stopped twice in the scene shown to place reflectors on the road are also shown. The bottom of FIG. 24 shows the farm worker returning to the field. Again, the slow speed and irregular path of the human vice the high speed and road-based path of the SUV distinguishes at a first level a person from a vehicle.

High Clutter Radar Measurements. The circled "arc" center portion of the left image obtained from the radar classification movie shown in FIGS. 25 and 26 is a road that illustrates a region of high radar clutter. (The road is an arc, because the image is captured as samples in a polar coordinate space, but are represented in the form of a rectangular field here.) The left image in each figure is the radar return, and the right image is the processed image after the clutter rejection algorithm has been applied. The left image in FIG. 32 shows that the road is a region of high clutter. If the movie is viewed, no vehicles are observed moving along this section of the road (as are observed in other sections of the image), because the radar clutter is too strong. FIG. 26 illustrates the same region a short time later. The automatic algorithm has detected and established a track on the vehicle. The track is superimposed on the image.

An analysis was performed to determine the level of clutter present during the Salinas field tests. FIG. 27 shows the clutter and noise background in the farm-land area. The highest level of peak clutter occurred in the farmland area where the targets were deployed during the field tests. In the hill region southwest of the farmland, the clutter is more homogeneous. FIG. 28 shows the contacts above 10 dB in a radar scan with no clutter rejection applied. The contacts denoted by the circles in the figure ranged from 10 dB to over 45 dB. A total of 336 threshold exceedances were present. FIG. 29 shows the logarithm of the threshold exceedances for the hill area and the farmland area, which establishes the general character of the clutter. The noise level, which is not shown, is below the targets. Without clutter rejection and tracking gain, both people and vehicles could be masked by the clutter in both the hill and farmland areas. Detection is possible because of the use a track-before-detect signal processing method. The strength of this approach was illustrated by the ability to detect a vehicle on the road in FIG. 26 where the clutter completely masked each of the individual contacts or peak detections.

Radar Model Performance Estimates. A preliminary estimate of the system-level performance of the radar in terms of a receiver operating curve (ROC) was made. It was assumed that each scan of the radar is independent, and for the purposes of this preliminary estimate, it was further assumed that the data is Gaussian. The ROC presents the probability that a target will be declared as confirmed after a track-before-detect system has had N opportunities to collect radar contacts from it versus the mean number of false-track declarations that will occur per update cycle (one scan). Inputs are the target SNR, the first threshold (for accepting contacts for passage to the radar), and the number of radar update cycles to permit before a decision of confirm or not-to-confirm is required. In this presentation, we make no attempt to document the assumptions, approximations, or methodology of the model.

Four cases are presented in FIGS. 30-33 below. It is assumed that the total number of "cells" is 360,000: 10 meter range cells over a 10-km range swath and 360 one-degree azimuthal cells over a full circular scan. In all cases, the first threshold for filtering out only the strongest contacts was set to 8 dB, and this resulted in about 655 new false contacts being produced per scan. The first three examples shown in FIGS. 30-32 assume that a total of 9 updates after the original initiating contact are allowed before a decision must be made. The last curve shown in FIG. 33 requires that only 5 be allowed for a faster decision. The SNR values for the four cases are 6 dB, 7 dB, 8 dB, and 8 dB respectively.

As shown in FIG. 30, if a false-track rate of about 0.001 per scan (about 1 every 40 minutes) is allowed, then a declaration probability for a valid 6 dB target is about 60%. When the target SNR is 7 dB, as shown in FIG. 31, the $P_D$ at that FAR is ~85%. As shown in FIG. 32, increasing the SNR another dB to 8 dB raises the $P_D$ to around 97% at this FAR and exceeds 90% even at a FAR value of 1 in 100,000 scans.

Finally, if the same SNR and first threshold values is retained as in the last case, but only 5 updates are allowed beyond the initial contacts, the result is shown in FIG. 33. The $P_D$ at the FAR of 0.001 is now only around 84%; achieving a $P_D$ of 90% now requires accepting a FAR of 0.01-around 1 mis-declared track every 4 or so minutes. This last result is a clear indication of the benefit of suspending judgment about a track's status until the radar system has had as much time as possible to examine the track behavior and produce a well-informed track score.

Radar Detection Range on a Moving Vehicle. A vehicle has a cross-section that is 10 times larger than a person and is moving through radar resolution cells at 10 to 20 times the speed of a person. In comparison to a person or a group of people, a vehicle is much easier to detect and classify. The movies of the radar test in Salinas illustrate that detection of vehicles should be robust.

LWIR Modeling and Field Test Results. A preliminary estimate of performance is presented below for the LWIR smart sensor. First, a high level view of the signal processing is presented. Next, a few illustrations of the output of the signal processing for detection, classification and tracking of people and vehicles is presented. Images obtained from several movies are then used to illustrate the capability. Third, the results of the probability of recognizing a person or a vehicle visually by an operator, which is determined from NVTherm™ thermal imaging model calculations, are then presented. The NVTherm™ thermal imaging model was developed by the Night Vision Laboratory of the U.S. Army. Finally, output target statistics based on the field measurements for over 50 known targets are summarized.

Overview of a high-resolution optical surveillance system. The method used by the optical sensors is philosophically the same as the radar algorithm, except there is significant a priori information available to the optical sensors to make detection and tracking more robust.

Two sets of algorithms comprise the method of the present invention. They exploit the high-resolution electro-optical and long-wave infrared optical sensors to identify and classify subjects of interest within the border region. Two sets of LWIR/EO sensors will be employed. The first set will have a narrow angle of view (<3°) optimized for classification of objects in the outer ranges of the Inner Zone. The LWIR camera employed will be high resolution and cooled. The second set of cameras will have a wide angle of view (25 to 50°) and be used for wide-area surveillance at longer ranges as well as classification at shorter ranges. In addition, a wide angle IR sensor can employed in conjunction with the EO camera using an uncooled micro-bolometer.

There are two optical detection, tracking, and classification operational scenarios to consider. The first and primary mode of operation of the optical sensors is to exploit the wide-area search capabilities of the radar using its track information (i.e., a priori information) to cue the optical sensors. For this implementation, the optical sensor picks up the track presented by the radar by first optically detecting the target and then developing a track. The radar track and the optical track should be closely correlated. Once the track is picked up, the optical system classifies the target to determine if the target is real, how many targets are present, and what the target is (e.g. human or vehicle).

The second mode of operation is to independently detect, track, and classify without the benefit of a radar track. This might be needed for very slow moving targets, targets initiated in the Inner Zone, or unusual border crossing tactics designed to foil the sensor system. In this instance, the detection is accomplished without a priori radar tracking information. Acquiring the target, while very similar from a processing view point, will require more data than needed when the radar track is available. In this mode, the EO/IR system will be scanned across the Inner Zone.

Two spectral bands (IR and visual) are exploited to enhance the ability of the system to function during any portion of the diurnal cycle. The signal processing algorithms that underly the optical system is primarily responsible for classification (i.e. discrimination of real targets from false targets) but also needs to detect and track a target. The goal is to identify humans (and vehicles) that might be trying to cross the border and to distinguish humans (and vehicles) from animals and other objects not of interest. These algorithms rely on "features" that various moving objects. These features include:

Temperature—While variable, human skin is normally about 32 degrees Celsius. Inanimate objects share the environment's temperature.

Size—Targets of interest have bounded size.

Opacity—Most targets of interest are largely opaque. Objects such as tumbleweeds are essentially translucent. Opacity becomes evident for objects moving in front of a measured background.

Velocity/Acceleration—Targets of interest have constrained velocity/acceleration profiles.

Gait—The differences in gaits between bipeds and quadrupeds have been well studied and are used for differentiation.

Track and location—Humans, cars, and motorcycles tend to stick to known paths and are topographically limited in their motion.

The optical system will classify the target to determine if the target is real, how many targets are present, and what the target is (e.g., human or vehicle). A variety of a priori sources of information that aid in the detection, tracking and classification process include: weather conditions such as temperature, wind speed, and humidity; ambient light level; known human, vehicle and wildlife activity patterns; and terrain information such as roads, trails and topography. The statistics of these sources will be developed for input to the signal processing and may be known a priori, acquired from site surveys, or "learned" over a period of time. The algorithm uses a unified approach wherein each component of the system exploits these differentiating features.

Detection. The detection approach will exploit many of the unique facets of the sensor and the sensing environment. These facets include the sensor point spread function, fixed imaging geometry, the statistics of the background (including terrain, weather, and time of day), the movement of the subjects of interest and the known confusors (non-human targets such as animals, tumbleweed, swaying vegetation), and various combinations of each. The algorithmic approaches applied to the LWIR and the EO data are similar, but the distinct LWIR emissions of humans and warm vehicles provide a particularly powerful means for detection. The detector will incorporate (1) change detection between a new scene and a fully characterized background and (2) target motion and location in the scene. The detector will exploit both a prior and/or adaptive statistical model of the background and the movement of the target. Further, it will also be selective of size, velocity, and object temperature. The detector will exploit the cued data provided by the wide-area surveillance radar system and will also be able to independently detect, track, and classify without the benefit of the radar track.

Before the data can be exploited they must be registered to a common frame of reference. Accordingly, the first optical subsystem registers the outputs of both cameras and the terrain information to this common frame. Surveyed landmarks in the scene will be used in this process and will be carefully implemented to ensure the effectiveness of subsequent processing.

Exploitation of the benign nature of the background is achieved by developing spatial-temporal statistical models of the subject-free scene. This is accomplished by scanning the background with the camera to develop a database of background statistics. In instances for which a target-free calibration pass is not possible, adaptive statistical methods will be used to develop an estimate of the background dynamically. A two-step detection process is used. The first step exploits the stationary sensor geometry and the ability to carefully measure the target-free background. The second step applies a movement-based detector to those regions detected by the first stage background detector. While detection of movement using image flow or similar techniques can be computationally intensive, the fact that only a small subset of the data need be processed permits real-time operation. Velocities exceeding a given threshold are detected while those below the threshold are rejected. As a final step in the detection process, nearly-contiguous regions are conjoined using morphological techniques whose parameters depend on geodesic positioning data available from the camera pointing subsystem. The results are then passed onto the tracker algorithm for detection validation and tracking.

Alternatively, or in conjunction with this processing method, a track-before-detect method similar to the one that can be used for the radar can be implemented for the LWIR sensor.

Tracking. The tracking algorithm associates temporally-localized detections into longer term object trajectories. This is accomplished by developing a valid track of the target over a sufficient period of time to determine that movement is occurring. Once objects are detected, groups of pixels deemed to pertain to distinct targets are grouped and presented to the tracking algorithm. The algorithm to be used by the optical sensors is philosophically the same as the radar algorithm, except there is significant a priori information available to the optical sensors to make detection and tracking more robust. The tracker also plays a pivotal role in distinguishing targets of interest from confusors. The latter is accomplished by making the tracker selective to achievable velocity/acceleration as well as to the geographical regions that it is possible to traverse. In this way, detections that do not form feasible tracks are eliminated without having to undergo consideration from the classifier. A maximum likelihood tracker will be used. Additionally, the track developed using the EO and IR sensor data will be fused with the radar track to enhance performance.

Classification. The purpose of the classifier is to make the final decision pertaining to whether a given track needs to be further investigated by a border control agent. Along with this decision, the operator is presented with other information that was used to form the classification decision; for example, "thumbnail" movies showing the activities of targets over the observation intervals. The operator then uses this information to make a final decision as to whether the target is of interest or not.

The following features will be exploited for classification: (1) temperature and magnitude from the detection process; (2) velocity, acceleration, and trajectory geometry from the tracking process; (3) special features such as frequency-wavenumber signature, gait, as well as intensity variations. All of these will be used to identify people and vehicles illegally attempting to cross the border and to distinguish them from confusers like wildlife, terrain features, and other people and vehicles not attempting to cross the border. The different day-night outputs of the EO and the IR sensors will also be exploited.

FIG. 34 illustrates an example of a frequency-wavenumber discrimination algorithm where a movie cutout of two tracked targets (left view) is processed in Fourier domain to produce a plot of wavenumber ($k_y$) versus frequency (f) (right view). The center diagonal line represents movement of humans and the lighter diagonal lines above and below are sidebands that are unique to swinging human arms and legs. Human features can be easily distinguished from other $k_y$-f components. This and similar processing techniques support automatic discrimination of movement by humans versus animals, vehicles, or items blown by the wind.

The performance of the smart sensor system will be specified in terms of the probability of detection and the probability of false alarm. The signal (i.e., people or groups of people, vehicles or groups of vehicles moving very slowly to very fast, including people crawling or standing still for prolonged periods), and the sources of interference or noise, which can result in false alarms and false target detection, including sensor system and sensor background noise, terrain, and environmental conditions (e.g., weather, animals, vegetation such as rolling sagebrush, etc.). As part of this task, the various scenarios for detection, tracking and classification of people and vehicles in the Outer Zone, the Inner Zone, and after a border crossing will be developed and specified. The signal processing algorithms will be adapted to address each of these scenarios.

The method of the present invention will be used to detect a wide range of target signals. The variables of importance include number, size, speed, trajectory, and crossing tactics. The signal may be a single person crossing the border, where this person may be crawling, walking, running, walking and hiding behind terrain features, or other evasive tactics in each of the zones. The signal may also consist of a group of individuals or a person and an animal, where one or more of the group will scatter or attempt to cross the border. For high performance, each type of interference masking detection, tracking and classification or resulting in false alarms must be compensated for addressed. These interferences include (1) the important sources of background and noise influences, (2) the various categories of terrain and how terrain will influence performance, and (3) the various categories of environmental effects and their impact on performance. The specific design of the system will depend, may need to refine the design of the sensor system suite in terms of sensor and sensor system requirements, spacing, height, precision, resolution, and fusion.

LWIR Signal Processing. FIG. 35 shows a general processing flow chart for the cued narrow FOV LWIR sensor data for the smart sensor Acquire-Track-Classify Processing used to process the LWIR data in the Salinas field tests. As stated above, the radar detections cue the narrow field-of-view LWIR camera when the potential targets of interest being tracked by the radar enter into optical classification range. Initial optical processing steps register the images and segment foreground from background in the imagery. Optical track processing then separates genuine detections from spurious contacts, and classification processing exploits extracted features to discriminate between TOI's and other object types. A brief summary of each of the steps is provided below.

Registration Processing. All data processing operations depend on accurate frame-to-frame identification of persistent features. Both instrumental and environmental factors can cause artificial displacements of the features that appear as image motion. The detection algorithm must reduce these errors to a prescribed level to meet performance objectives.

Registration requires two key processing steps: (1) camera alignment (not presently implemented) and (2) geospatial coordination. Camera alignment provides stabilization against frame-to-frame jitter and drift in the LOS. Geospatial coordination registers the image to a specific mapping on the earth's surface using in-scene fiducial points or a model based on digital terrain elevation data (DTED). This step is critical to successful cueing by the radar required for accurate position reporting of TOI locations.

Background Removal Processing. Once data frames are registered, system specific operations that facilitate subsequent algorithmic operations are performed. One of these is to determine the background of a scene so that it can be removed as part of the segmentation step. Gaussian statistical tests are used to flag pixels that are unlikely to belong to the scene as being foreground objects. This process can impact $P_D$, because TOI's lost in the background will be removed and may result in missed detections.

Segmentation Processing. As discussed for the radar processing, segmentation is the formal process by which registered and conditioned data frames are translated into detection fields. Segmentation processing is required to perform first-order object detection. This process aggregates individual foreground pixels into target candidates, as shown in FIG. 36. Fast moving targets or targets observed for very short times can lead to fragmented or unstable segments (probably due to incomplete background elimination). Fragmented targets confuse the tracker as the centroid position varies and jumps erratically; two very short-lived look (<5 sec) vehicle targets did not track up because of this fragmentation. Aggregation or fusion of overlapping or adjacent bounding boxes can be used to "heal" some background elimination shortfalls.

Bayesian Tracker Processing. The tracker is required for final object declaration, and is the key to the function of the subsequent modules. The tracker leverages Bayesian tracking capabilities, eliminates spurious inputs due to clutter motion (as well as background removal and segmentation failures), rejoins separate single-object sections produced by occlusion or segmentation failure, produces time-history of object position, and handles obscuration. The results presented in this report were achieved without the rejoining and obscuration algorithms, which were not implemented at the time of the measurements. The Bayesian methods optimally match inputs with prior state. Decision statistics rely on space-time histories of objects, and model for dynamics of common objects. Tracker outputs include declared object positions and extent (within the image), and ground track (time history of position within the scene). In the final version of the software, the result will be presented in ground coordinates.

Classifier Processing. The system classifies target types based on model-derived and/or data-derived probability distributions as shown in FIG. 37. The various distributions for one person to a group of ten people, dogs, horses, and vehicles based on aspect ratio and size. By combining both distributions, each of the various groups can be distinguished from each other. Thus, while it might be difficult to distinguish a horse from a group of 8 to 10 people based on aspect ratio, a horse is clearly distinguishable from 8 to 10 people based on size.

The system must support an open-ended configuration that allows runtime specification of class definitions, down-selection of type discriminator set, as well as decision rule logic. It must also accumulate results over the entire sequence of frames for a given track, greatly improving accuracy and robustness. Conventional Bayesian inference and Dempster-Shafer belief functions are supported, including the ability to:

introduce measurement uncertainties
support class ambiguities and "no decision" logic
support "rejection" class (class not in test set), and
provide a first step toward a statistical data fusion capability The second stage or LWIR classifier has the capability to exploit target kinematics, spectral content, and/or image-based features through a generalized interpretation of class-specific statistical distributions derived from real or modeled instances of those features.

As an example of this approach, statistical distributions of imaged-based features corresponding to type classes currently supported by the classifier can be derived from polygon representations of class type instances such as those shown in FIG. 38. Multiple realizations of these polygonal silhouette models (sampling many different aspects) are used to generate simulated projections of images on the camera focal plane. These virtual images can be processed as foreground masks through the back end of the EO/IR code stream (as if output of the background elimination module) and estimates of type features are then ensembled to form statistical class distributions.

Multiple target instances can also be projected onto the focal plane simultaneously to simulate groups of targets. Since the technique simulates the camera optics, class distributions can be tuned to a particular range or aspect. Because the features are extracted by the EO/IR processing code back-end itself, any responses introduced during EO/IR processing are fully comprehended. Sensitivities to noise and error sources can also be accounted for systematically. FIG. 39 presents an example of a group of targets based on multiple polygon representations.

A final cumulative classification decision is rendered and reported to the operator only after a consistency check has been applied to an accumulated sequence of frame-by-frame classification results. The consistency check is based on an assumption that agreement with the majority of class type decisions accumulated from previous frames constitutes "success" and any other decision constitutes "failure". The relative proportion of successful and failed trials is compared to a binomial distribution where the assumed probability for success is held at a high confidence level (nominally 0.98). A threshold is applied to a log-likelihood ratio based on the probability that the classification sequence belongs to the assumed distribution versus the probability it does not. FIG. 40 presents examples of the gains that can be achieved by the memory algorithm, including a substantial reduction in the probability of false alarms.

4.2 LWIR Field Test Results from Salinas, Calif. The performance of the LWIR sensor for detecting, tracking, and classifying people and vehicles was tabulated from 14 different LWIR target tests conducted in Salinas. The results are shown below in Tables 5-7. Over the applicable range of the sensor, the analyses showed that all 44 of the people targets at ranges up to 1.8 km were detected, tracked, and classified. In this period, the analysis also showed that the classifier could also distinguish people as individuals or groups of people. The LWIR results indicated that people could be accurately and reliably detected, tracked, and classified at ranges of over 2 km with as few as 15 pixels on target. With the new higher resolution cameras, our analyses indicate that the current performance can be extended out to distances of 4 to 6 km. Some of the images obtained from the video clips are presented and discussed below.

FIG. 41 shows two LWIR images of a vehicle being detected and tracked that was obtained from a two-minute video in Salinas, Calif. The top image (white box) shows the vehicle being detected as it enters the scene from the right. The bottom image shows the track of the vehicle after it was classified as it traveled through the scene.

LWIR Performance. An estimate of the performance of an IR sensor for detection, recognition, and identification of a target by visual inspection of an image by a trained operator can be made with the latest version of NVTherm™ thermal imaging model. The output of the model is expressed in terms of probability of detection, probability of recognition ($P_{Recog}$) and probability of identification of a person or vehicle at a given range and for a given set of environmental conditions. The distinction between detection, recognition, and identification is straightforward. Detection means that a target has been declared even though the person may not know what it is. Recognition means that the type of target can be determined (e.g., a person can be distinguished from a vehicle or a group of people). Identification means that the type of target can be determined (e.g., what type of vehicle is it, a SUV or a station wagon). For the border application, DHS is mainly concerned, for example, about differentiating animals from humans, single individuals from groups of humans, and people from vehicles. Furthermore, for the purposes of this discussion, the probability of classification and the probability of recognition will be treated as referring to the same metric.

Figure 1:
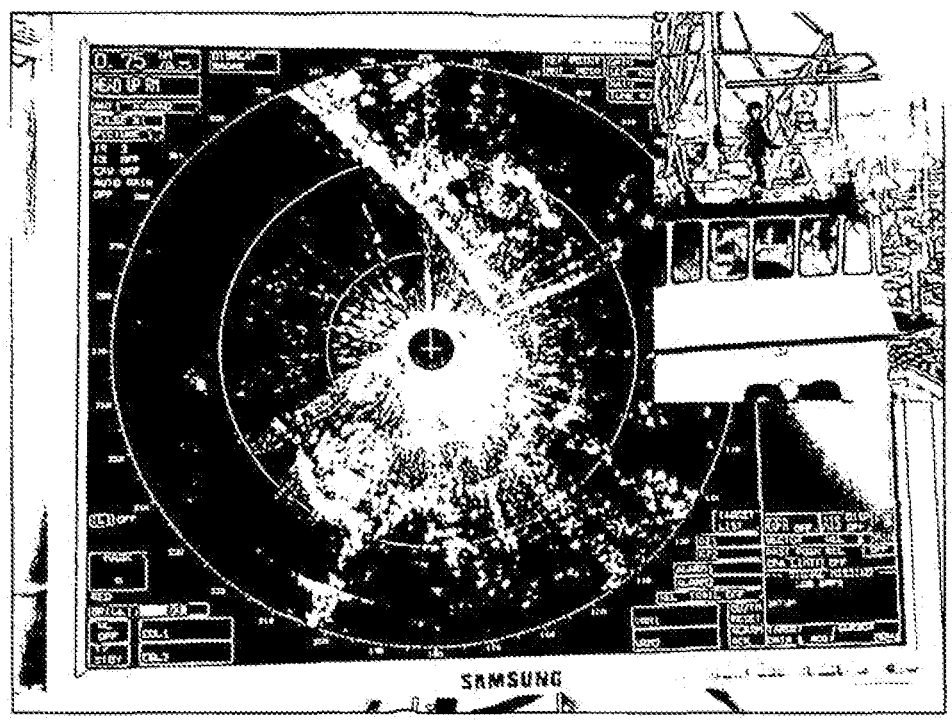
Figure 2:
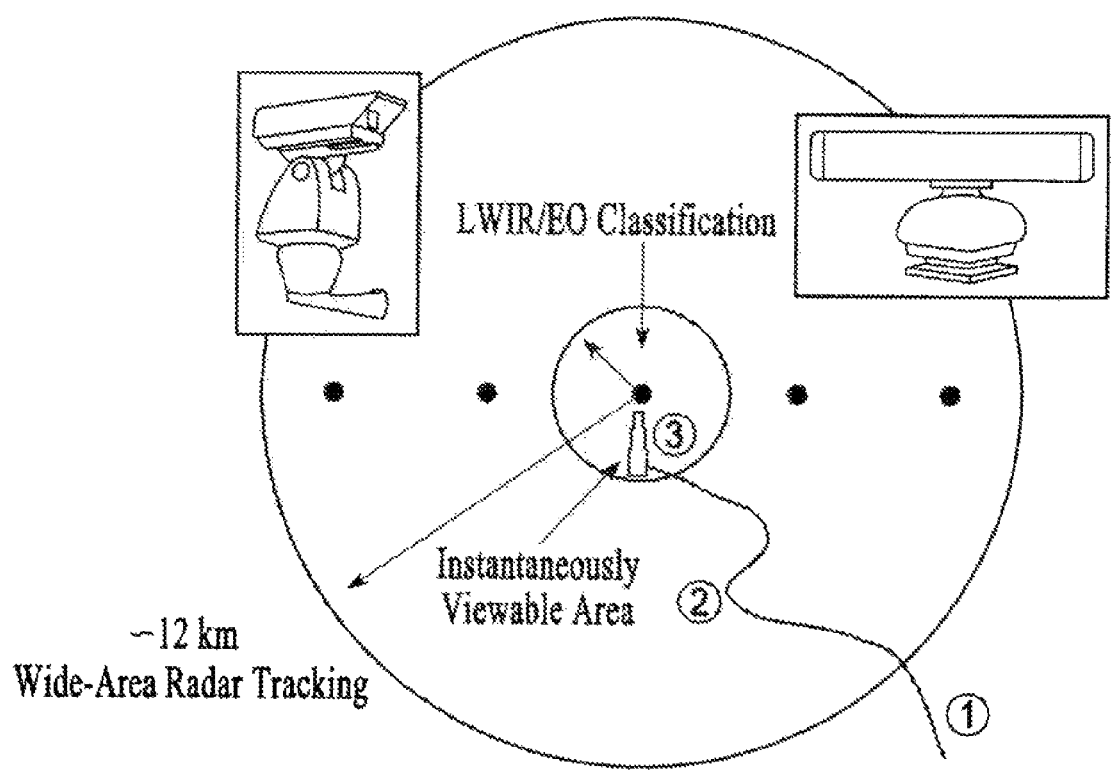
Figure 3:
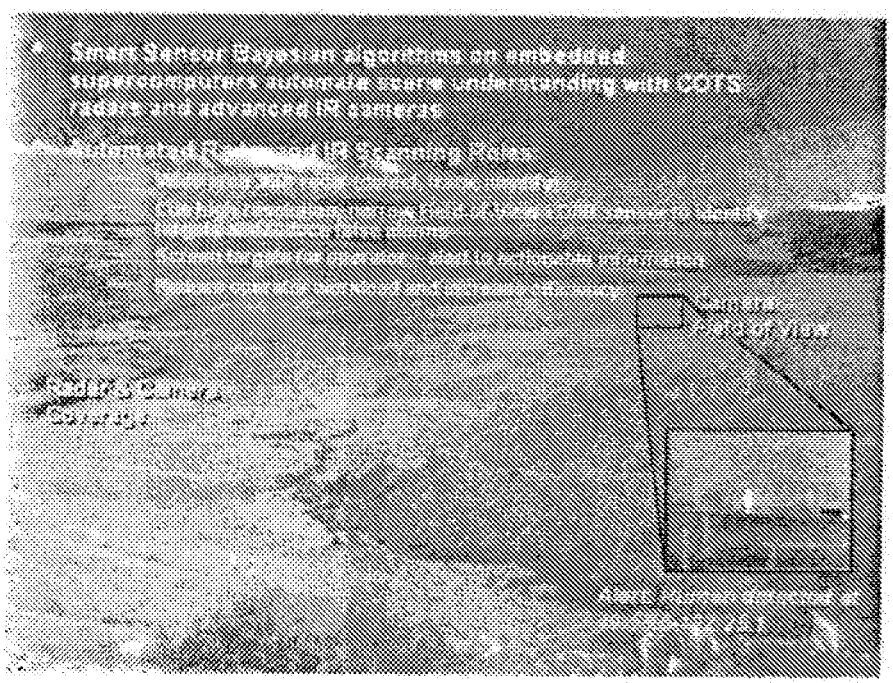
Figure 4:
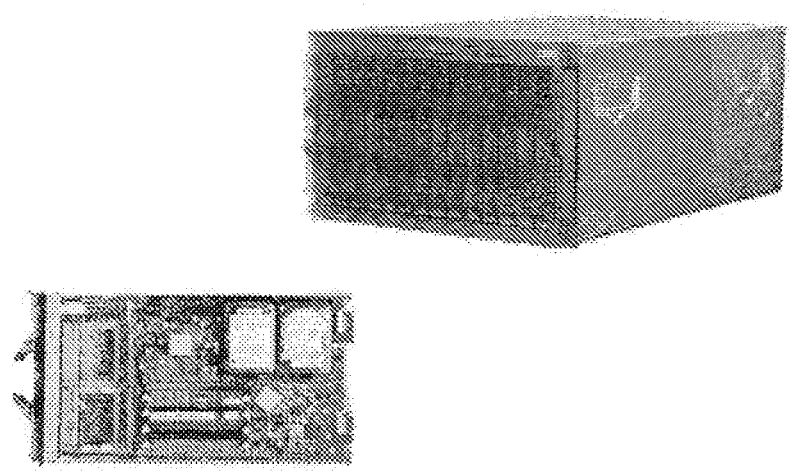
Figure 5:
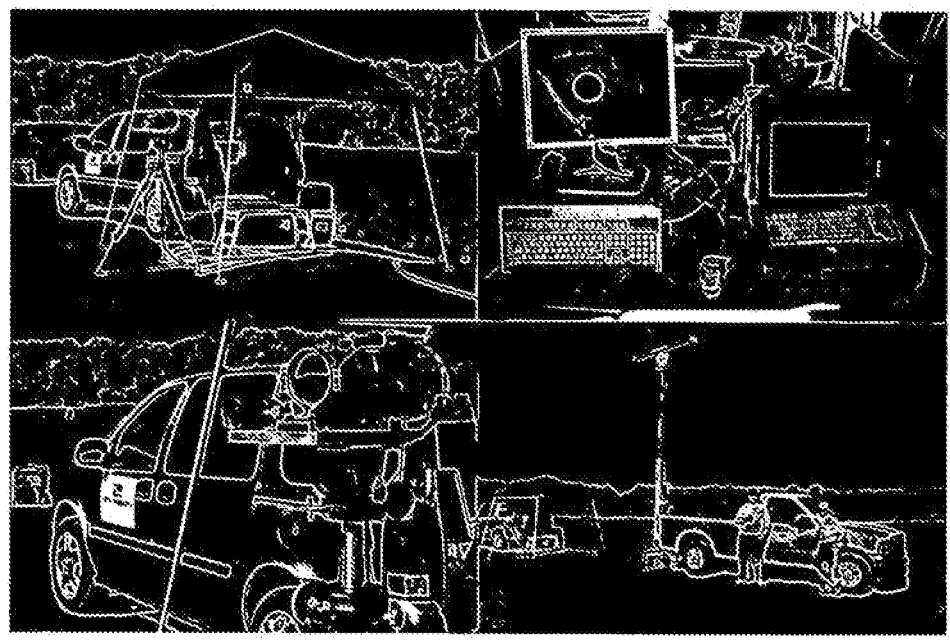
Figure 6:
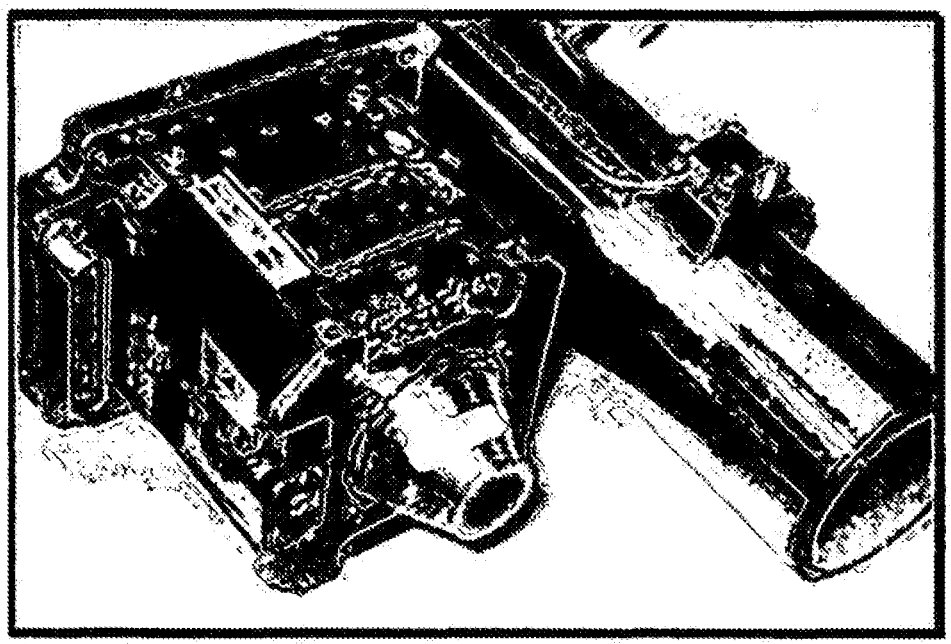
Figure 7:
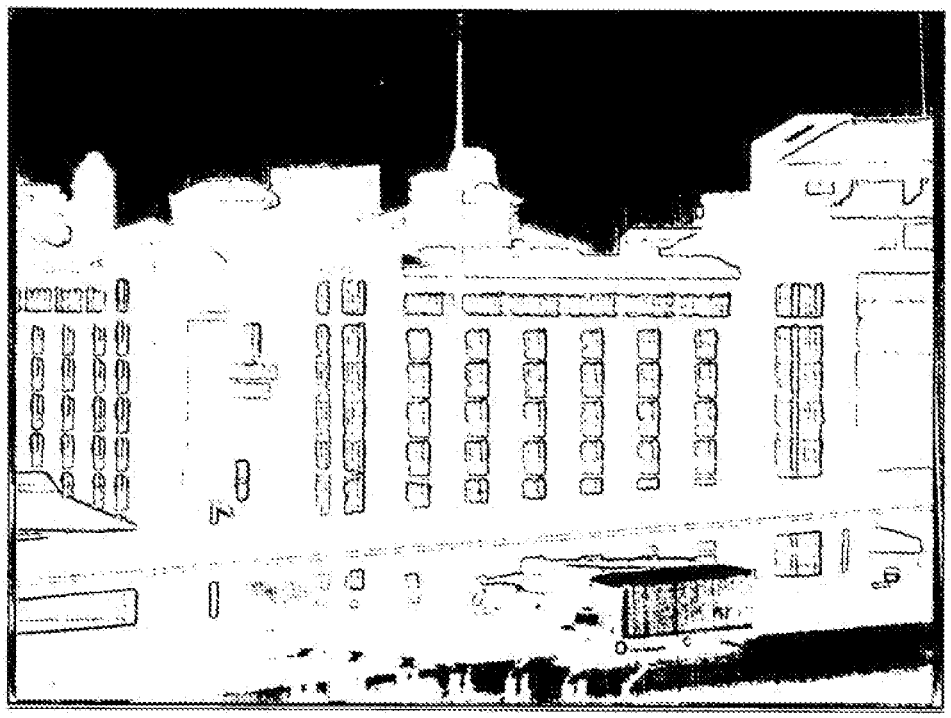
Figure 8:
Figure 9:
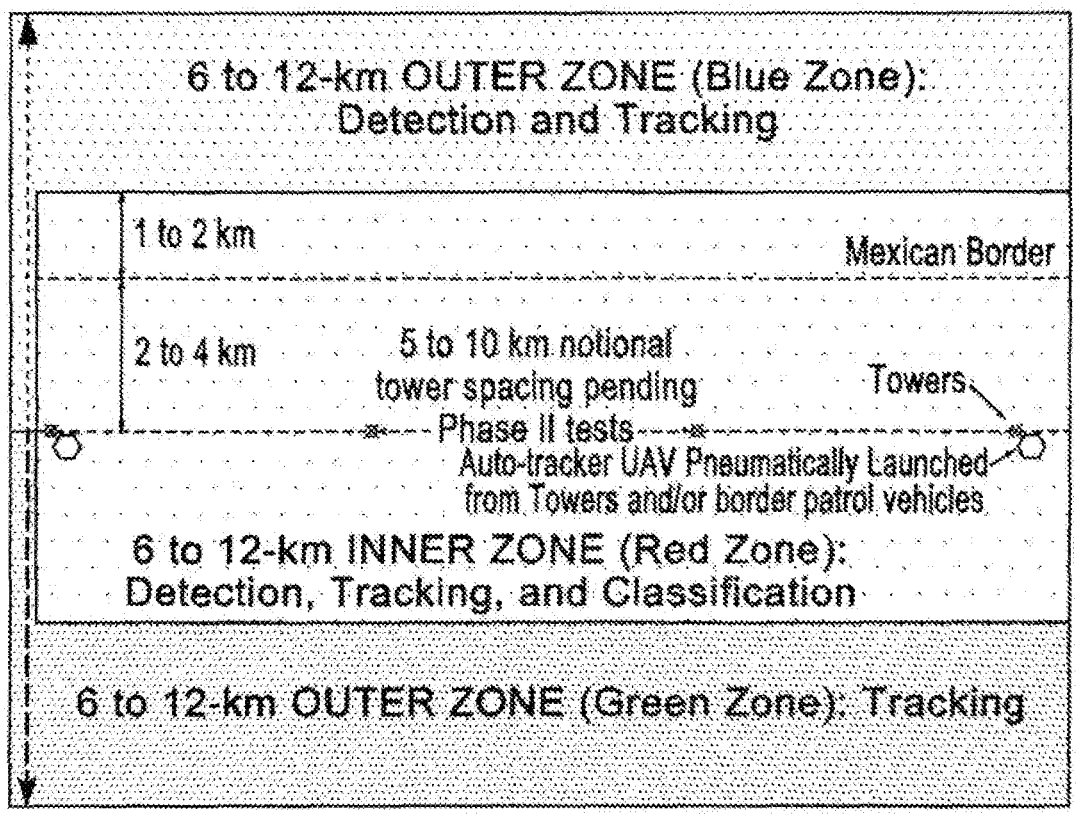
Figure 10:
Figure 11:
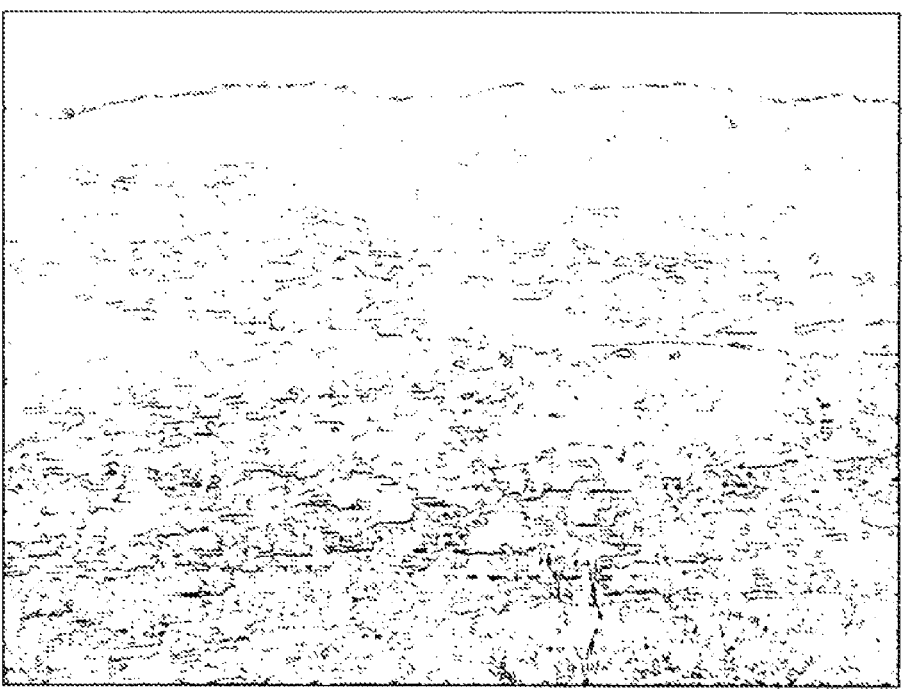
Figure 12:
Figure 13:
Figure 14A:
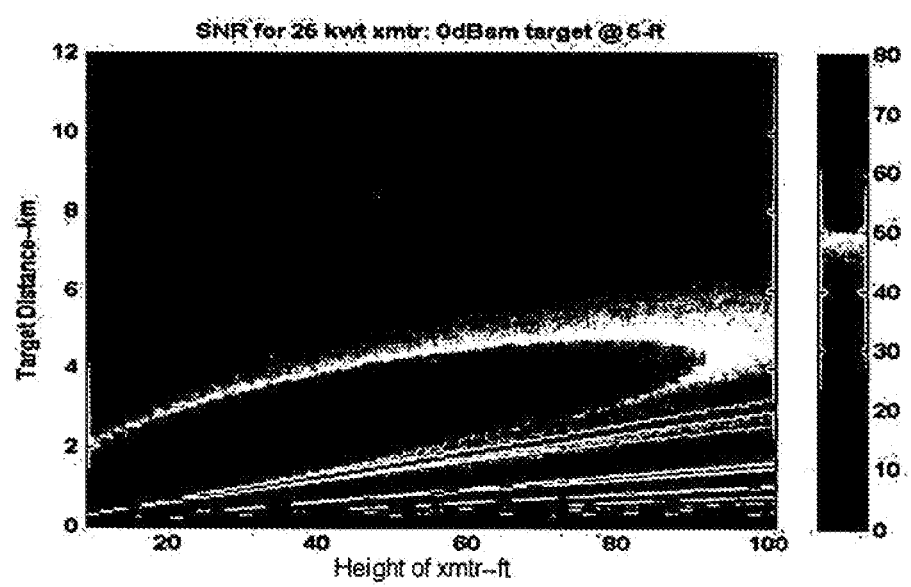
Figure 14B:
Figure 14C:
Figure 15:
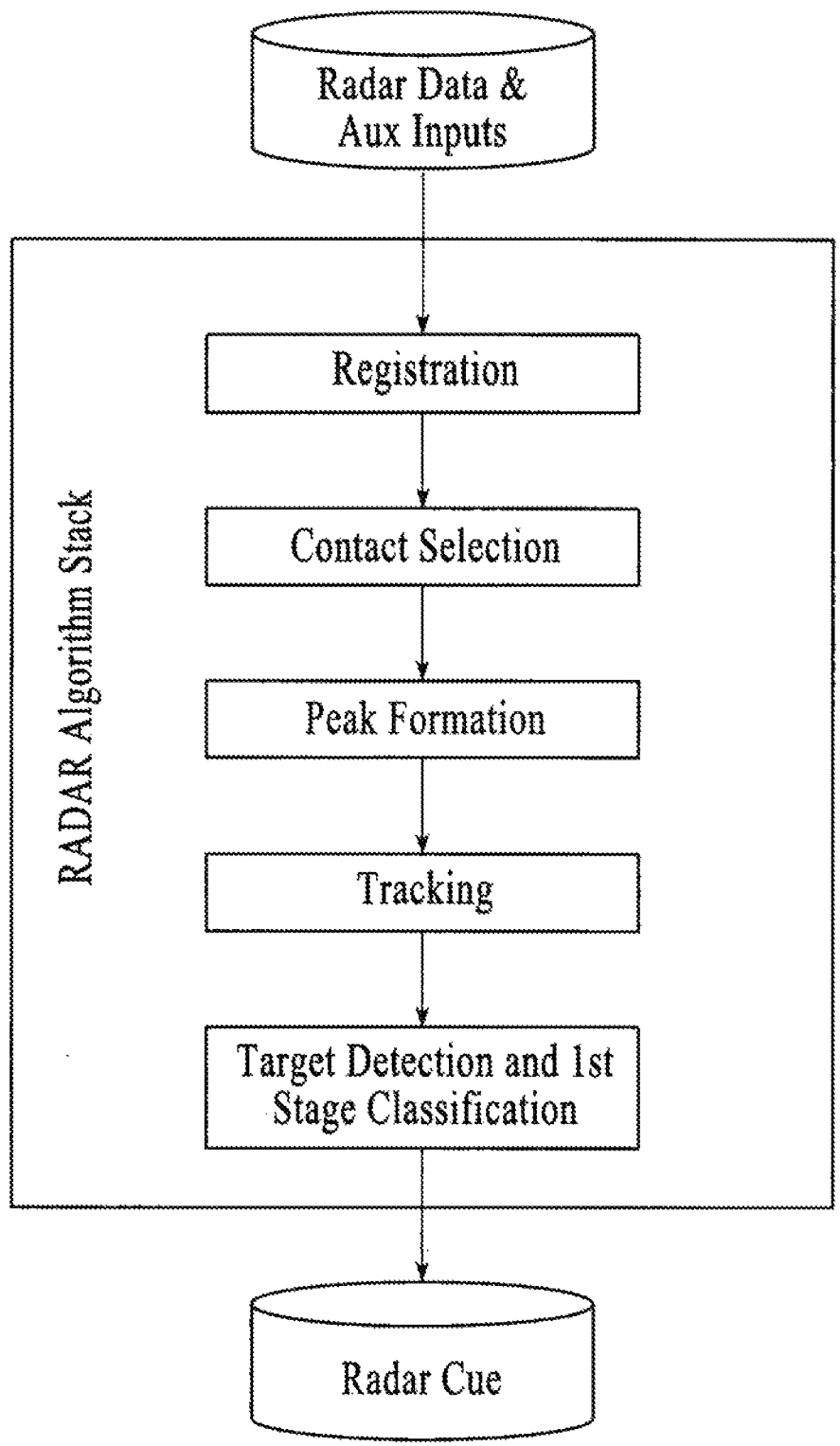
Figure 16:
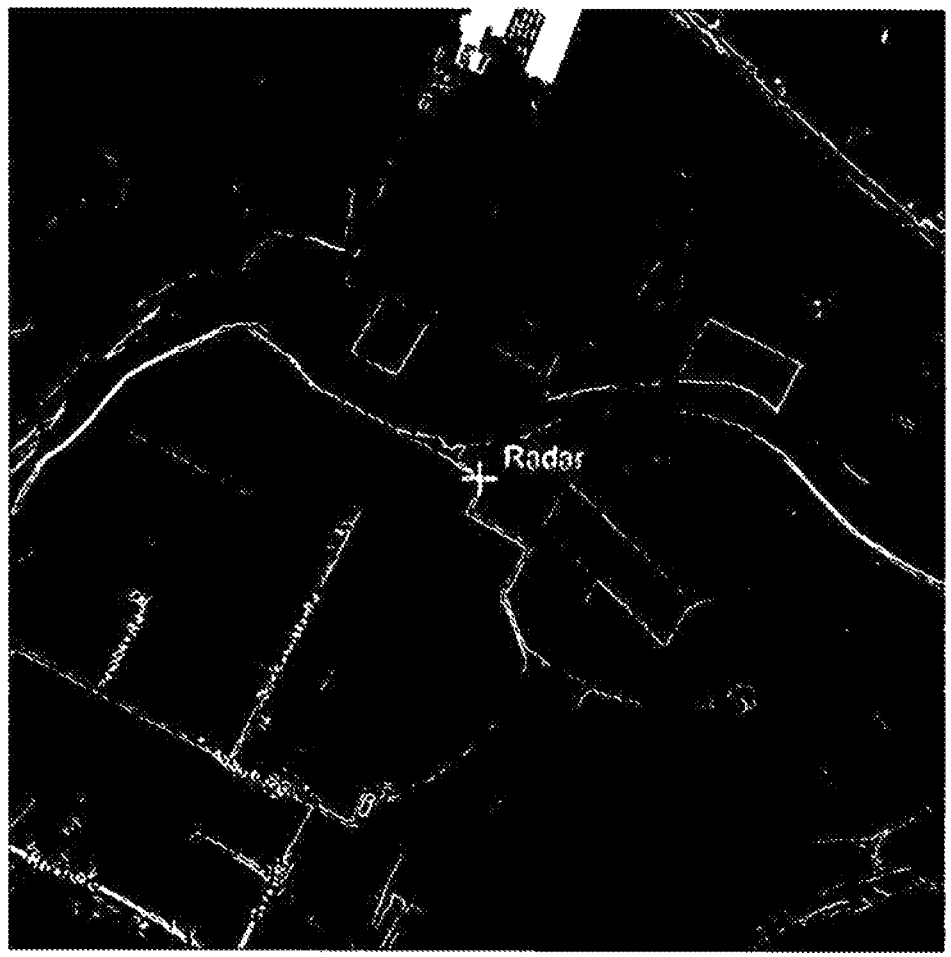
Figure 17:
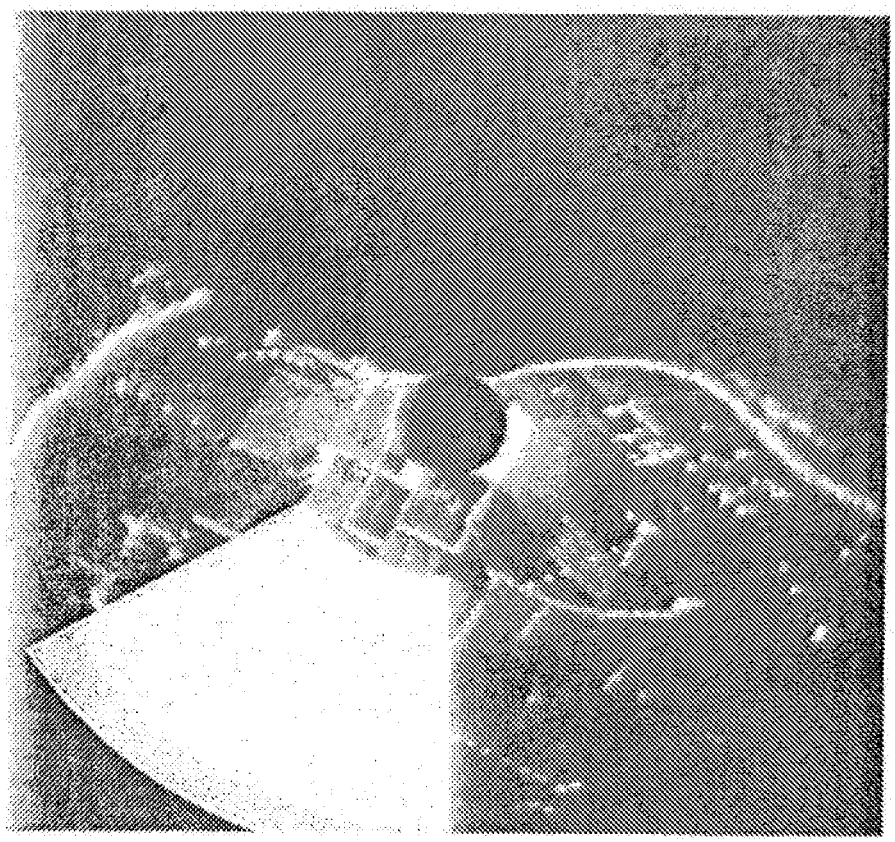
Figure 18:
Figure 19:
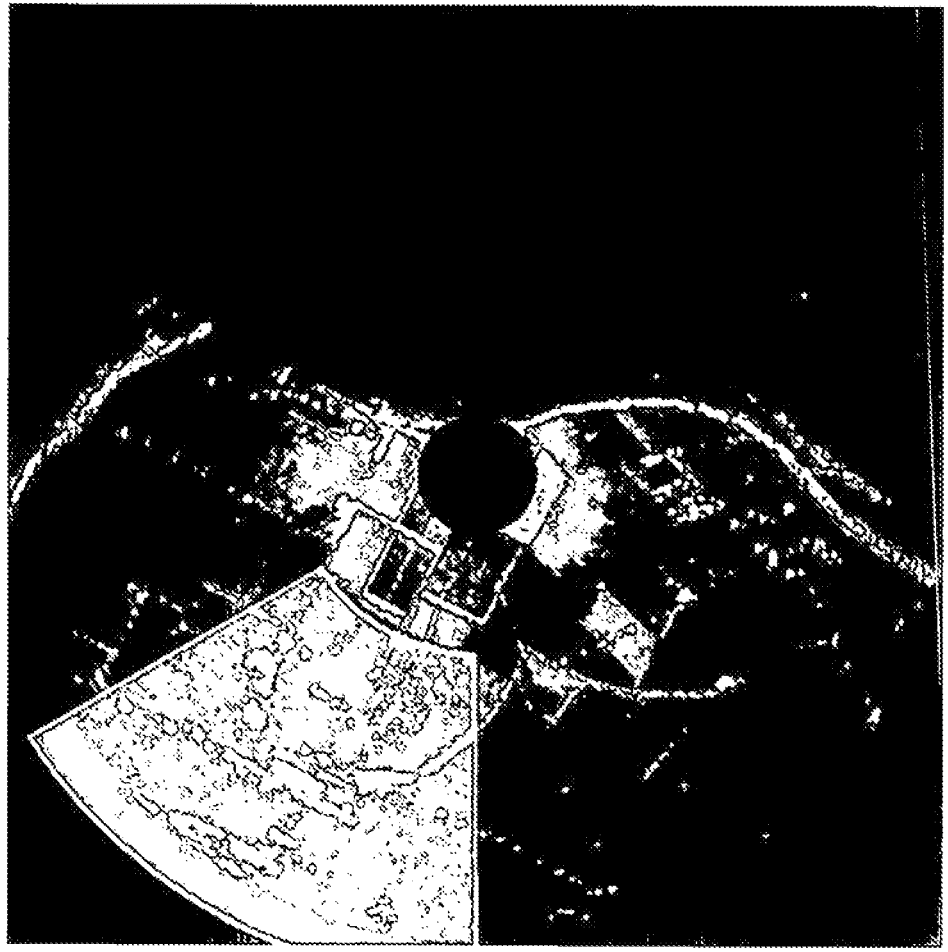
Figure 20:
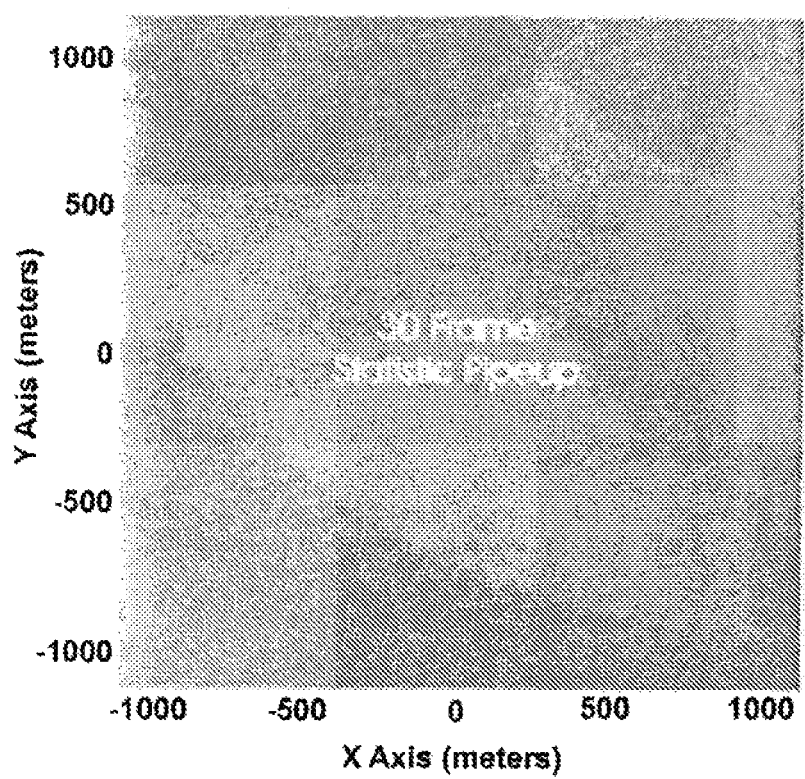
Figure 21:
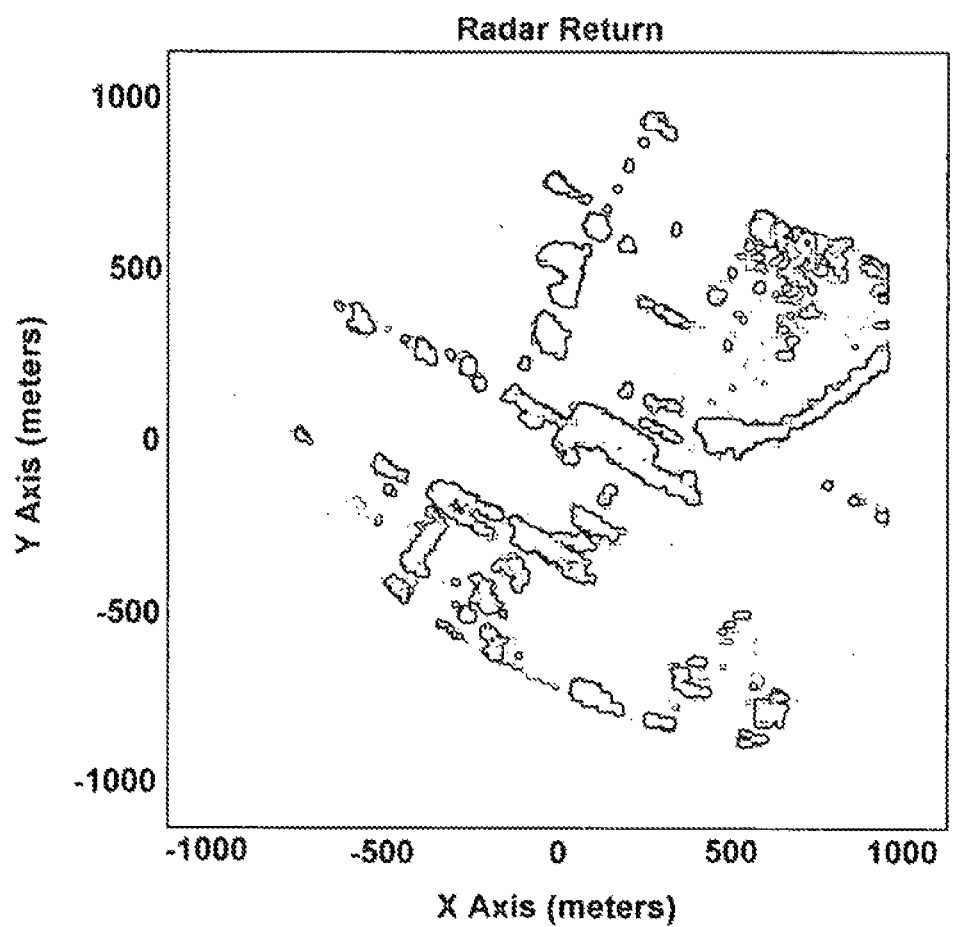
Figure 22:
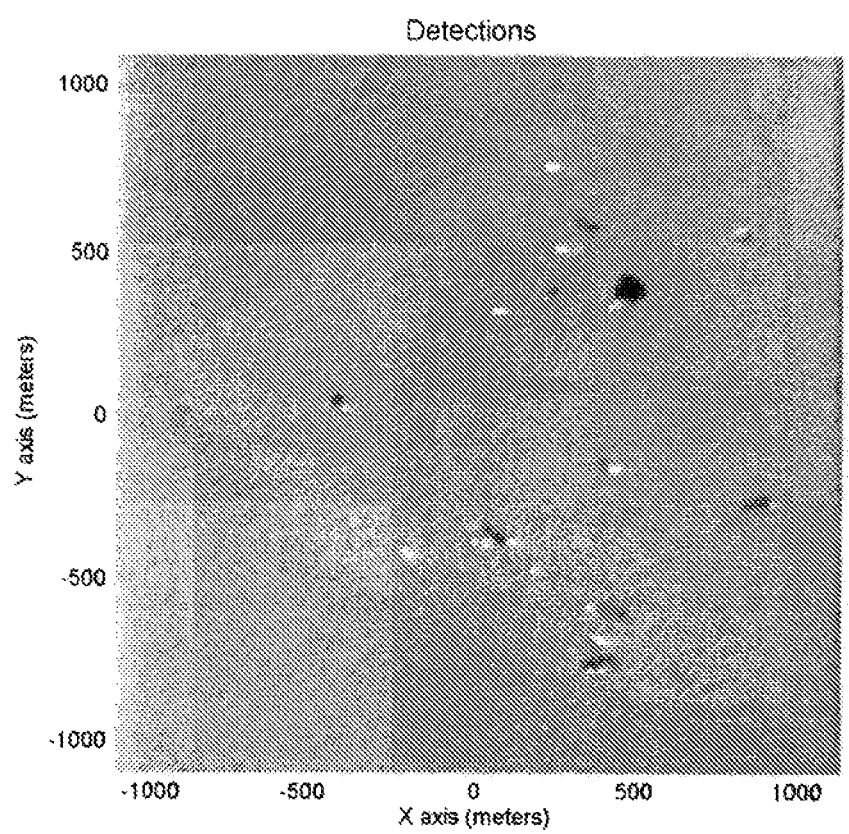
Figure 23:
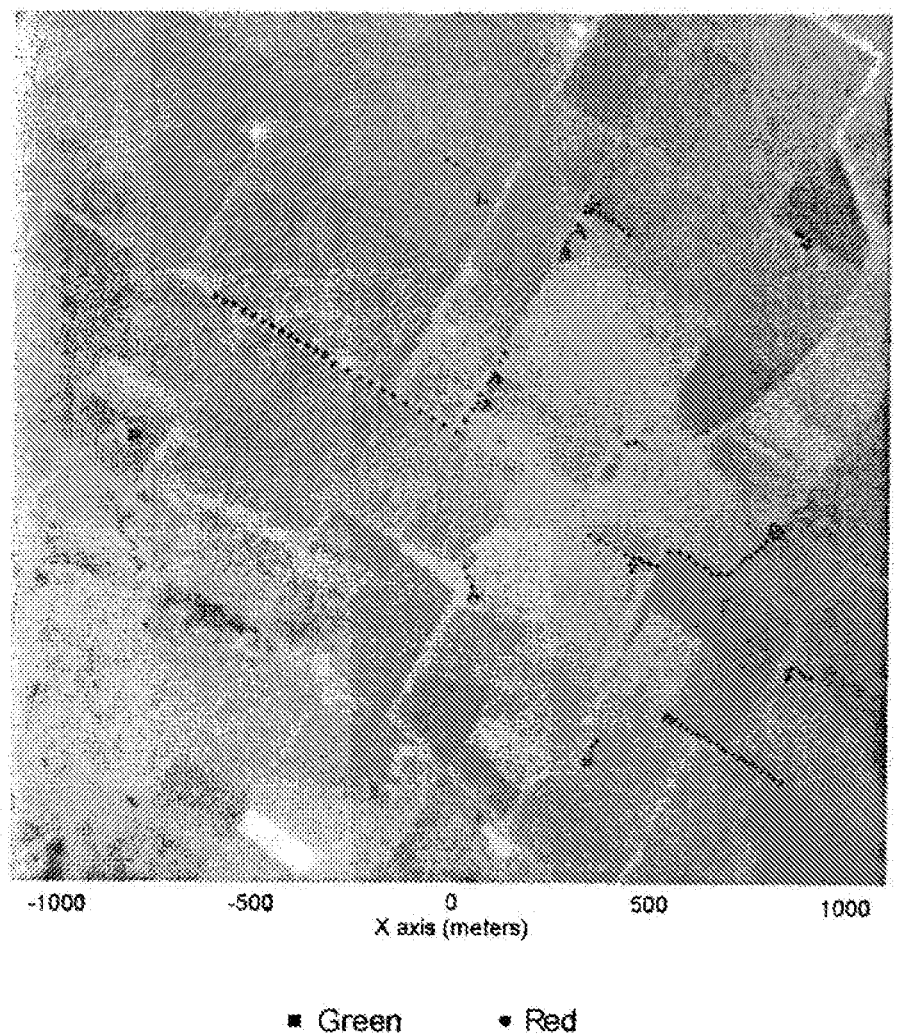
Figure 24:
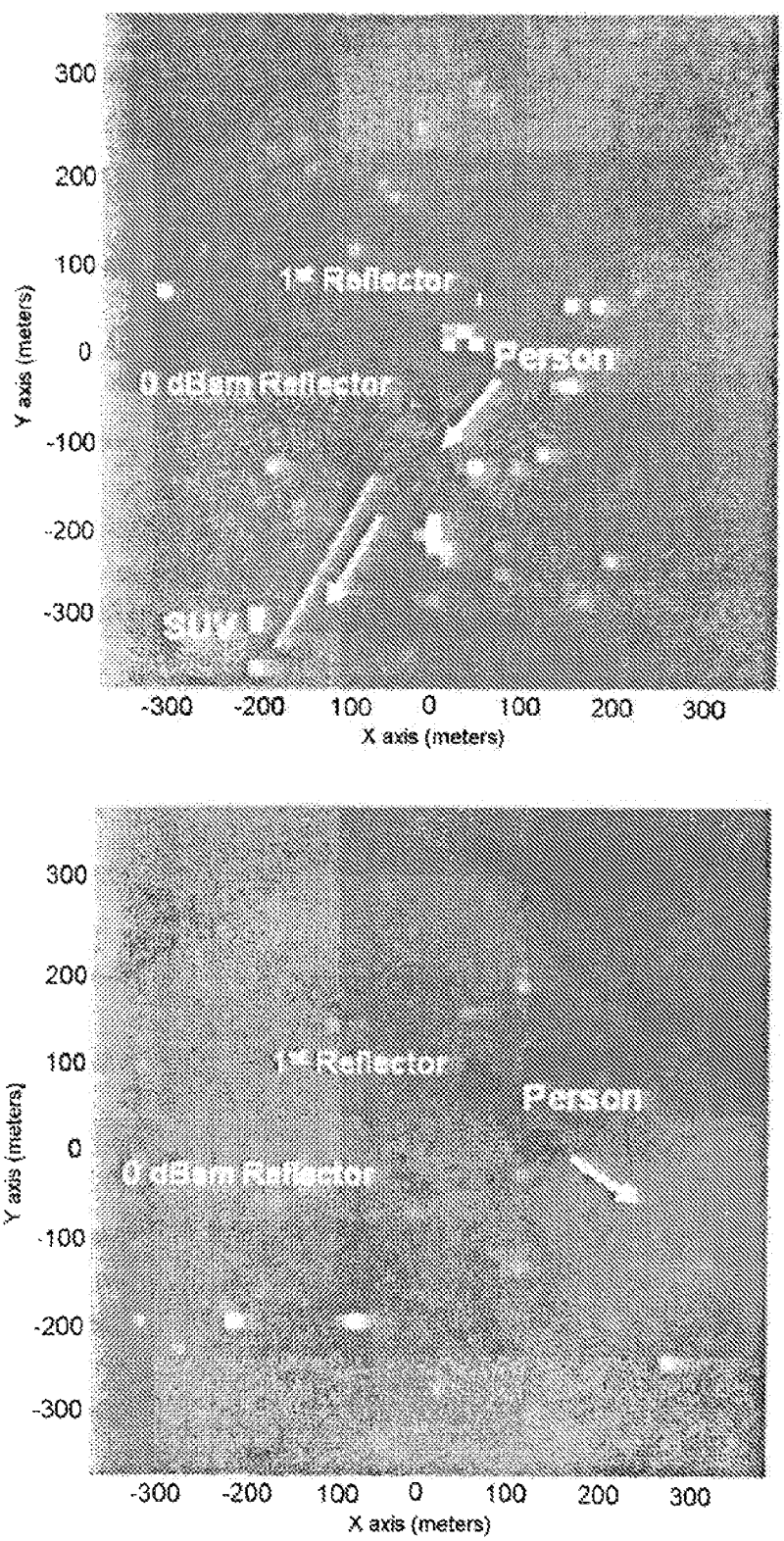
Figure 25:
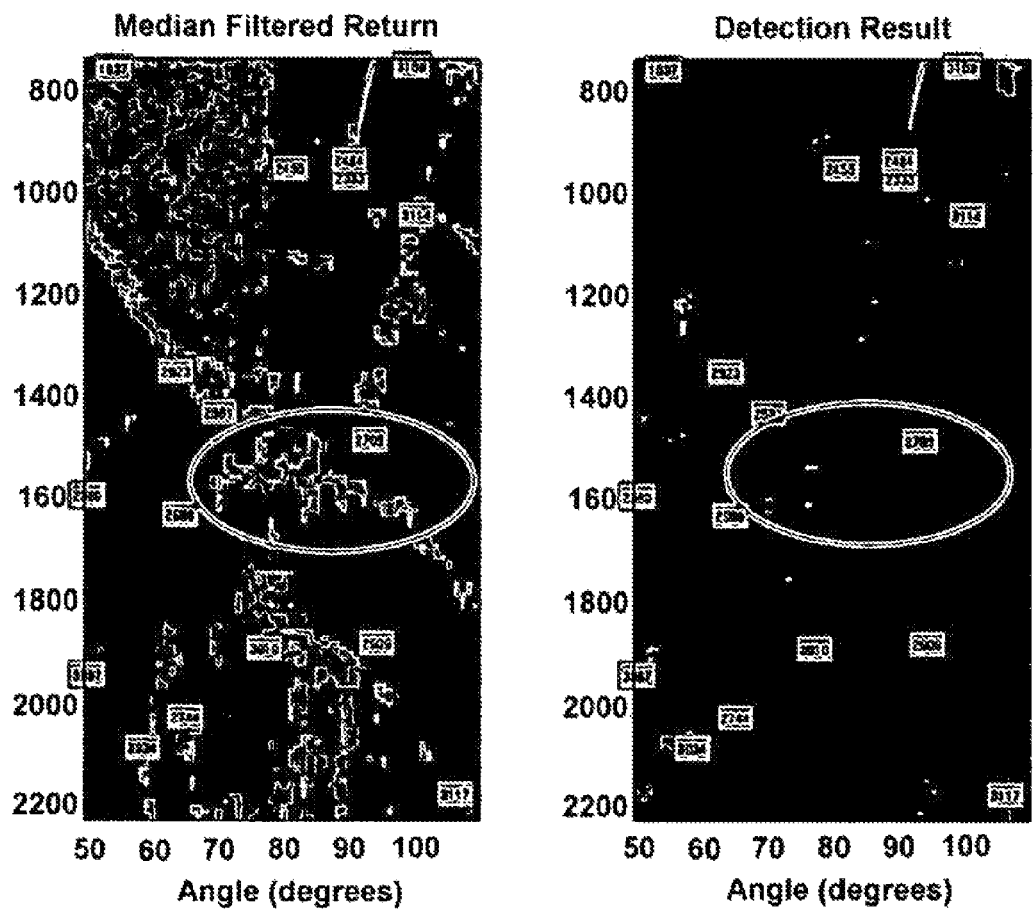
Figure 26:
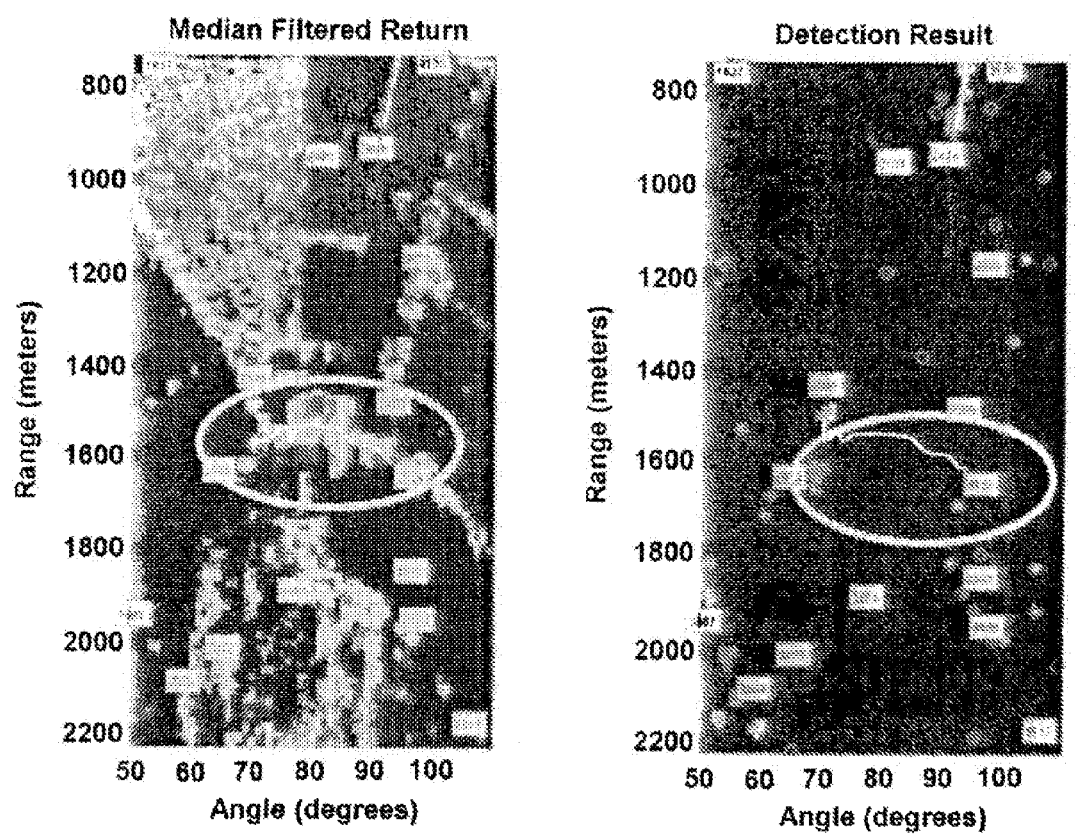
Figure 27:
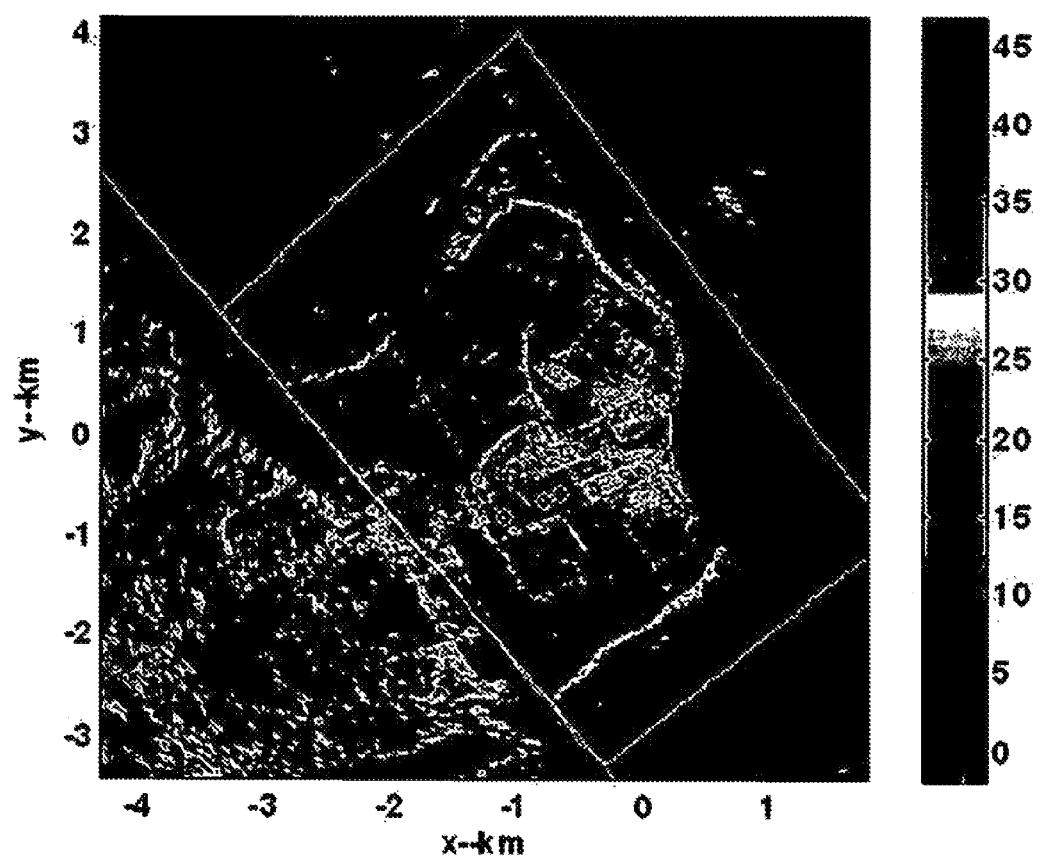
Figure 28:
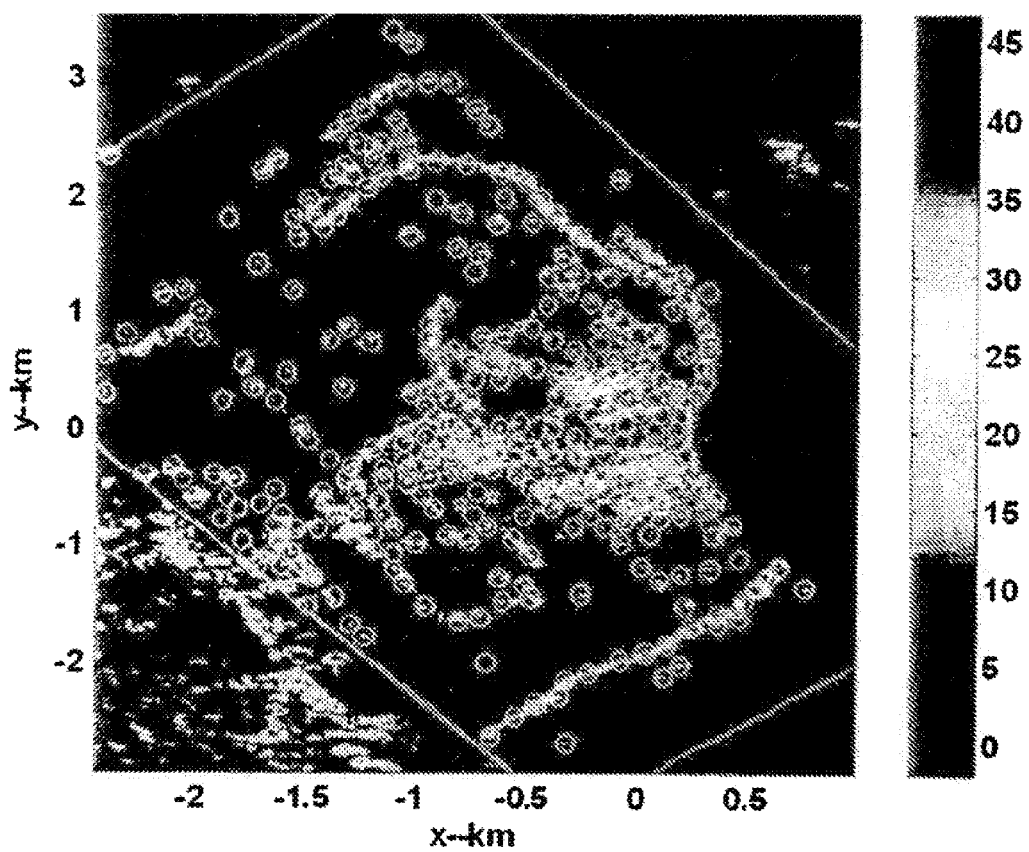
Figure 29:
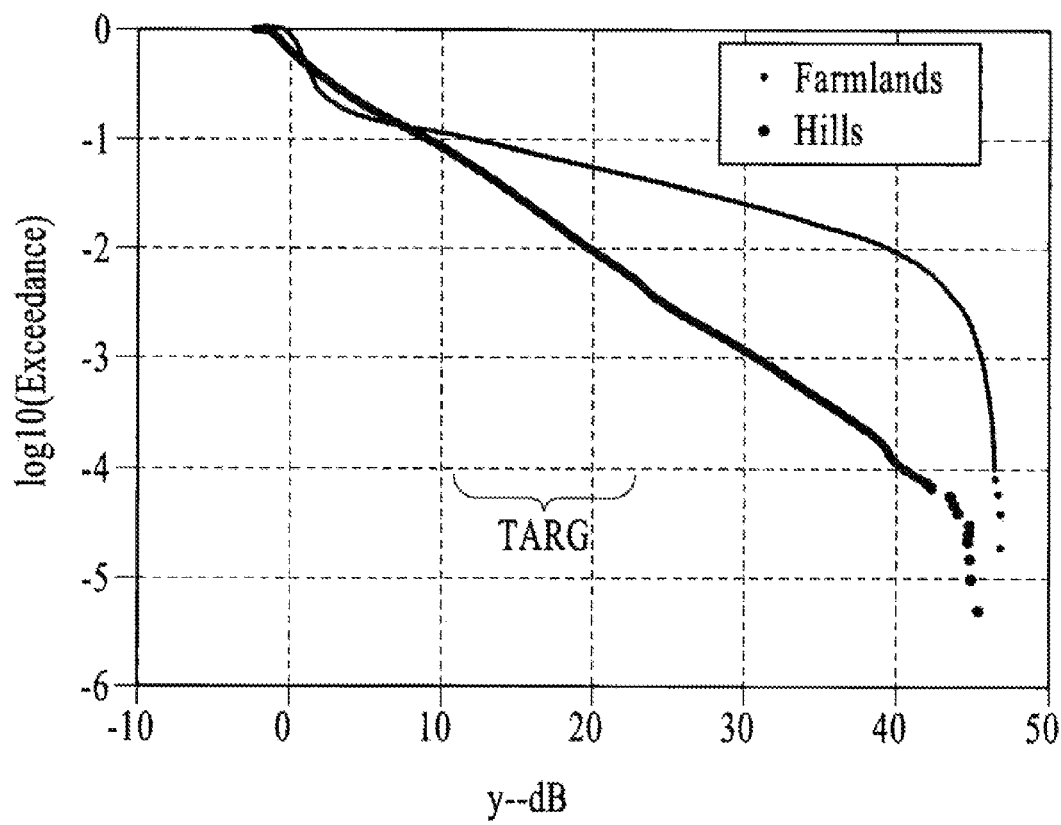
Figure 30:
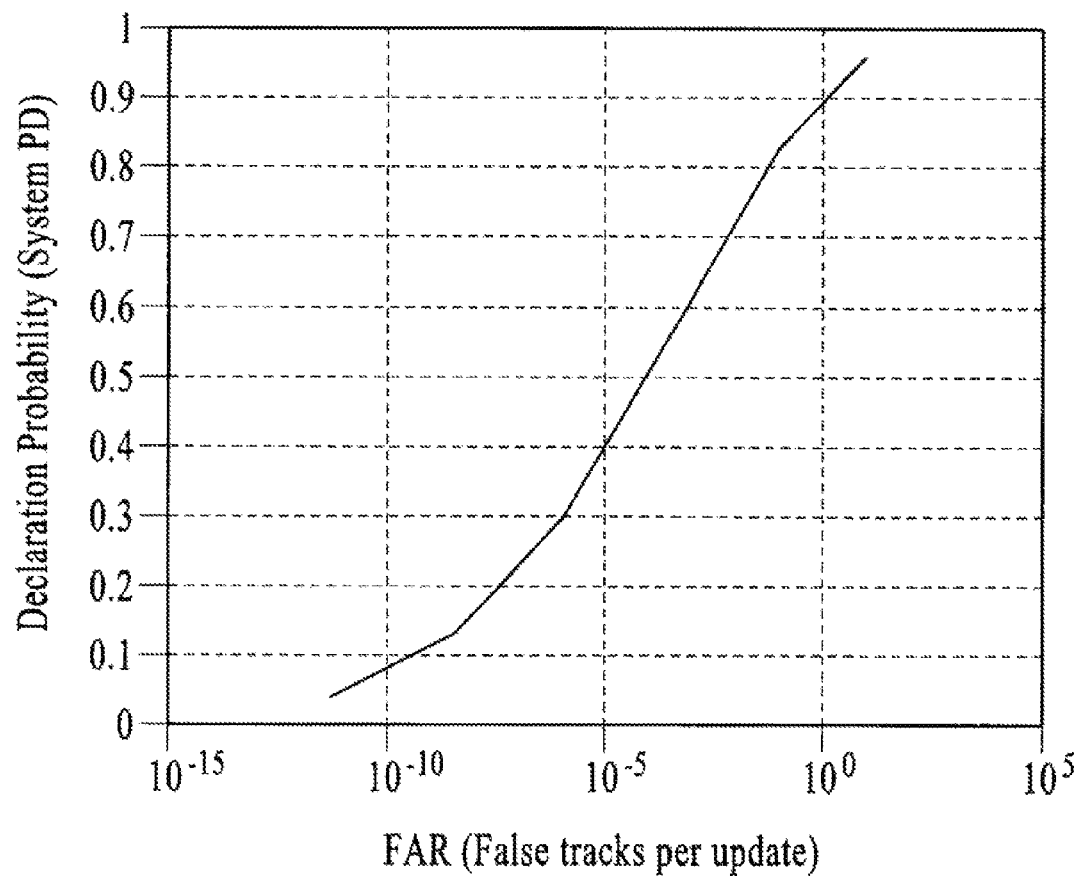
Figure 31:
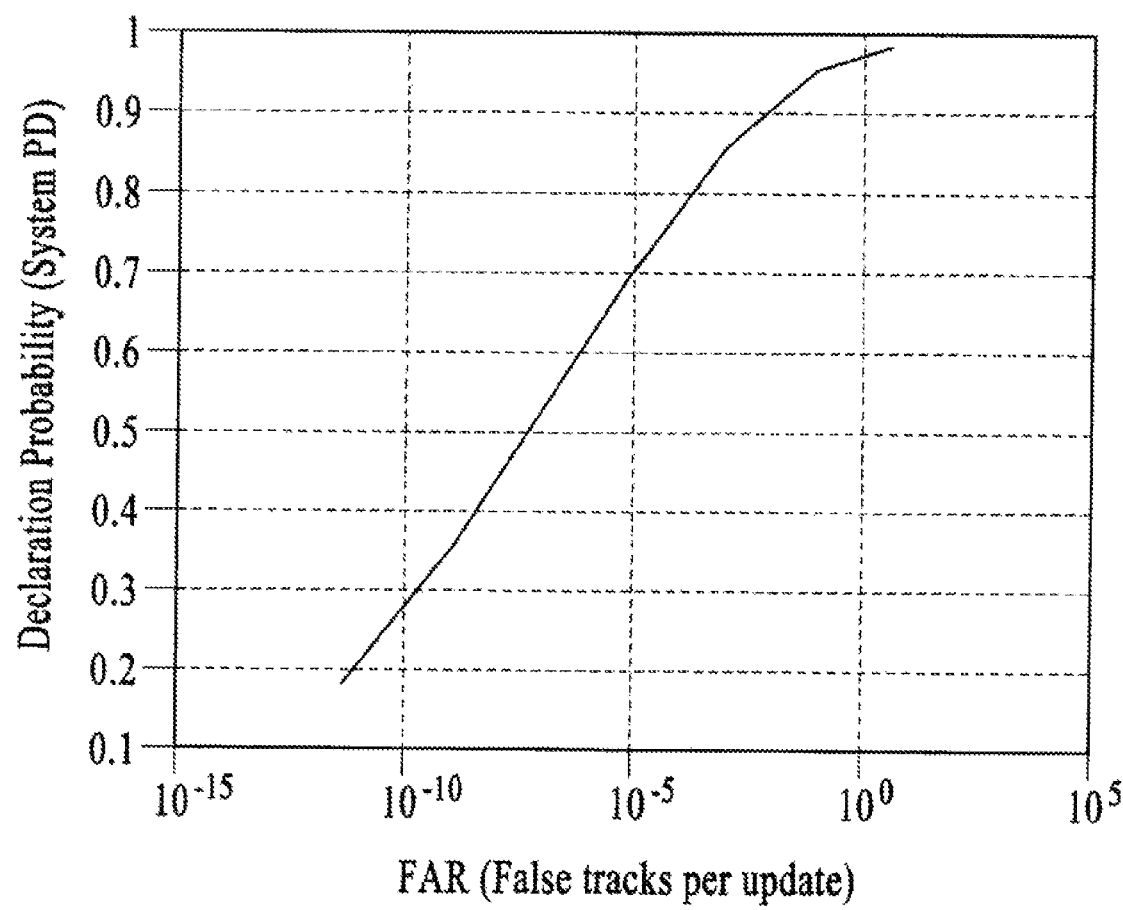
Figure 32:
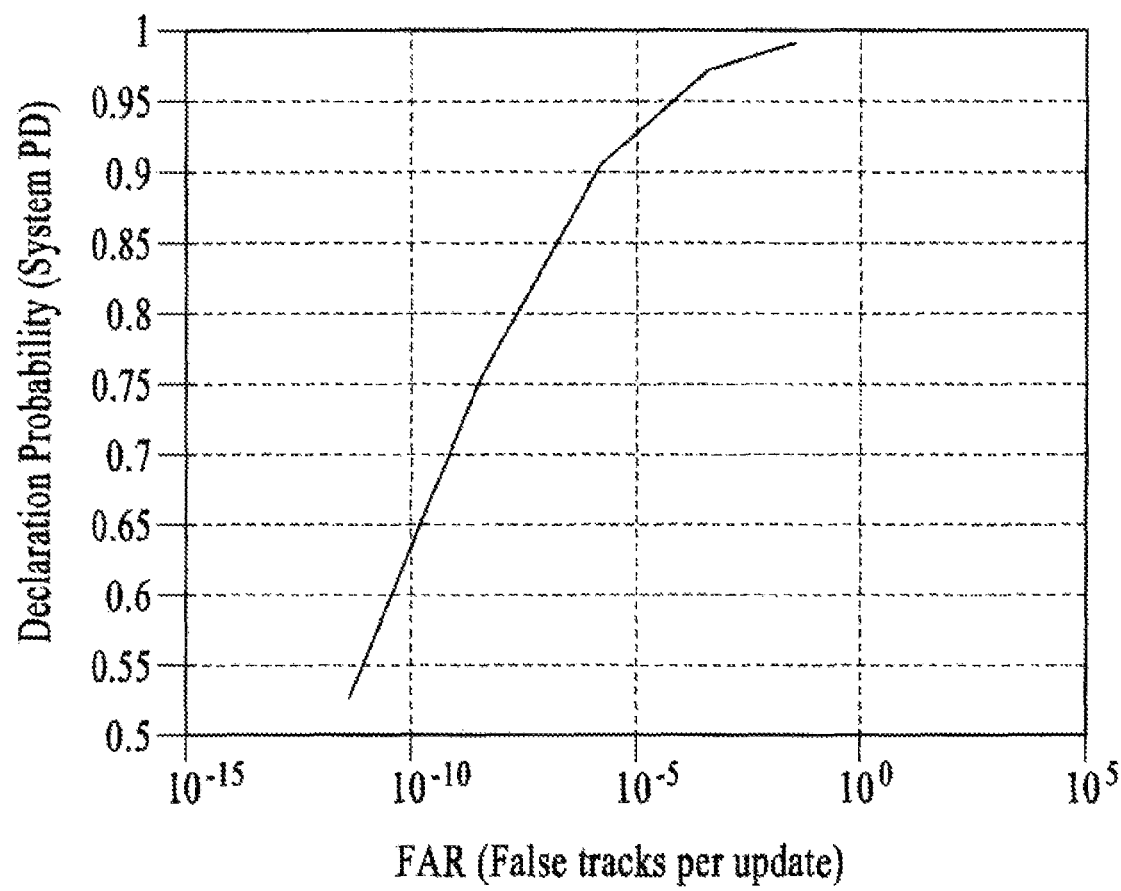
Figure 33:
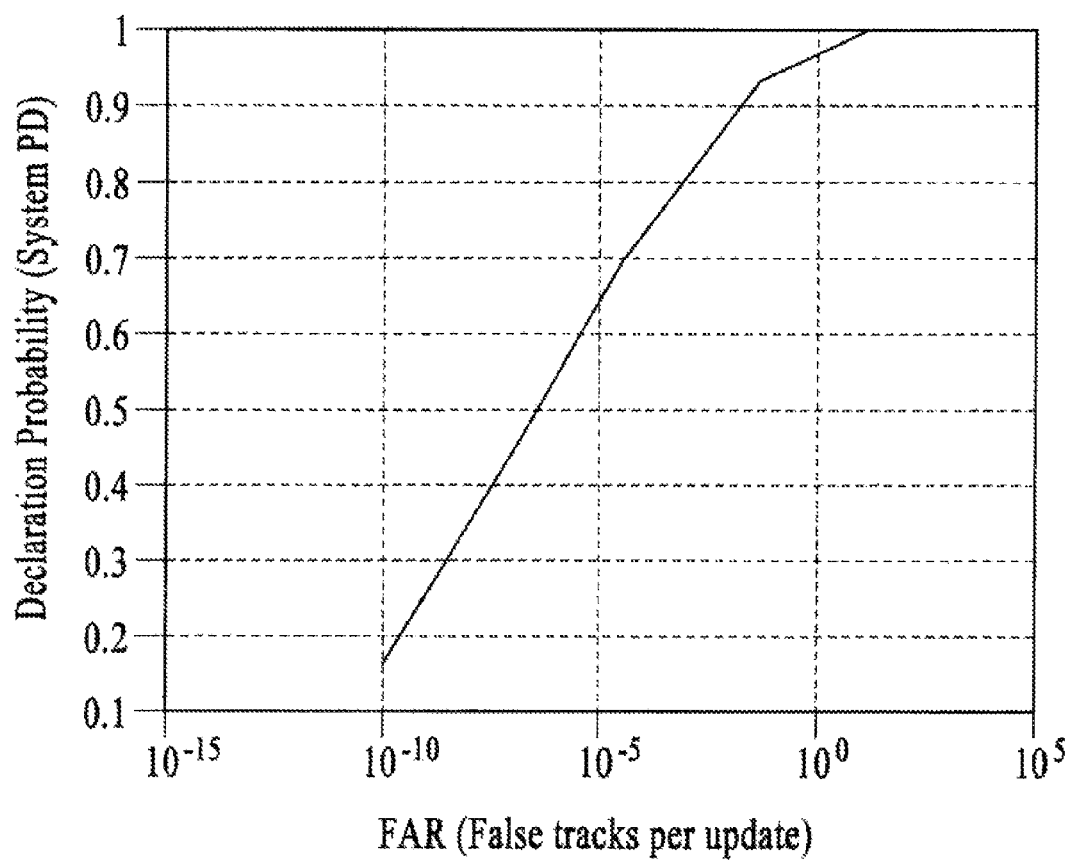
Figure 34:
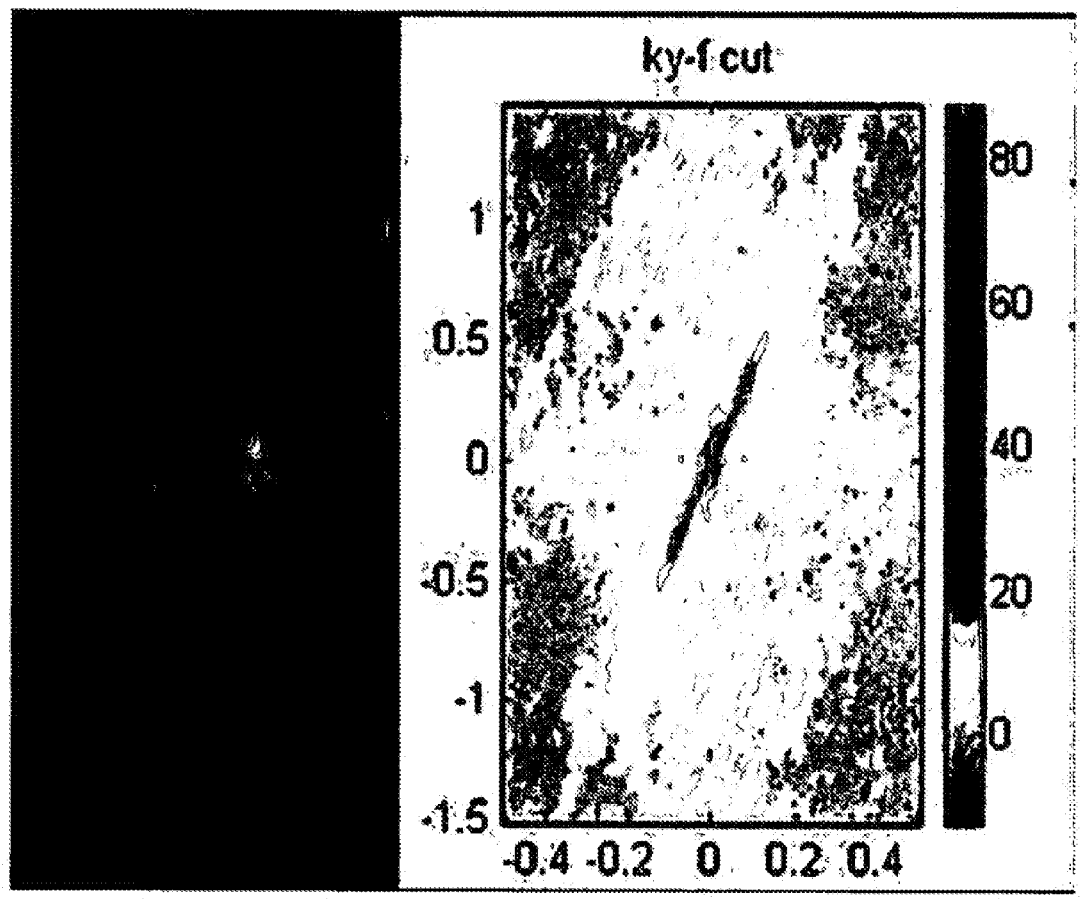
Figure 35:
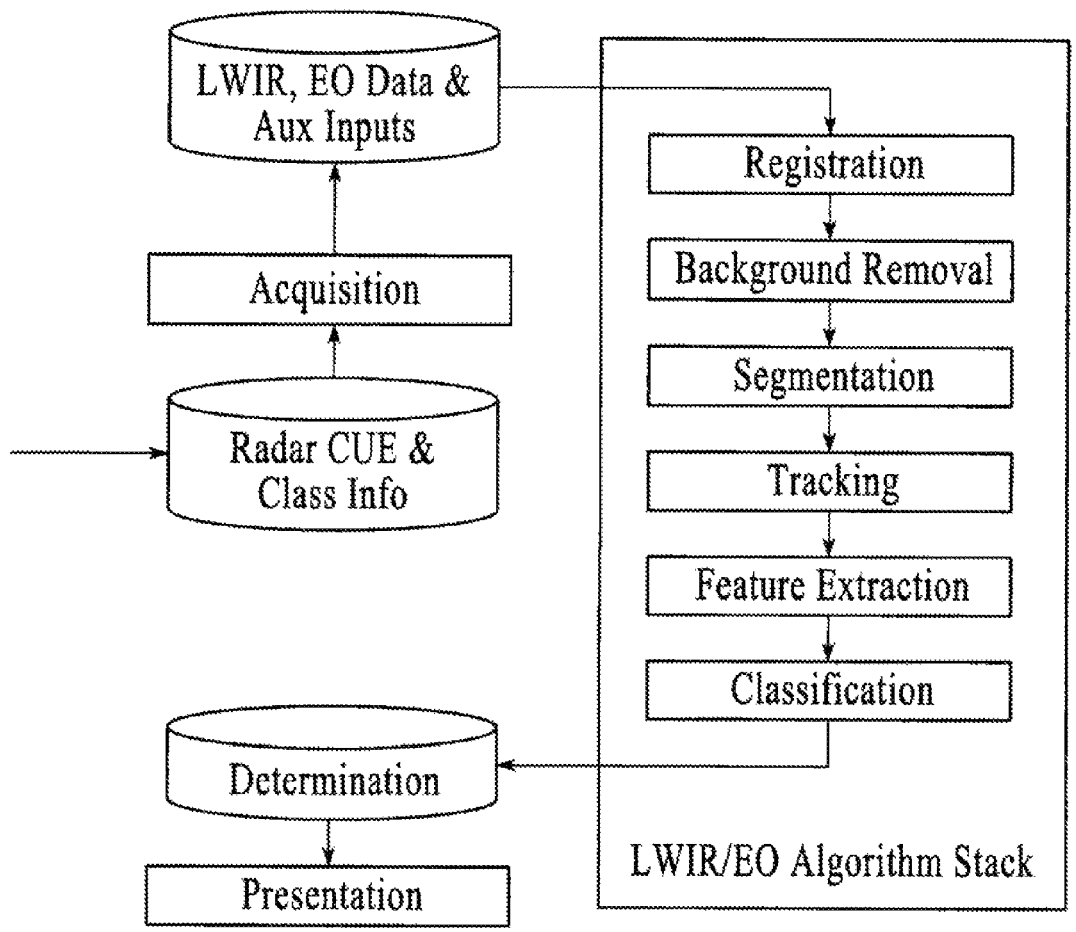
Figure 36:
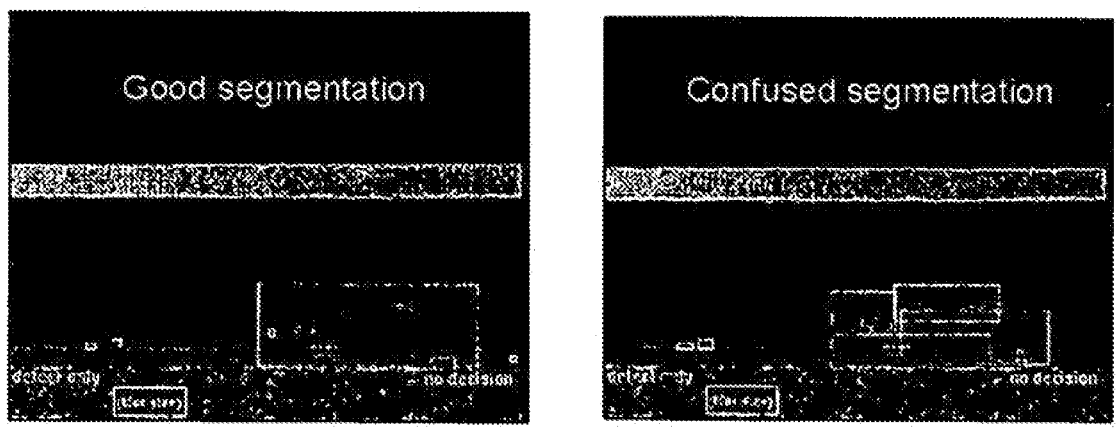
Figure 37:
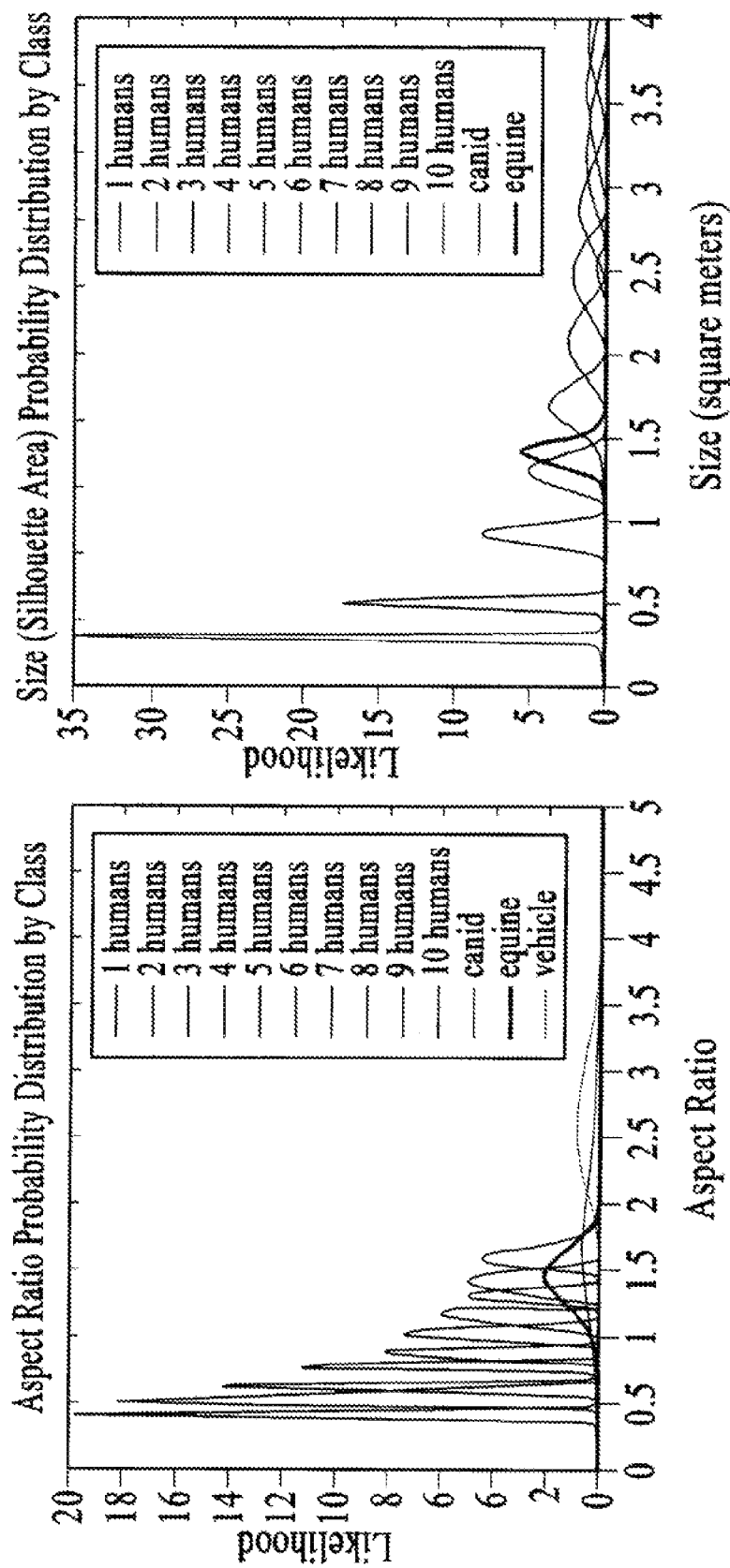
Figure 39:
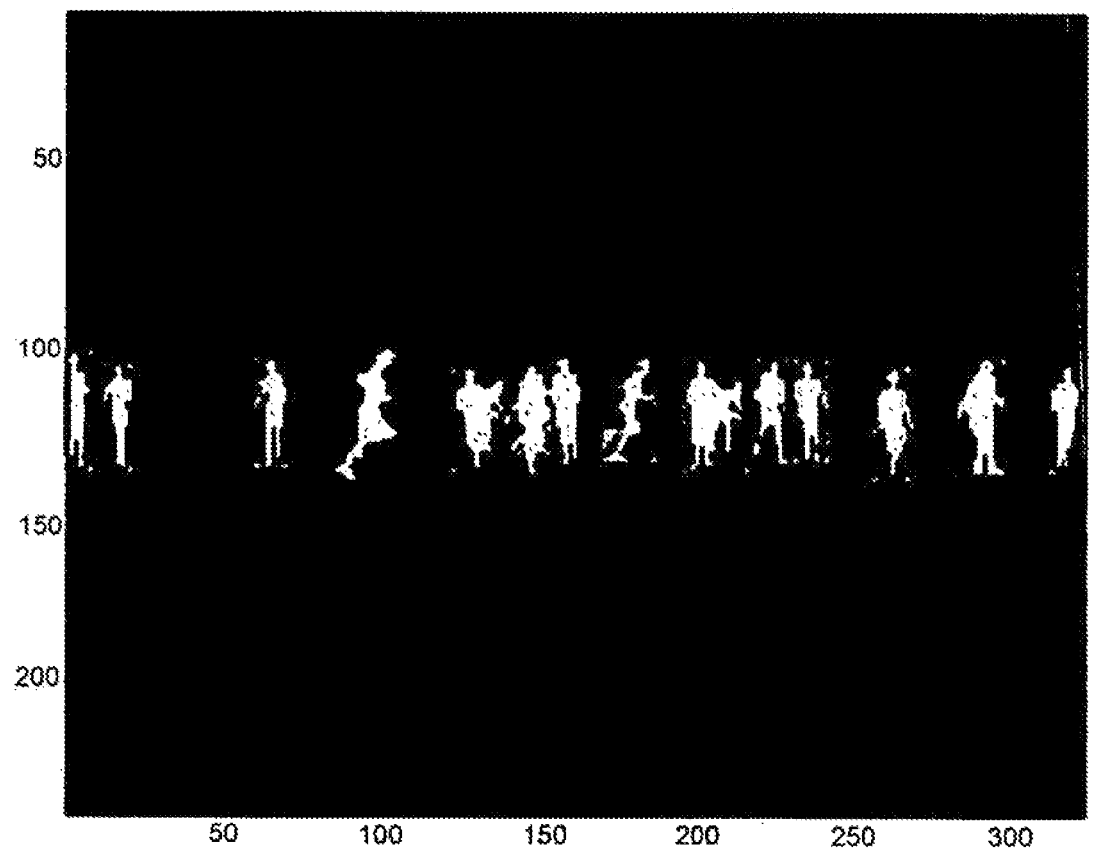
Figure 40:
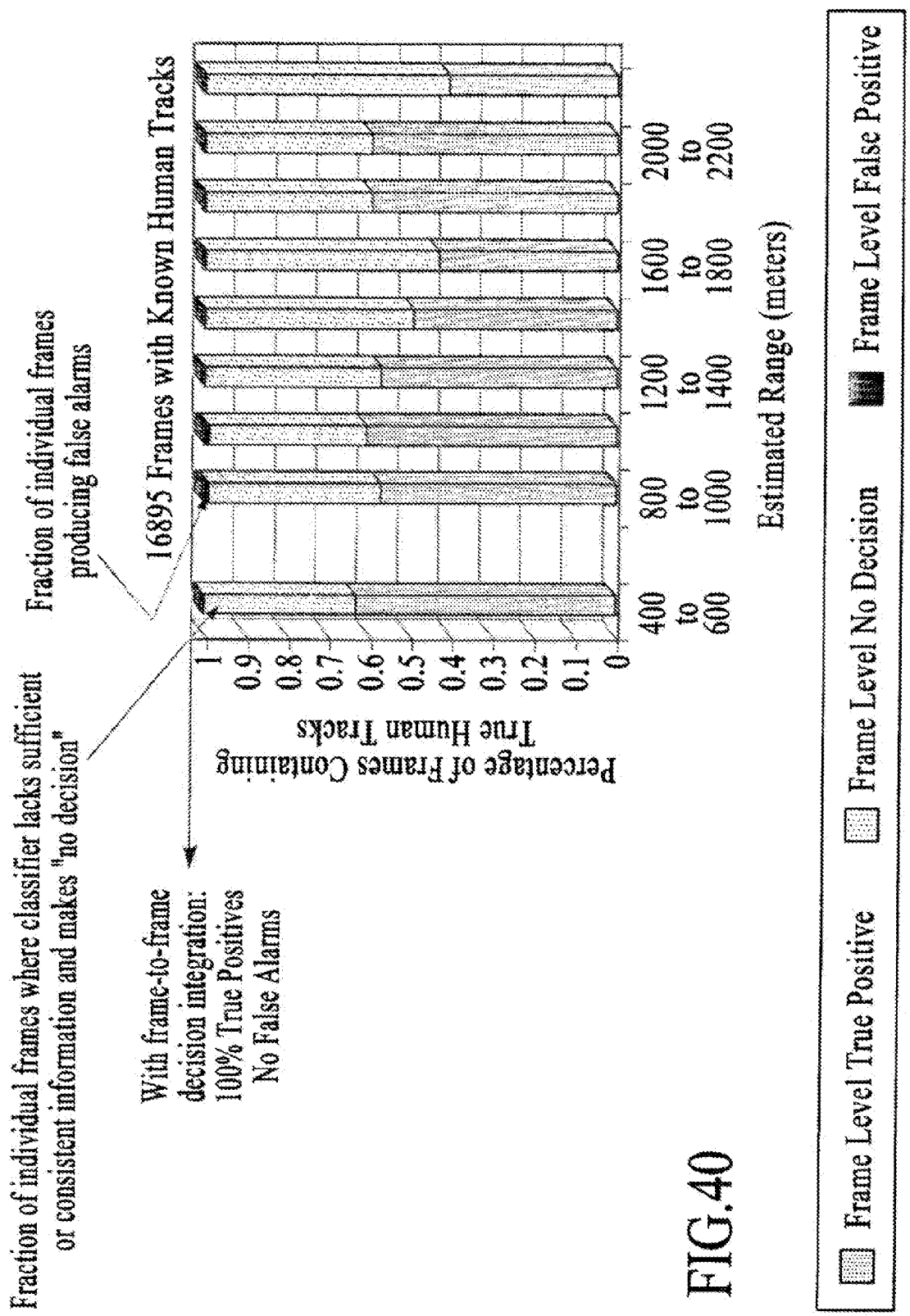
Figure 41:
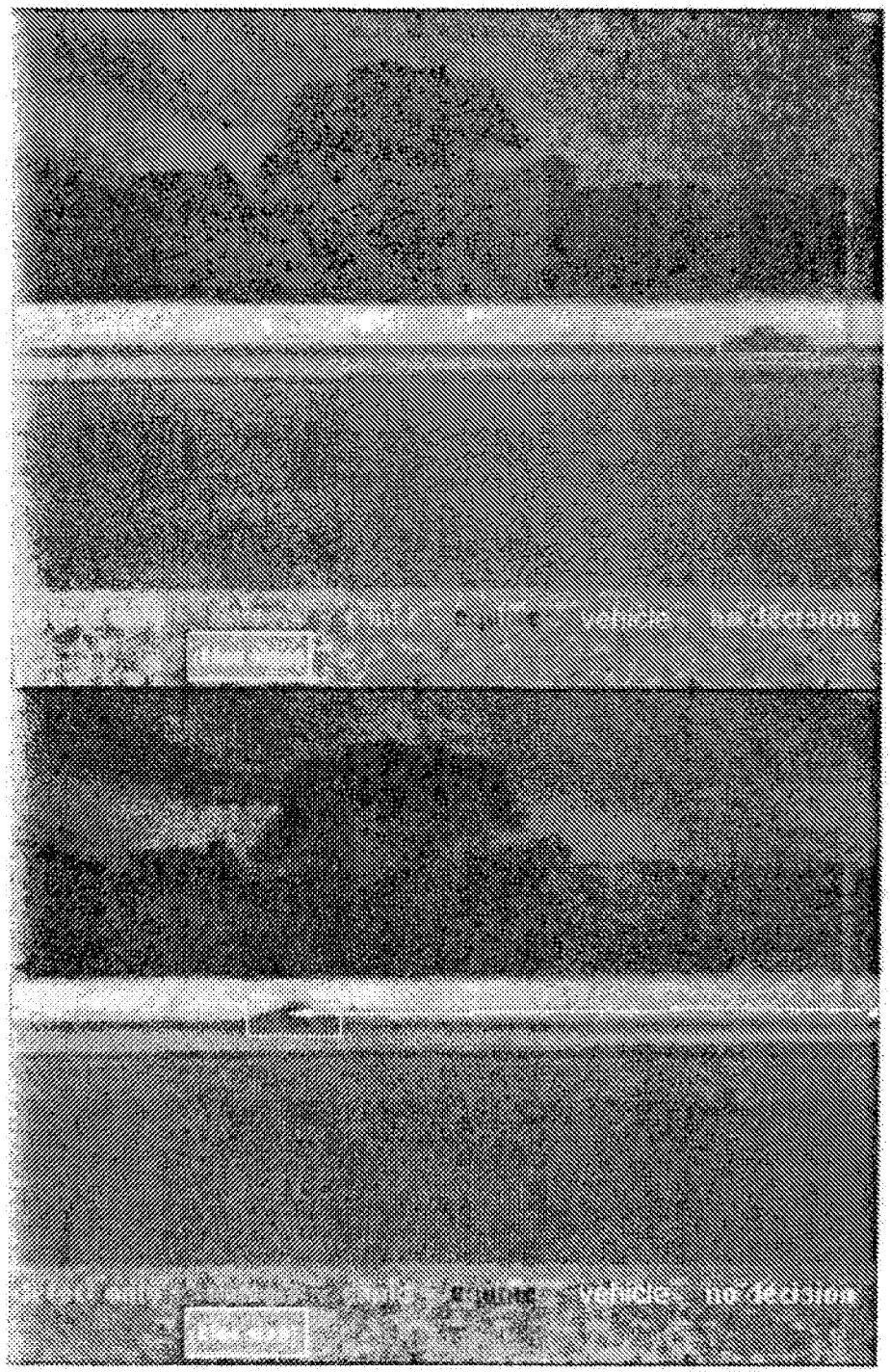
Figure 42:
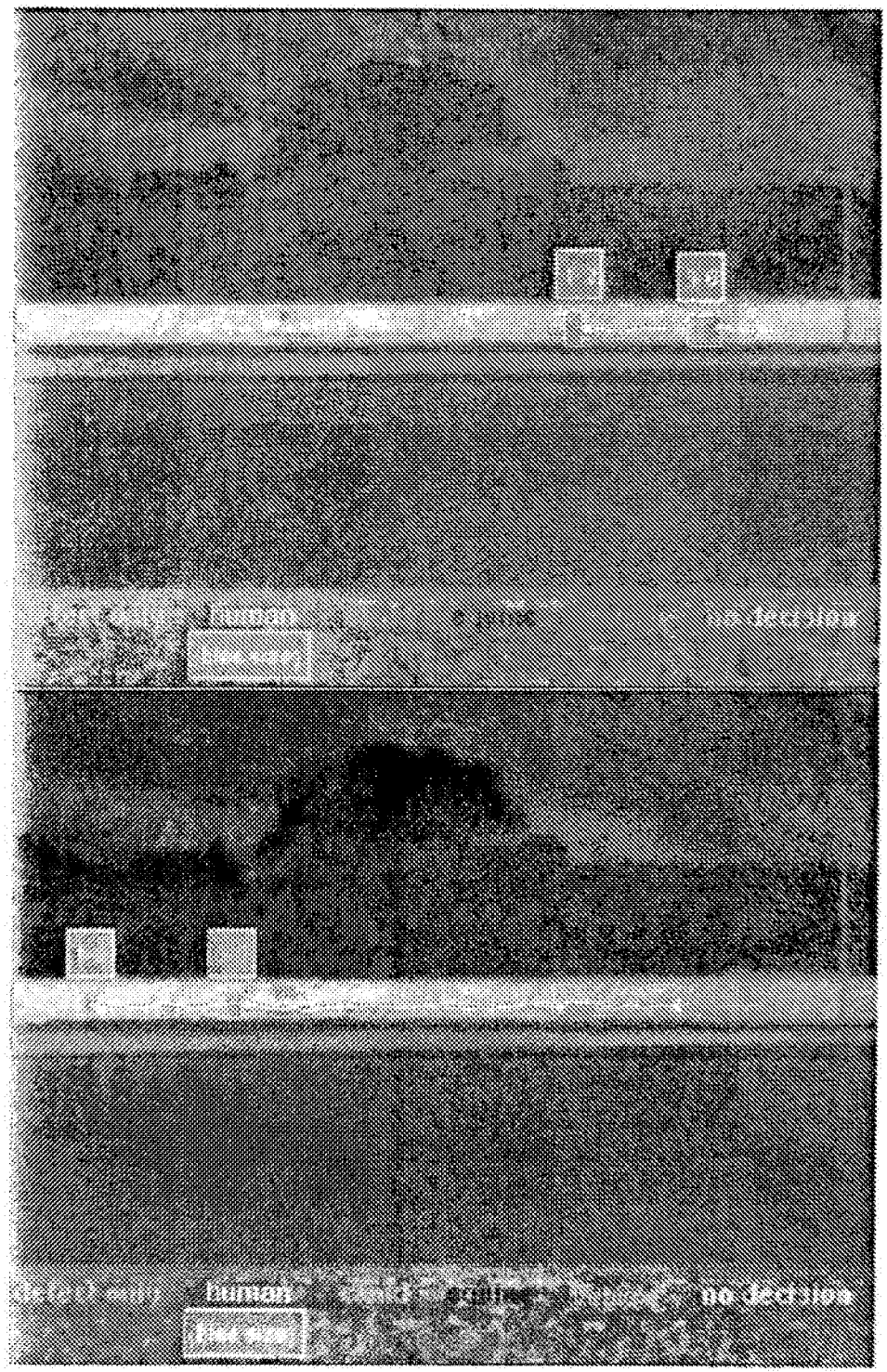
FIG. 42 shows a person and a small group of people at a range of 1.6 km after they have been detected and classified at two different positions in the scene. At this range, the people were classified with ~35 pixels on target.
Figure 43:
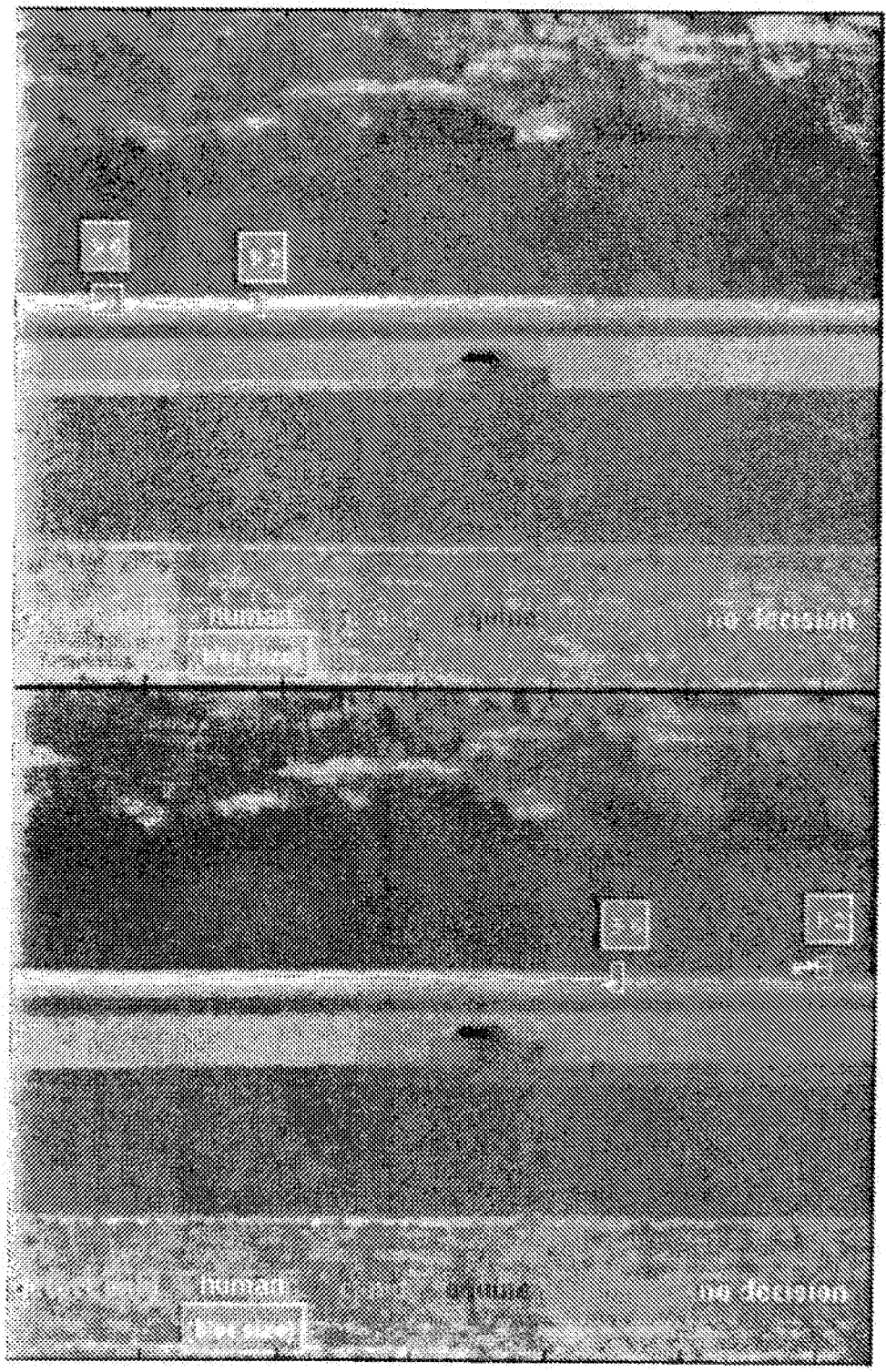
FIG. 43 shows a person and a small group of people at a range of 2.1 km after they have been detected and classified at two different positions in the scene. At this range, the people were classified with ~15 pixels on target.
Figure 44:
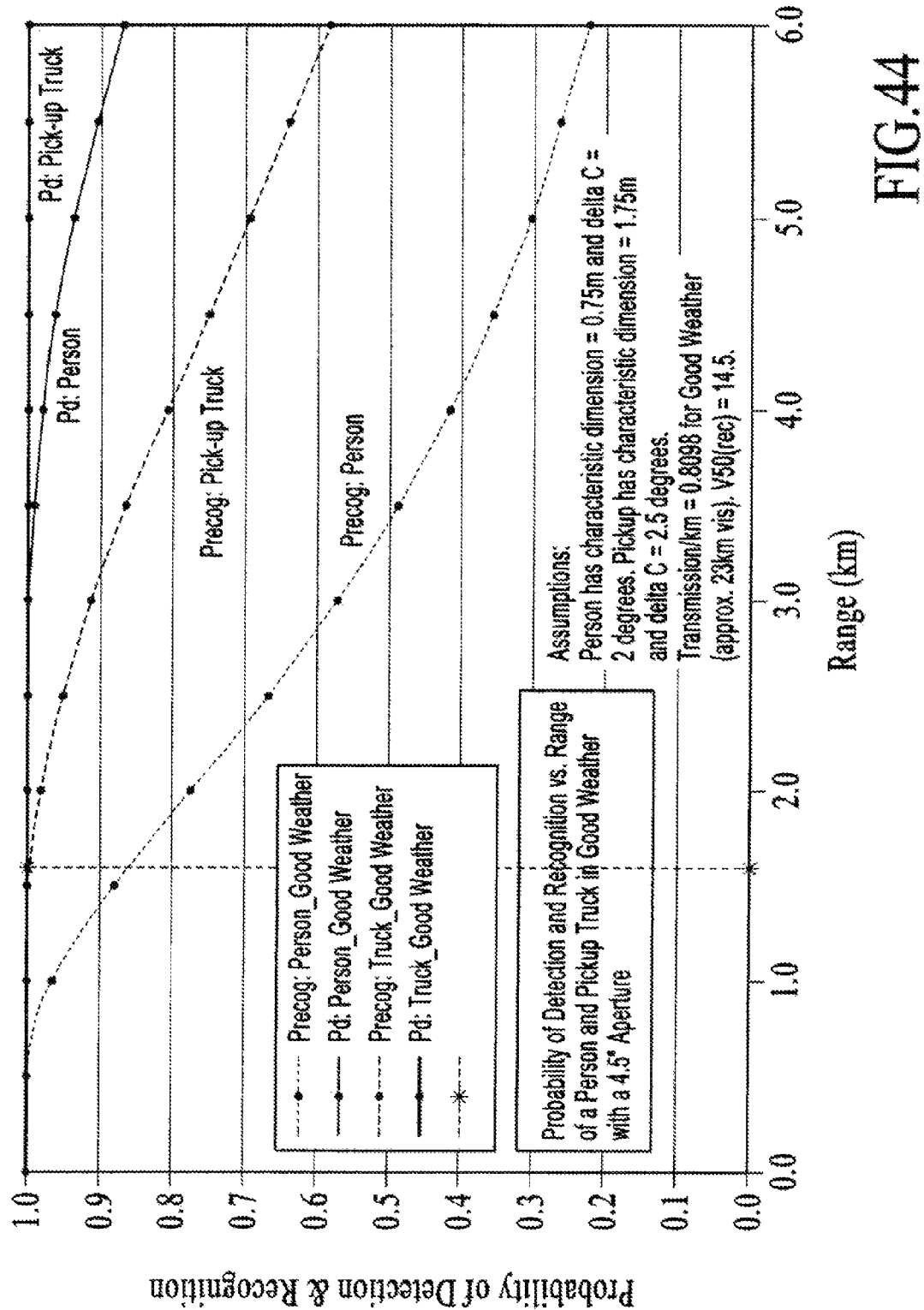

FIG. 44, which illustrates the output of NVTherm™ thermal imaging model, presents the probability of detecting and the probability of recognizing a person (and a pick-up truck) filling 30 pixels (of a 640- by 480-pixel image) with a characteristic dimension of 0.75 m (and 1.75 m) as a function of range using a 4.5-in. lens with a 1.5° field of view. The computation assumed good weather conditions and a 2° C. temperature difference between the target and the surrounding background. At a range of 1.8 km, the probability of detecting both a person and a truck is much greater than 99.9%. Even for poor weather, the $P_D$ is greater than 95%. The results of the Salinas LWIR field tests indicated that all 44 of the walking human and groups of walking humans investigated could be detected, tracked and classified out to ranges of 1.8 km. FIG. 44 indicates that the probability of recognizing a person and a truck at these distances (i.e. proper classification) is about 85% and >99%, respectively. In comparison, as will be illustrated below, our tabulation of 44 people targets results in a probability of recognition that is much better than 85%.

A set of NVTherm™ thermal imaging model predictions were made to determine the impact of the following parameters on the $P_{recog}$ for a LWIR sensor:
  temperature difference between the target and the background,
  the visibility, and
  atmospheric turbulence.

Figure 45:
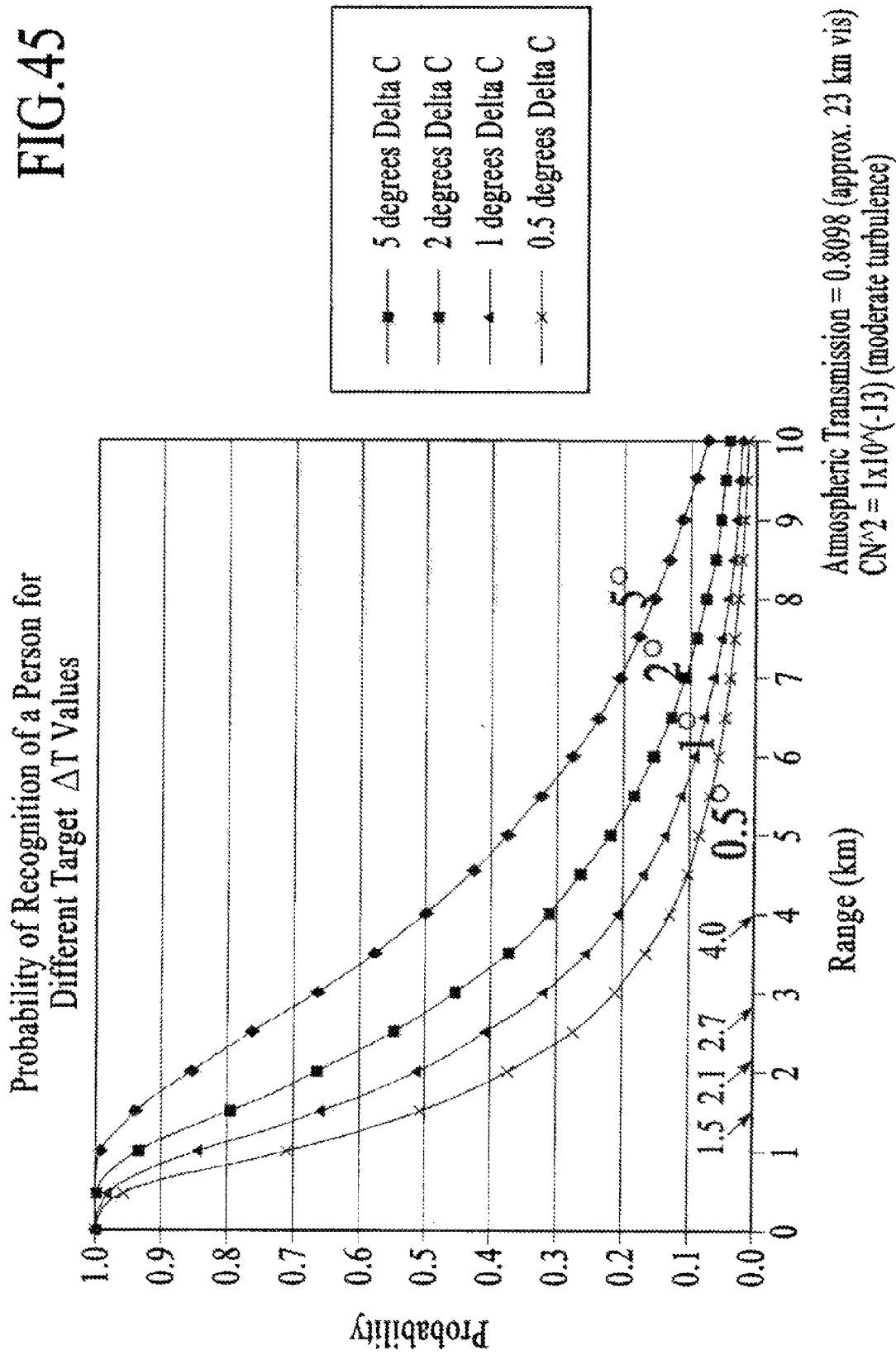
Figure 46:
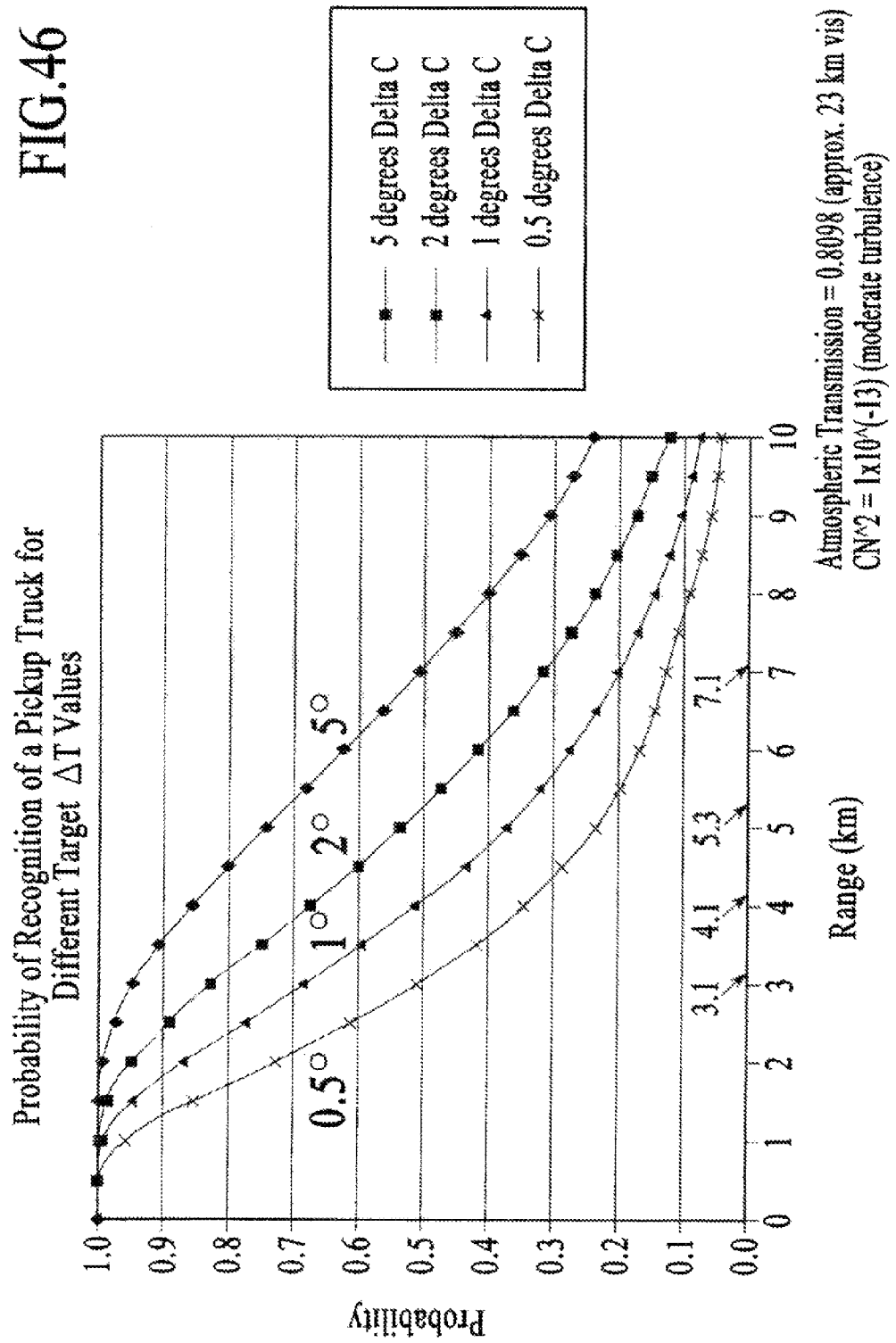

These results are summarized in FIGS. 45 and 46 for temperature differences for people and pickup trucks, respectively. The result are presented for visibility in FIGS. 47 and 48, and for atmospheric turbulence in FIGS. 49 and 50.

Figure 47:
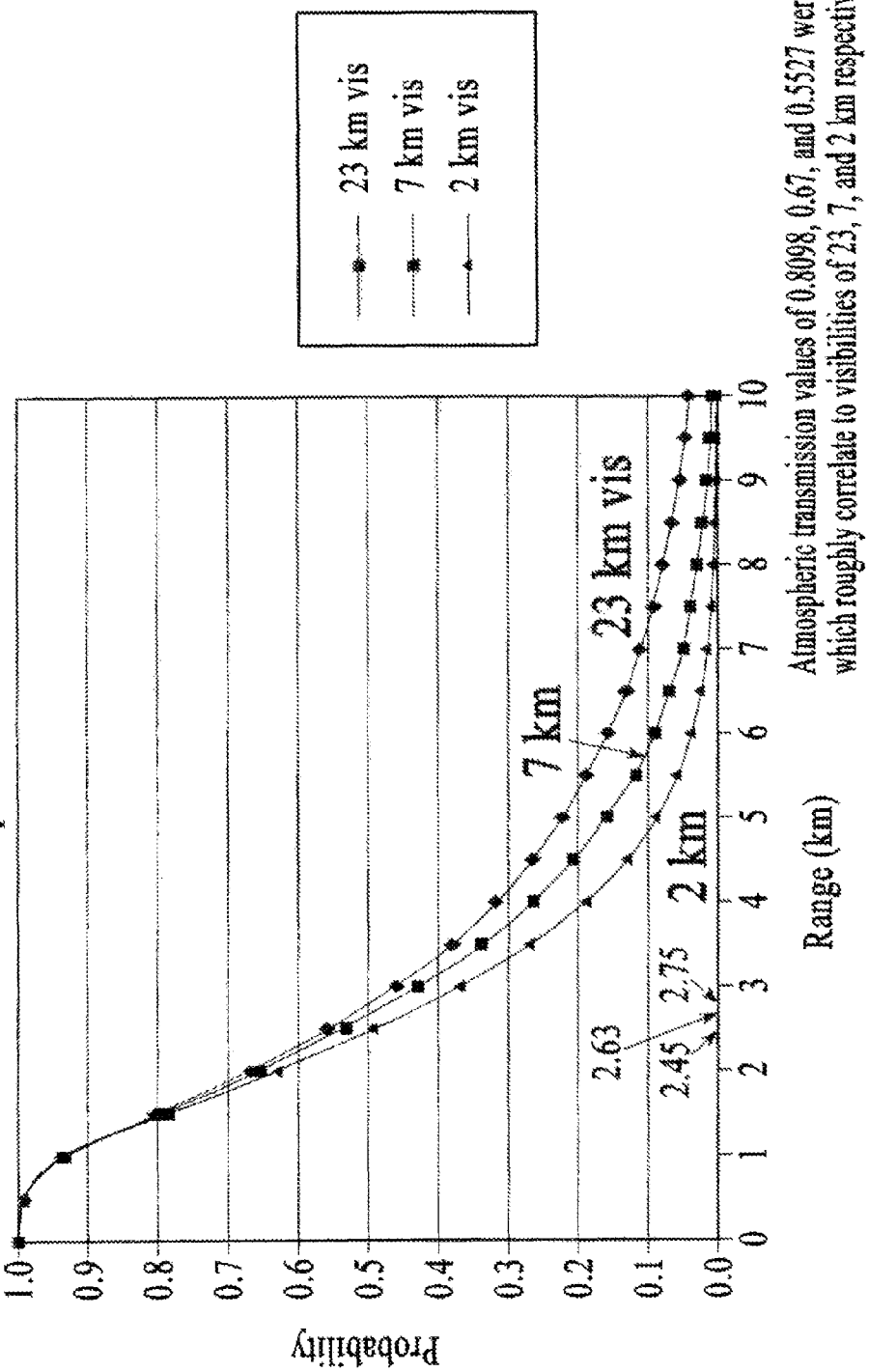
Figure 48:
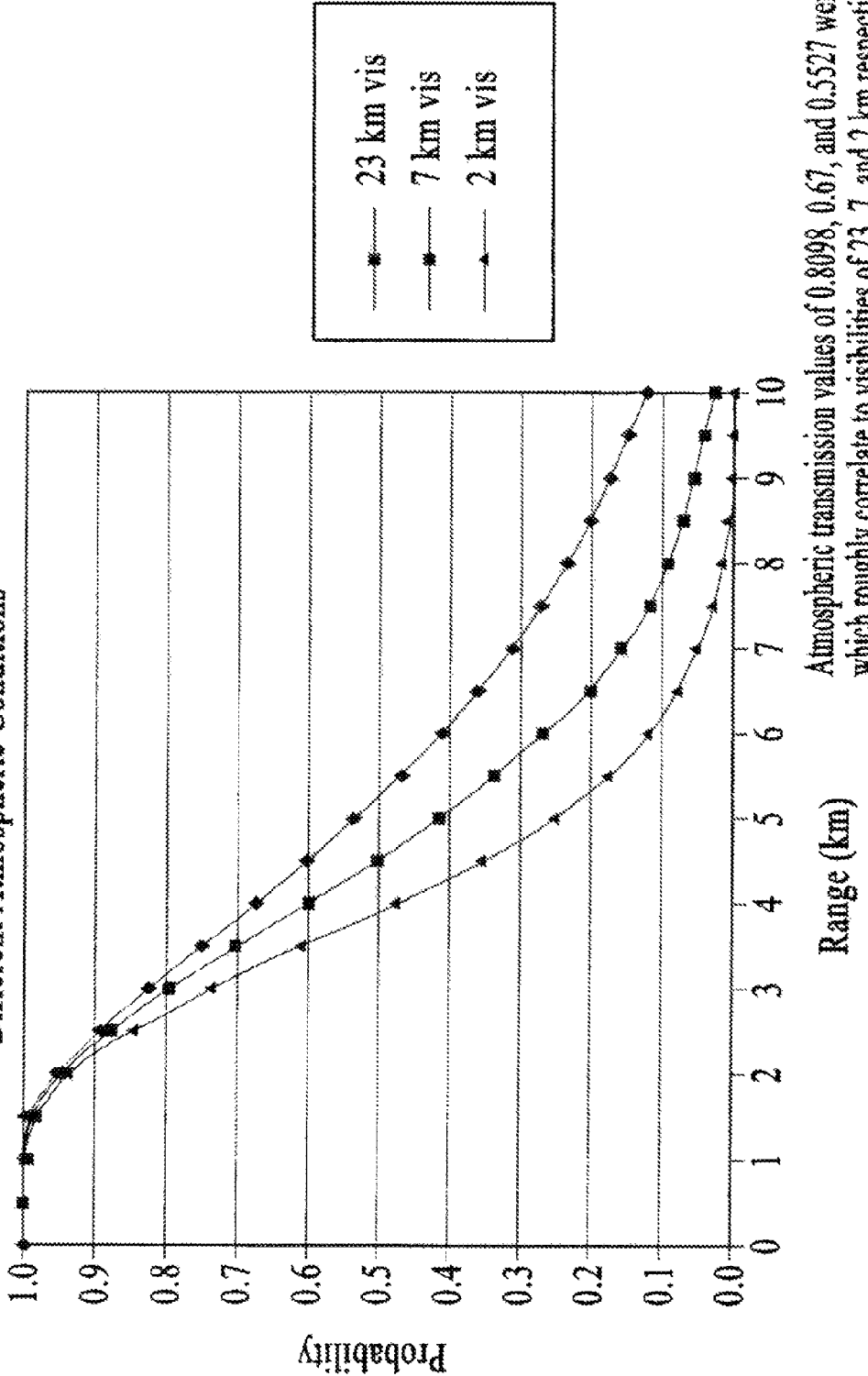

As illustrated in FIGS. 45 and 46, the impact of the temperature difference between the target and the background environment on the $P_{recog}$ can be significant. FIGS. 47 and 48 suggest that visibility can increase the $P_{recog}$ by several kilometers.

The impact of turbulence on performance is illustrated in FIGS. 49 and 50. The figures were generated for an average diurnal cycle variation in turbulence that is typical for a Southern Border environment. As a general rule-of-thumb, classification performance in moderate turbulence conditions causes the effective range for a given level of performance to be approximately reduced by about 50%, as shown in FIG. 49.

Performance Classification Statistics for LWIR Data Collections at Baseline Ranges, Near Ranges, and Far Ranges. The results of the LWIR tests in the Salinas farmlands were tabulated to begin developing some statistics on the number of people and vehicles that could be detected, tracked, and classified. While not all of the signal processing algorithms are currently implemented (e.g., rejoining and obscuration), the results were excellent and suggest that the $P_D$, $P_{FA}$, and $P_{FT}$ desired by DHS can be achieved.

Baseline Classification Ranges. Table 5 summarizes the number of people, groups of people, and vehicles detected, tracked, and classified with the LWIR sensor system at ranges between 400 m and 1.8 km. The performance of the sensor system that is illustrated in this table is independent and was not cued by the radar. The results are excellent. All 44 of the 44 people targets were detected, tracked and properly classified. The numbers in the parentheses indicates if groups of people were targets. Thus, at 1,460 m, the four people targets "(1+3)" consisted of "1" human walking alone, and one group of "3" humans walking together. The number of pixels on target was less than 35 at a range of 1.8 km. One missed track and several false alarms occurred for the vehicles, mainly because of obscuration, which is not implemented yet in the algorithms. The reasons for the errors are summarized in the footnotes on the table.

The results in Table 5 were used to estimate the performance at greater ranges when the next version of LWIR sensors are used. The baseline classification range for the test configuration camera (a LWIR camera with 320×240 pixels, a 40µ focal plane pitch, and 302 mm lens focal length) that was tested during Phase I was measured to be 400 m to 1.8 km. For a total azimuth field-of-view of at least 1.0 degree and a sufficiently stable tower structure, the baseline range can be scaled directly with the number of pixels on target. Therefore, the baseline range scales inversely with detector pitch and scales directly with focal length of the camera. A baseline range multiplication factor of five (5) is used to estimate a production baseline performance ranges over those used in the Phase I tests based on the following formula: (40µ/15µ)×(750 mm/302 mm) ~5 . Therefore, the baseline range for the early production configuration cameras (320×240 pixels Long Wave IR @ 15µ focal plane pitch and 750 mm lens focal length) that will be tested in Phase II is estimated to be 2,000 m to 9,000 m. It is important to note that the estimated performance impact in production for atmospheric scintillation and turbulence at longer ranges have not yet been measured. However, our model output above gives an indication of the impact of these effects on performance.

Near Classification Ranges. The results of some LWIR measurements at ranges less than 400 m were also made and are presented in Table 6 . All 18 of the people targets were accurately detected and tracked. However, some of the people targets were not classified, because a large number of the farmhands observed in the video were picking crops and did not move in sustained translational motion. These targets are clearly visible and are detected as foreground objects, but

TABLE 5

Performance Statistics Include 44 Correct Classifications and no False Alarms for Baseline Ranges Tested at 400 m to 1,800 m in Phase I, and Scaled by 5 Times to 2,000 m to 9,000 m in Phase II with the advanced LWIR system.

| Approximate Target Range (from GPS truth) | Number of Human Targets | Detected | Tracked | Correct Class | False Alarms | Number of Vehicle Targets | Detected | Tracked | Correct Class | False Alarms | Comments |
|---|---|---|---|---|---|---|---|---|---|---|---|
| 400 m | 4 | 4 | 4 | 4 | 0 | 0 | — | — | — | — | |
| 400 m | 4 | 4 | 4 | 4 | 0 | 1 | 1 | 1 | 1 | 0 | |
| 400 m | 4 (1 + 3) | 4 | 4 | 4 | 0 | 1 | 1 | 1 | 1 | 0 | |
| 800 m | 4 (1 + 1 + 2) | 4 | 4 | 4 | 0 | 0 | — | — | — | — | |
| 900 m | 2 | 2 | 2 | 2 | 0 | 2 | 2 | 2 | 2 | 1 | * |
| 1040 m | 4 | 4 | 4 | 4 | 0 | 3 | 3 | 3 | 1 | 2 | ** |
| 1050 m | 4 | 4 | 4 | 4 | 0 | 0 | — | — | — | — | *** |
| 1350 m | 6 | 6 | 6 | 6 | 0 | 0 | — | — | — | — | |
| 1460 m | 4 (1 + 3) | 4 | 4 | 4 | 0 | 1 | 1 | 0 | — | 0 | **** |
| 1540 m | 4 (1 + 3) | 4 | 4 | 4 | 0 | 0 | — | — | — | — | |
| 1750 m | 4 (1 + 3) | 4 | 4 | 4 | 0 | 1 | 1 | 1 | 1 | 0 | |
| TOTALS | 44 | 44 | 44 | 44 | 0 | 9 | 9 | 8 | 6 | 3 | |

* Vehicle starts and stops after correct classification - incomplete capture as foreground leads to misclassification (as human group) in second series of detection and track events
** One vehicle is 70% to 90% obscured and leads to a human FA at end of track; another vehicle is slow moving and moves
*** One human is running in this scene
**** Vehicle is visible for only 3 sec and is never tracked

TABLE 6

Performance Statistics for Near Ranges Tested at 300 m to 400 m in Phase I, and Scaled by 5 Times to 1,500 m to 2,000 m in Phase II with the Advanced LWIR system.

| Approximate Target Range (from GPS truth) | Number of Human Targets | Detected | Tracked | Correct Class | False Alarms | Number of Vehicle Targets | Detected | Tracked | Correct Class | False Alarms | Comments |
|---|---|---|---|---|---|---|---|---|---|---|---|
| 350 m | 0 | — | — | — | — | 1 | 1 | 1 | 1 | 0 | |
| 350 m | 7 | 7 | 7 | 4 | 0 | 0 | — | — | — | — | * |
| 350 m | 13 | 13 | 13 | 6 | 0 | 0 | — | — | — | — | ** |
| TOTALS | 20 | 20 | 20 | 10 | 0 | 1 | 1 | 1 | 1 | 0 | |

* 2 workers in foreground are bent over working the field and moving slowly; classifier makes no call; 1 walking worker in the foreground crosses over crouching workers and obscuration causes classifier to make no decision
** 4 workers in foreground are bent over working in the field and moving slowly; 1 gets classified after standing and walking out of scene; 4 out of the nine erect walkers are never classified because of cross-overs with other workers and obscuration do not result in the formation of sustained tracks as very little or no displacement in target position is evident—a precondition for the current implementation of the tracker algorithm to declare an object as a target. Future versions of the software will include augmented detection and tracking algorithms to better address this type of target.

Far Classification Ranges. Table 7 presents the results of our analysis for greater ranges than 1.8 km. The probability of detection, tracking, and classification has dramatically fallen off at these ranges, mainly because of the decreased number of pixels on target and the foreground obscuring (reducing pixels on target) the targets. Based on a similar analysis as presented above, the performance results achieved at these ranges would scale to greater than 9,000 m using the next generation of LWIR camera.

TABLE 7

Performance statistics for far ranges tested at over 1,800 m in Phase I, and scaled by 5 times to over 9,000 m in Phase II

| Approximate Target Range (from GPS truth where available) | Number of Human Targets | Detected | Tracked | Correct Class | False Alarms | Number of Vehicle Targets | Detected | Tracked | Correct Class | False Alarms | Comments |
|---|---|---|---|---|---|---|---|---|---|---|---|
| 1840 m to 1880 m | 4 | 0 | 0 | 0 | 0 | 2 | 2 | 1 | 1 | 0 | * |
| 1875 m to 1990 m | 4 | 0 | — | — | 0 | 0 | — | — | — | — | |
| 1880 m to 2000 m | 4 | 1 | 0 | 0 | 0 | 1 | 1 | 1 | 1 | 0 | ** |
| 1930 m to 2020 m | 4 | 4 | 4 | 4 | 0 | 0 | — | — | — | — | |
| 2010 m to 2090 m | 4 (1 + 3) | 4 | 4 | 4 | 0 | 0 | — | — | — | — | |
| 2030 m to 2100 m | 4 | 4 | 4 | 4 | 0 | 0 | — | — | — | — | |
| 3500 to 4000 m | 0 | — | — | — | — | 6 | 6 | 0 | — | 0 | *** |
| 3500 to 4000 m | 0 | — | — | — | — | 9 | 9 | 1 | 0 | 0 | **** |
| 3500 to 4000 m | 0 | — | — | — | — | 3 | 3 | 0 | 0 | 0 | ***** |
| TOTALS | 24 | 13 | 12 | 12 | 0 | 21 | 21 | 3 | 2 | 0 | |

* Vehicle is on the farm road ahead of the rise at a reported range of 3100 meters; tracker never grabs one vehicle crossing FOV
** Vehicle is on the farm road ahead of the rise at a reported range of 3460 meters
*** Foreground obscures 50% to 90% of vehicles; within FOV for less than 3 seconds in all cases
**** Foreground obscures 50% to 90% of vehicles; within FOV for less than 3 seconds in all cases
***** Foreground obscures 50% to 90% of vehicles; within FOV for less than 3 seconds in all cases Summary. In summary, the smart sensor system, which can be implemented either from a tower, a mobile vehicle, or both, is comprised of a low-cost, non-coherent X-band radar, a narrow field-of view LWIR sensor, and a real-time, signal processor in a supercomputer. The radar provides early detection, tracking, and $1^{st}$ stage classification. When the targets of interest enter the field of view of the LWIR sensor, the radar cues that sensor to the targets, whereupon they are tracked and classified. Finally, the classified targets are forwarded to a control center for final confirmation by an operator, who upon validation of the target, designates an agent to apprehend the target. The field tests indicate that this system will achieve a high level of performance against the targets of interest (i.e., people walking, singly or in groups, horses moving with intent, and moving vehicles) for detection, tracking and classification.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A non-transitory computer-readable medium comprising instructions stored thereon, which when executed by at least one processor, configure the processor to perform operations comprising:

transmitting a plurality of radar pulses by a non-coherent radar toward an area;

receiving a radar return scattered from the area, the radar return including a return from a target and interference from system noise and background noise and clutter; and processing the radar return for at least one range-azimuth resolution cell in the area to differentiate the return from the target from the interference from the system noise and background noise and clutter, the processing including:

comparing the radar return to a first threshold, the first threshold set at a level to identify multiple radar contacts including the target and false contacts from the interference from system noise and background noise and clutter, wherein a radar contact is declared when the radar return exceeds the first threshold; and tracking the multiple radar contacts over time to distinguish the target from the false contacts.

2. The non-transitory computer-readable medium of claim 1, wherein said processing the return includes applying an algorithm that determines whether a track derived from the radar return for at least two time intervals is consistent with an expected track for an actual target.

3. The non-transitory computer-readable medium of claim 2, wherein said track is determined by a level of confidence of a probability statistic applied to said radar return.

4. The non-transitory computer-readable medium of claim 3, wherein said probability statistic is defined by a log-likelihood ratio with the assumption that said system noise and clutter within each one of said at least one resolution cell is substantially constant over a period of time, and wherein target-absent statistics over multiple radar scans is determined and used in the determination of the log-likelihood ratio.

5. The non-transitory computer-readable medium of claim 3, wherein said probability statistic is based on Bayesian statistical methods.

6. The non-transitory computer-readable medium of claim 1, wherein said receiving includes collecting and processing at least two samples of said radar returns from said at least one range-azimuth resolution cell.

7. The non-transitory computer-readable medium of claim 1, wherein said processing said radar return includes pre-processing data from said radar return to generate a detection field before said return is differentiated.

8. The non-transitory computer-readable medium of claim 7, wherein said detection field is generated after conditioning operations are performed on said return, wherein said conditioning operations include an operation selected from the group consisting of calibration, spatial registration, pre-filtering, constant background removal, and noise background estimation.

9. The non-transitory computer-readable medium of claim 8, wherein said spatial registration includes aligning resolution cells for direct comparison from one scan to the next scan.

10. The non-transitory computer-readable medium of claim 7, wherein said detection field is generated by segmentation of said data.

11. The non-transitory computer-readable medium of claim 7, wherein said pre-processing includes separating resolution cells into different categories for processing based on the type of noise and clutter present in said resolution cells.

12. A system comprising:
at least one processor;
a memory with instructions stored thereon, which when executed by the at least one processor, configure the at least one process to perform operations comprising:
receiving a radar return resulting from a non-coherent radar transmitting a plurality of radar pulses towards an area, the radar return scattered from the area and the radar return including a return from a target and interference from system noise and background noise and clutter; and
processing the radar return for at least one range-azimuth resolution cell in the area of interest to differentiate the return from the target from the interference from the system noise and background noise and clutter, the processing including:
comparing the radar return to a first threshold, the first threshold set at a level to identify multiple radar contacts including the target and false contacts from the interference from system noise and background noise and clutter, wherein a radar contact is declared when the radar return exceeds the first threshold; and
tracking the multiple radar contacts over time to distinguish the target from the false contacts.

13. The system claim 12, wherein said processing the return includes applying an algorithm that determines whether a track derived from the radar return for at least two time intervals is consistent with an expected track for an actual target.

14. The system 13, wherein said track is determined by a level of confidence of a probability statistic applied to said radar return.

15. The system of claim 14, wherein said probability statistic is defined by a log-likelihood ratio with the assumption that said system noise and clutter within each one of said at least one resolution cell is substantially constant over a period of time, and wherein target-absent statistics over multiple radar scans is determined and used in the determination of the log-likelihood ratio.

16. The system of claim 14, wherein said probability statistic is based on Bayesian statistical methods.

17. The system of claim 12, wherein the operation of processing the radar return includes an operation of pre-processing data from the radar return to generate a detection field before the return is differentiated.

18. The system of claim 17, wherein the operation of pre-processing includes separating resolution cells into different categories for processing based on the type of noise and clutter present in said resolution cells.

19. The system of claim 17, wherein said detection field is generated by segmentation of the data.

20. The system of claim 12, wherein a second threshold is used to differentiate false contacts due to the noise and clutter from actual targets, the second threshold being based on a track-before-detect method.

* * * * *